US012539279B2

(12) United States Patent
Couture-Senécal et al.

(10) Patent No.: US 12,539,279 B2
(45) Date of Patent: Feb. 3, 2026

(54) SUPRAMOLECULAR IONIZABLE LIPID MOLECULES WITH HETEROATOMIC TUNING FOR NUCLEIC ACID DELIVERY

(71) Applicant: The Governing Council of the University of Toronto, Toronto (CA)

(72) Inventors: Julien Couture-Senécal, Toronto (CA); Grayson Tilstra, Toronto (CA); Omar Fizal Khan, Toronto (CA)

(73) Assignee: The Governing Council of the University of Toronto, Toronto (CA)

( * ) Notice: Subject to any disclaimer, the term of this patent is extended or adjusted under 35 U.S.C. 154(b) by 0 days.

(21) Appl. No.: 18/621,526

(22) Filed: Mar. 29, 2024

(65) Prior Publication Data
US 2025/0186357 A1 Jun. 12, 2025

(30) Foreign Application Priority Data
Dec. 11, 2023 (LU) ........................ 505741

(51) Int. Cl.
*C07C 31/02* (2006.01)
*A61K 9/51* (2006.01)
*A61K 31/045* (2006.01)
*A61K 45/06* (2006.01)
*C07C 237/10* (2006.01)
*C12N 15/113* (2010.01)

(52) U.S. Cl.
CPC ............ *A61K 9/5123* (2013.01); *A61K 45/06* (2013.01); *C07C 237/10* (2013.01); *C12N 15/113* (2013.01)

(58) Field of Classification Search
None
See application file for complete search history.

(56) References Cited

U.S. PATENT DOCUMENTS

| | | | |
|---|---|---|---|
| 5,820,873 A | 10/1998 | Choi et al. | |
| 8,450,298 B2 | 5/2013 | Mahon et al. | |
| 2005/0004293 A1 | 1/2005 | Peng et al. | |
| 2017/0121279 A1 | 5/2017 | Siegwart et al. | |
| 2024/0247109 A1 | 7/2024 | Khan et al. | |
| 2024/0294714 A1 | 9/2024 | Khan et al. | |

FOREIGN PATENT DOCUMENTS

| | | |
|---|---|---|
| CN | 101220119 A | 7/2008 |
| CN | 104292129 A | 1/2015 |
| CN | 106519139 A | 3/2017 |
| CN | 113264842 A | 8/2021 |
| CN | 113402404 A | 9/2021 |
| CN | 114262275 A | 4/2022 |
| GB | 941753 A | 11/1963 |
| WO | 2010141069 A2 | 12/2010 |
| WO | WO-2011123621 A2 | 10/2011 |
| WO | 2014199174 A1 | 12/2014 |
| WO | WO-2017118842 A1 | 7/2017 |
| WO | 2020061367 A1 | 3/2020 |
| WO | 2020132196 A1 | 6/2020 |
| WO | 2022066916 A1 | 3/2022 |
| WO | 2022168085 A1 | 8/2022 |
| WO | 2022218295 A1 | 10/2022 |
| WO | WO-2023061460 A1 * | 4/2023 |
| WO | 2023092242 A1 | 6/2023 |
| WO | 2023198085 A1 | 10/2023 |

OTHER PUBLICATIONS

Machine translation of WO-2023061460-A1, original document published 2023 (Year: 2023).*
Luxembourg Search Report received for Luxembourg Application No. 505741, mailed on Jun. 19, 2024, 8 pages.
Baiersdorfer et al. (Apr. 15, 2019) "A Facile Method for the Removal of dsRNA Contaminant from In Vitro- Transcribed mRNA", Nucleic Acids—Molecular Therapy, 15:26-35.
Carrasco et al. (Aug. 11, 2021) "Ionization and Structural Properties of mRNA Lipid Nanoparticles Influence Expression in Intramuscular and Intravascular Administration", Communications Biology, 4(1):956 (15 pages).
Dhumal et al. (Nov. 30, 2020) "Experimentally Validated QSAR Model for Surface pKa Prediction of Heterolipids Having Potential as Delivery Materials for Nucleic Acid Therapeutics", ACS Omega, 5(49):32023-32031.
Hassett et al. (Apr. 15, 2019) "Optimization of Lipid Nanoparticles for Intramuscular Administration of mRNA Vaccines", Molecular Therapy—Nucleic Acids, 15:1-11.
Jayaraman et al. (Aug. 20, 2012) "Maximizing the Potency of siRNA Lipid Nanoparticles for Hepatic Gene Silencing In Vivo", Angewandte Chemie International Edition, 51(34):8529-8533.
International Search Report and Written Opinion mailed Mar. 6, 2023, International Patent Application No. PCT/CA2022/051745, filed Nov. 29, 2022.
G. Tilstra et al., "Iterative Design of Ionizable Lipids for Intramuscular mRNA Delivery," J. Am. Chem. Soc. 2023, 145, 2294-2304 (Jan. 18, 2023).
Ball, Rebecca L et al., PloS One, vol. 10, Issue 7, Jul. 20, 2015.
Yu, Bo et al., Biomaterials, vol. 33, No. 25, pp. 5924-5934, Sep. 1, 2012.
Rousseau, Guillaume et al., Chempluschem, vol. 78, No. 4, pp. 352-363, Apr. 2013.
Simms, Briana I. et al., Journal of Polymer Science, vol. 59, No. 19, pp. 2177-2192, Oct. 1, 2021.
Alameh et al. (2021) "Lipid Nanoparticles Enhance the Efficacy of mRNA and Protein Subunit Vaccines by Inducing Robust T Follicular Helper Cell and Humoral Responses", Immunity, 54(12):2877-2892.
Barbier et al. (2022) "The Clinical Progress of mRNA Vaccines and Immunotherapies", Nature Biotechnology, 40(6):840-854.

(Continued)

Primary Examiner — Nissa M Westerberg
(74) Attorney, Agent, or Firm — Mintz Levin Cohn Ferris Glovsky and Popeo, P.C.

(57) ABSTRACT

The present application relates to ionizable lipids that include ester functional groups. The present application further relates to compositions and uses thereof for the delivery of agents such as nucleic acids and drugs.

16 Claims, 7 Drawing Sheets
Specification includes a Sequence Listing.

(56) References Cited

OTHER PUBLICATIONS

Bogers et al. (Oct. 17, 2014) "Potent Immune Responses in Rhesus Macaques Induced by Nonviral Delivery of a Self-amplifying RNA Vaccine Expressing HIV Type 1 Envelope With a Cationic Nanoemulsion", Journal of Infectious Diseases, 211(6):947-955.
Brito et al. (Dec. 2014) "A Cationic Nanoemulsion for the Delivery of Next-generation RNA Vaccines", Molecular Therapy, 22(12):2118-2129.
Chahal et al. (Jul. 19, 2016) "Dendrimer-RNA Nanoparticles Generate Protective Immunity Against Lethal Ebola, H1N1 Influenza, and Toxoplasma Gondii Challenges With a Single Dose", Proceedings of the National Academy of Sciences of the United States of America, 113(29):E4133-E4142.
Chaudhary et al. (Nov. 2021) "mRNA Vaccines for Infectious Diseases: Principles, Delivery and Clinical Translation", Nature Reviews Drug Discovery, 20(11):817-838.
Chen et al. (2012) "Rapid Discovery of Potent siRNA-containing Lipid Nanoparticles Enabled by Controlled Microfluidic Formulation", Journal of the American Chemical Society, 134(16):6948-6951.
Cheng et al. (2020) "Selective Organ Targeting (SORT) Nanoparticles for Tissue-specific mRNA Delivery and CRISPR-Cas Gene Editing", Nature Nanotechnology, 15(4):313-320.
Corbett et al. (Oct. 15, 2020) "Evaluation of the mRNA-1273 Vaccine against SARS-COV-2 in Nonhuman Primates", The New England Journal of Medicine, 383(16):1544-1555.
Cornebise et al. (Feb. 16, 2022) "Discovery of a Novel Amino Lipid That Improves Lipid Nanoparticle Performance through Specific Interactions with mRNA", Advanced Functional Materials, 32(8):2106727 (12 pages).
Cullis et al. (1986) "Lipid Polymorphism and the Roles of Lipids in Membranes", Chemistry and Physics of Lipids, 40(2-4):127-144.
Geall et al. (Sep. 4, 2012) "Nonviral Delivery of Self-amplifying RNA Vaccines", Proceedings of the National Academy of Sciences, 109(36):14604-14609.
Hafez et al. (2001) "On the Mechanism Whereby Cationic Lipids Promote Intracellular Delivery of Polynucleic Acids", Gene Therapy, 8(15):1188-1196.
Han et al. (Dec. 13, 2021) "An Ionizable Lipid Toolbox for RNA Delivery", Nature Communications, 12(1):7233 (6 pages).
Hekele et al. (2013) "Rapidly Produced Sam Vaccine Against H7N9 Influenza is Immunogenic in Mice", Emerging Microbes and Infections, 2(8):e52 (8 pages).
Heyes et al. (Oct. 2005) "Cationic Lipid Saturation Influences Intracellular Delivery of Encapsulated Nucleic Acids", Journal of Controlled Release, 107(2):276-287.
Kariko et al. (2005) "Suppression of RNA Recognition by Toll-like Receptors: The Impact of Nucleoside Modification and the Evolutionary Origin of RNA", Immunity, 23(2):165-175.
Khan et al. (May 13, 2015) "Dendrimer-Inspired Nanomaterials for the in Vivo Delivery of siRNA to Lung Vasculature", Nano Letters, 15(5):3008-3016 (24 pages).
Khan et al. (Dec. 22, 2014) "Ionizable Amphiphilic Dendrimer-based Nanomaterials With Alkyl-chain-substituted Amines for Tunable siRNA delivery to the Liver Endothelium in Vivo", Angewandte Chemie, 53(52):14397-14401.
Labieniec-Watala et al. (2015) "PAMAM Dendrimers: Destined for Success or Doomed to Fail? Plain and Modified PAMAM Dendrimers in the Context of Biomedical Applications", Journal of Pharmaceutical Sciences, 104(1):2-14.
Melamed et al. (Jan. 2022) "Lipid Nanoparticle Chemistry Determines How Nucleoside Base Modifications Alter mRNA Delivery", Journal of Controlled Release, 341:206-214.
Mendes et al. (Aug. 2017) "Dendrimers as Nanocarriers for Nucleic Acid and Drug Delivery in Cancer Therapy", Molecules, 22(9):1401 (21 pages).
Pardi et al. (Apr. 2018) "mRNA Vaccines—a New Era in Vaccinology", Nature Reviews Drug Discovery, 17(4):261-279 (19 pages).
Rajappan et al. (2020) "Property-Driven Design and Development of Lipids for Efficient Delivery of siRNA", Journal of Medicinal Chemistry, 63(21):12992-13012.
Semple et al. (2010) "Rational Design of Cationic Lipids for siRNA Delivery", Nature Biotechnology, 28(2):172-176.
Trepotec et al. (2019) "Maximizing the Translational Yield of mRNA Therapeutics by Minimizing 5'-UTRs", Tissue Engineering Part A, 25(1-2):69-79 (29 pages).
Walsh et al. (2014) "Microfluidic-Based Manufacture of siRNA-Lipid Nanoparticles for Therapeutic Applications", Methods in Molecular Biology, 1141:109-120.
Wei et al. (Jun. 26, 2020) "Systemic Nanoparticle Delivery of CRISPR-Cas9 Ribonucleoproteins for Effective Tissue Specific Genome Editing", Nature Communications, 11(1):3232 (12 pages).
Xu et al. (Aug. 7, 2013) "RNA Replicon Delivery via Lipid-complexed PRINT Protein Particles", Molecular Pharmaceutics, 10(9):3366-3374.
Zhang et al. (2011) "Ionization Behavior of Amino Lipids for siRNA Delivery: Determination of Ionization Constants, SAR, and the Impact of Lipid pKa on Cationic Lipid-biomembrane Interactions", Langmuir, 27(5):1907-1914.
Beigi et al., (2011) "Convergent Synthesis of Polynitrite and/or Polyamine Dendrimers through Hydmaminomethylation and Michael Addition", European Journal of Organic Chemistry, 8:1482-1492.
Katritzky et al., (1997) "Synthesis of Dendramines, Dendramides and Their New Appiication in the Oil Industry", Journal of the Chinese Chemical Society, 44(6):575-580.
Mizugaki et al., (2008) "PAMAM Dendron-Stabilised Palladium Nanoparticies: Effect of Generation and Peripheral Groups on Particular Size and Hydrogenation Activity", Chemical Communications, 2:241-243.

* cited by examiner

SUPRAMOLECULAR IONIZABLE LIPID MOLECULES WITH HETEROATOMIC TUNING FOR NUCLEIC ACID DELIVERY

CROSS-REFERENCE

This application claims the benefit of and priority to Luxembourg Patent Application No. 505741 filed on Dec. 11, 2023, the entire contents of which are hereby incorporated by reference herein.

INCORPORATION BY REFERENCE OF SEQUENCE LISTING

The present application is being filed with a Sequence Listing in electronic format. The Sequence Listing is provided as a file entitled 062544-502001US_SeqList_ST26.xml, created on Mar. 26, 2024, and is 8 kilobytes in size. The information in electronic format of the Sequence Listing is incorporated herein by reference in its entirety.

FIELD

The present application relates to ionizable lipid molecules that include ester functional groups and compositions thereof. Further, the present application relates to nanoparticle compositions containing ionizable lipid molecules for the delivery of agents such as nucleic acids and drugs.

BACKGROUND

Lipid nanoparticles (LNPs) are used to deliver nucleic acids such as messenger RNA (mRNA) to control protein expression in vivo. LNPs are formed through self-assembly of a set of lipid components that include an ionizable lipid. The ionizable lipid contains one or more tertiary amines that become positively charged in acidic conditions to bind nucleic acids and includes hydrophobic regions to promote self-assembly into nano-sized particles. Ionizable LNPs can be designed to have a neutral charge in blood and only acquire a positive charge in acidic compartments such as endosomes, thus reducing the toxicity associated to LNPs with a permanent positive charge. The safety and efficacy of LNPs is dependent on the chemical structure of the ionizable lipid—elements such as the length of carbon chains, inclusion of various functional groups, and overall biodegradability of the structure are important and require significant effort to design and optimize.

A family of ionizable lipids that included amide functional groups with the general formula R—C(=O)—NR' was previously described (Tilstra, Couture-Senecal et al., *Iterative Design of Ionizable Lipids for Intramuscular mRNA Delivery*, J. Am. Chem. Soc., 2023; Khan, Tilstra, Manning, Lau, Couture-Senécal, *Multi-motif dendrons and their supramolecular structures and uses thereof* International patent application S.N. PCT/CA2022/051745 describes amide-containing ionizable lipids. There exists a need for additional ionizable lipids for the delivery of agents such as nucleic acids and drugs.

SUMMARY

The present application discloses a new family of compounds based on ester functional groups with higher potency for intramuscular mRNA delivery and faster pharmacokinetics than an amide-containing lipid analogue. The compounds of the instant disclosure exhibit improved physicochemical properties of ionizable LNPs and their ability to functionally deliver mRNA in vivo.

One aspect of the present disclosure is directed to compounds of Formula I, or salts and/or solvates thereof:

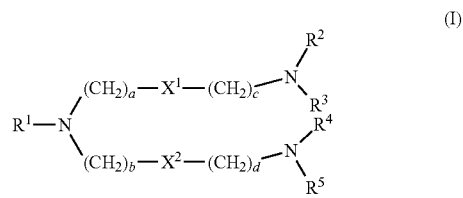

wherein:

$R^1$ is selected from $C_{1-20}$alkyl, $C_{2-20}$alkenyl, $C_{2-20}$alkynyl, $C_{1-20}$alkylenearyl, $C_{1-20}$alkyleneheteroaryl, $C_{1-20}$alkyleneC$_{3-8}$heterocycloalkyl, $C_{1-20}$alkyleneC$_{3-8}$cycloalkyl, $C_{3-8}$heterocycloalkyl, and $C_{3-8}$cycloalkyl, in which each alkyl, alkenyl and alkylene is optionally substituted with one or more of OH, OC$_{1-10}$alkyl, NR$^6$R$^{6'}$, and (NR$^6$C$_{1-10}$alkylene)$_n$NR$^{6'}$R$^{6''}$, and the aryl, heteroaryl, heterocycloalkyl and cycloalkyl groups are additionally optionally substituted with one or more of OH, C$_{1-10}$alkyl, OC$_{1-10}$alkyl, O and NR$^7$R$^{7'}$, and wherein the alkyl is further optionally substituted with NR$^8$R$^{8'}$;

$X^1$ and $X^2$ are same or different and are selected from C(O)O and OC(O);

$R^2$, $R^3$, $R^4$ and $R^5$ are same or different and are selected from $C_{1-50}$alkyl, $C_{2-50}$alkenyl, $C_{1-20}$alkyleneC$_{3-8}$heterocycloalkyl, and $C_{1-20}$alkyleneC$_{3-8}$cycloalkyl, in which each alkyl, alkenyl and alkylene is optionally interrupted by one or more groups selected from S—S, C(O), OC(O), C(O)O, OC(O)O, NR$^9$C(O)O, OC(O)NR$^9$, C(O)S, SC(O), NR$^9$C(O), C(O)NR$^9$, and the alkyl, alkenyl, alkyleneheterocycloalkyl, and alkylenecycloalkyl are optionally substituted with one or more of OH and C$_{1-20}$alkyl;

$R^6$, $R^{6'}$, $R^{6''}$, $R^7$, RT, $R^8$, $R^{8'}$, and $R^9$ are independently selected from H and C$_{1-10}$alkyl;

a, b, c and d are same or different and are selected from 2 to 6; and n is selected from 1 to 4.

A further aspect of the disclosure relates to nanoparticles comprising one or more compounds of the application, a colloid comprising one or more compounds of the application or a supramolecular structure comprising one or more compounds of the application. In some embodiments, the nanoparticle is a lipid nanoparticle (LNP).

A further aspect of the disclosure relates to compositions comprising one or more compounds of the application, as well as one or more nanoparticles, one or more colloids and/or one or more supramolecular structures, each comprising one or more compounds of the application.

In some embodiments, the compositions of the application further comprise one or more agents to be delivered to a cell or subject.

A further aspect of the disclosure relates to a method of delivering one or more agents to a cell or subject comprising contacting the cell or subject with one or more compositions of the application, wherein the cell or subject is to be contacted under conditions to cause uptake of the agent into the cell or subject.

A further aspect of the disclosure relates to kits comprising one or more compounds of the application or one or more compositions of the application.

Other features and advantages of the present application will become apparent from the following detailed description. It should be understood, however, that the detailed description and the specific examples, while indicating embodiments of the application, are given by way of illustration only and the scope of the claims should not be limited by these embodiments but should be given the broadest interpretation consistent with the description as a whole.

DRAWINGS

DETAILED DESCRIPTION

I. Definitions

Figure 1:
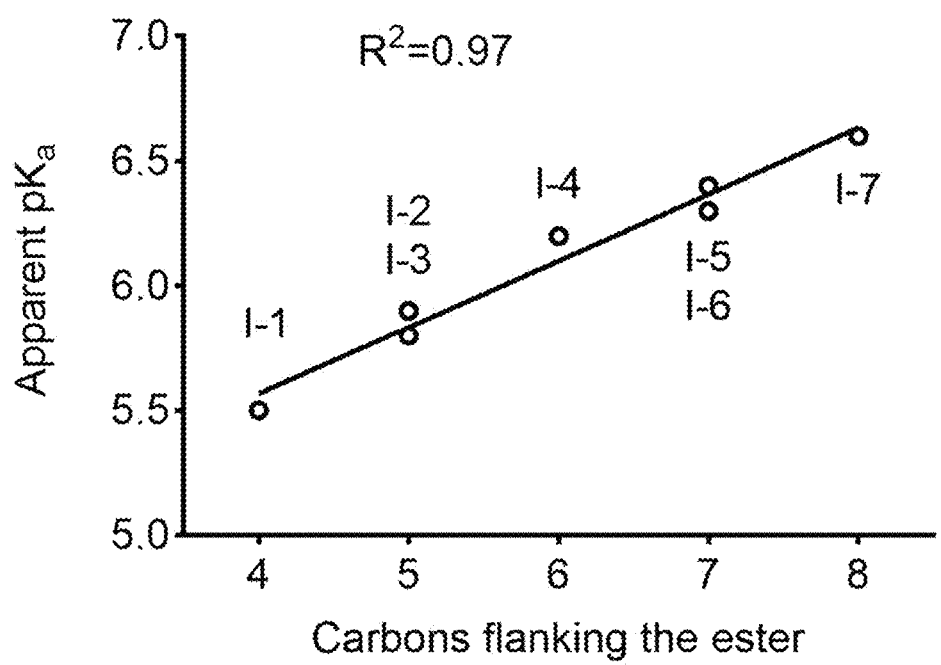
FIG. 1 shows the apparent $pK_a$ of lipid nanoparticles (LNPs) plotted against the number of carbons flanking the ester of exemplary compounds I-1, I-2, I-3, I-4, I-5, I-6, I-7.

Unless otherwise indicated, the definitions and embodiments described in this and other sections are intended to be applicable to all embodiments and aspects of the present application herein described for which they are suitable as would be understood by a person skilled in the art.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

As used in this application and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The term "consisting" and its derivatives as used herein are intended to be closed terms that specify the presence of the stated features, elements, components, groups, integers, and/or steps, and also exclude the presence of other unstated features, elements, components, groups, integers and/or steps.

The term "consisting essentially of", as used herein, is intended to specify the presence of the stated features, elements, components, groups, integers, and/or steps as well as those that do not materially affect the basic and novel characteristic(s) of these features, elements, components, groups, integers, and/or steps.

The terms "about", "substantially" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies or unless the context suggests otherwise to a person skilled in the art.

As used in the present application, the singular forms "a", "an" and "the" include plural references unless the content clearly dictates otherwise. For example, an embodiment including "a compound" should be understood to present certain aspects with one compound, or two or more additional compounds.

In embodiments comprising an "additional" or "second" component or effect, such as an additional or second compound, the second compound as used herein is different from the other compounds or first compound. A "third" compound is different from the other, first, and second compounds, and further enumerated or "additional" compounds are similarly different.

When "one or more" molecules or materials are referenced (such as one or more compounds), it is understood that this is in reference to the "type" or "identity of the molecule or material. Therefore, a second molecule or material is different from the one, or first, molecule or material. Similarly, a "third" molecule or material is different from the one, first, and second molecules or materials, and further enumerated or "additional" molecules or materials are similarly different.

The term "and/or" as used herein means that the listed items are present, or used, individually or in combination. In effect, this term means that "at least one of" or "one or more" of the listed items is used or present. The term "and/or" with respect to enantiomers, prodrugs, salts and/or solvates thereof means that the compounds of the application exist as individual enantiomers, prodrugs, salts and hydrates, as well as a combination of, for example, a salt of a solvate of a compound of the application.

The term "compounds of the application" or "compounds of the present application" and the like as used herein refers to compounds disclosed herein, compounds of Formula I, and salts and/or solvates thereof.

The term "composition of the application" or "composition of the present application" and the like as used herein refers to a composition comprising one or more compounds of the application.

The term "suitable" as used herein means that the selection of the particular compound or conditions would depend on the specific synthetic manipulation to be performed, the identity of the molecule(s) to be transformed and/or the specific use for the compound, but the selection would be well within the skill of a person trained in the art.

The present description refers to a number of chemical terms and abbreviations used by those skilled in the art. Nevertheless, definitions of selected terms are provided for clarity and consistency.

The term "protecting group" or "PG" and the like as used herein refers to a chemical moiety which protects or masks a reactive portion of a molecule to prevent side reactions in those reactive portions of the molecule, while manipulating or reacting a different portion of the molecule. After the manipulation or reaction is complete, the protecting group is removed under conditions that do not degrade or decompose the remaining portions of the molecule. The selection of a suitable protecting group can be made by a person skilled in the art. Many conventional protecting groups are known in the art, for example as described in "Protective Groups in Organic Chemistry" McOmie, J. F. W. Ed., Plenum Press, 1973, in Greene, T. W. and Wuts, P. G. M., "Protective Groups in Organic Synthesis", John Wiley & Sons, 3$^{rd}$ Edition, 1999 and in Kocienski, P. Protecting Groups, 3rd Edition, 2003, Georg Thieme Verlag (The Americas).

The term "inert organic solvent" as used herein refers to a solvent that is generally considered as non-reactive with the functional groups that are present in the compounds to be combined together in any given reaction so that it does not interfere with or inhibit the desired synthetic transformation. Organic solvents are typically non-polar and dissolve compounds that are non-soluble in aqueous solutions.

The term "alkyl" as used herein, whether it is used alone or as part of another group, means straight or branched chain, saturated alkyl groups. The number of carbon atoms that are possible in the referenced alkyl group are indicated by the prefix "$C_{n1-n2}$". For example, the term $C_{1-10}$alkyl means an alkyl group having 1, 2, 3, 4, 5, 6, 7, 8, 9 or 10 carbon atoms. All alkyl groups are optionally fluoro-substituted unless otherwise indicated.

The term "alkylene", whether it is used alone or as part of another group, means straight or branched chain, saturated alkylene group, that is, a saturated carbon chain that contains substituents on two of its ends. The number of carbon atoms that are possible in the referenced alkylene group are indicated by the prefix "$C_{n1-n2}$". For example, the term $C_{2-6}$alkylene means an alkylene group having 2, 3, 4, 5 or 6 carbon atoms. All alkylene groups are optionally fluoro-substituted unless otherwise indicated.

The term "alkenyl" as used herein, whether it is used alone or as part of another group, means straight or branched chain, unsaturated alkyl groups containing at least one double bond. The number of carbon atoms that are possible in the referenced alkylene group are indicated by the prefix "$C_{n1-n2}$". For example, the term $C_{2-6}$alkenyl means an alkenyl group having 2, 3, 4, 5 or 6 carbon atoms and at least one double bond. All alkenyl groups are optionally fluoro-substituted unless otherwise indicated.

The term "alkynyl" as used herein, whether it is used alone or as part of another group, means straight or branched chain, unsaturated alkynyl groups containing at least one triple bond. The number of carbon atoms that are possible in the referenced alkyl group are indicated by the prefix "$C_{n1-n2}$". For example, the term $C_{2-6}$alkynyl means an alkynyl group having 2, 3, 4, 5, or 6 carbon atoms.

The term "aryl" as used herein, whether it is used alone or as part of another group, refers to a monovalent unsaturated aromatic group with an aromatic carbon atom as the point of attachment, said carbon atom forming part of a one or more six-membered aromatic ring structures, wherein the ring atoms are all carbon. Aryl groups can comprise 6 or more carbon atoms. All aryl groups are optionally fluoro-substituted unless otherwise indicated.

The term "cycloalkyl," as used herein, whether it is used alone or as part of another group, means a saturated carbocyclic group containing one or more rings. The number of carbon atoms that are possible in the referenced cycloalkyl group are indicated by the numerical prefix "$C_{n1-n2}$". For example, the term $C_{3-10}$cycloalkyl means a cycloalkyl group having 3, 4, 5, 6, 7, 8, 9 or 10 carbon atoms.

The term "heteroaryl" as used herein, whether it is used alone or as part of another group, refers to cyclic groups containing at least one heteroaromatic ring in which one or more of the atoms are a heteroatom selected from O, S and N. When a heteroaryl group contains the prefix $C_{n1-n2}$ this prefix indicates the number of carbon atoms in the corresponding carbocyclic group, in which one or more, suitably 1 to 5, of the ring atoms is replaced with a heteroatom as defined above.

The term "heterocycloalkyl" as used herein, whether it is used alone or as part of another group, refers to cyclic groups containing at least one non-aromatic ring in which one or more of the atoms are a heteroatom selected from O, S and N. Heterocycloalkyl groups are either saturated or unsaturated (i.e. contain one or more double bonds). When a heterocycloalkyl group contains the prefix $C_{n1-n2}$ this prefix indicates the number of carbon atoms in the corresponding carbocyclic group, in which one or more, suitably 1 to 5, of the ring atoms is replaced with a heteroatom as defined above.

The term "fluoro-substituted" refers to the substitution of one or more, including all, available hydrogens in a referenced group with fluoro.

The terms "halo" or "halogen" as used herein, whether it is used alone or as part of another group, refers to a halogen atom and includes fluoro, chloro, bromo and iodo.

The symbol "⌇" when drawn perpendicularly across a bond indicates a point of attachment of the group The term "available", as in "available hydrogen atoms" or "available atoms" refers to atoms that would be known to a person skilled in the art to be capable of replacement by a substituent, such as a fluorine atom.

It is to be clear that all available hydrogen atoms in the compounds of the application, and all embodiments thereof, are optionally substituted with a fluorine atom unless otherwise indicated.

The term "cell" as used herein refers to a single cell or a plurality of cells and includes a cell either in a cell culture or in a subject.

The term "subject" as used herein refers to any target for delivery of one or more agents using compositions of the application. A subject may be a live subject including all members of the animal and plant kingdoms, or an inanimate object. Thus, the methods and uses of the present application are applicable to human therapy, veterinary therapy, plant applications and material treatment.

The term "pharmaceutically acceptable" means compatible with the treatment of subjects, for example humans.

The term "pharmaceutically acceptable carrier" means a non-toxic solvent, dispersant, excipient, adjuvant or other material which is mixed with the active ingredient in order to permit the formation of a pharmaceutical composition, i.e., a dosage form capable of administration to a subject.

The term "pharmaceutically acceptable salt" means either an acid addition salt or a base addition salt which is suitable for, or compatible with the treatment of subjects.

The term "solvate" as used herein means a compound, or a salt and/or prodrug of a compound, wherein molecules of a suitable solvent are incorporated in the crystal lattice. A suitable solvent is physiologically tolerable at the dosage administered.

The term "treating" or "treatment" as used herein and as is well understood in the art, means an approach for obtaining beneficial or desired results, including clinical results. Beneficial or desired clinical results can include, but are not limited to alleviation or amelioration of one or more symptoms or conditions, diminishment of extent of disease, stabilized (i.e. not worsening) state of disease, preventing spread of disease, delay or slowing of disease progression, amelioration or palliation of the disease state, diminishment of the reoccurrence of disease, and remission (whether partial or total), whether detectable or undetectable. "Treating" and "treatment" can also mean prolonging survival as compared to expected survival if not receiving treatment. "Treating" and "treatment" as used herein also include prophylactic treatment. For example, a subject with early cancer can be treated to prevent progression, or alternatively a subject in remission can be treated with a compound or composition of the application to prevent recurrence. Treatment methods comprise administering to a subject a therapeutically effective amount of one or more of the compounds of the application and optionally consist of a single administration, or alternatively comprise a series of administrations.

"Palliating" a disease or disorder means that the extent and/or undesirable clinical manifestations of a disorder or a disease state are lessened and/or time course of the progression is slowed or lengthened, as compared to not treating the disorder.

The term "prevention" or "prophylaxis", or synonym thereto, as used herein refers to a reduction in the risk or probability of a patient becoming afflicted with a disease, disorder or condition.

As used herein, the term "effective amount" or "therapeutically effective amount" means an amount of a compound, or one or more compounds, of the application that is effective, at dosages and for periods of time necessary to achieve the desired result.

By "inhibiting, blocking and/or disrupting" it is meant any detectable inhibition, block and/or disruption in the presence of a compound compared to otherwise the same conditions, except for in the absence in the compound.

The term "administered" as used herein means administration of a therapeutically effective amount of a compound, or one or more compounds, or a composition of the application to a cell, a tissue or an organ either in vivo, in vitro or ex vivo.

The term "encapsulation efficiency" refers to the fraction of an agent to be encapsulated in a particle, such as a nanoparticle, that is confined inside nanoparticles.

As used herein, the term "nanoparticle", "nanoparticles" or variants thereof is intended to mean particles whose size is measured on a nanometer scale.

The term "colloid" as used herein refers to a mixture in which microscopically dispersed insoluble particles are suspended throughout another substance, typically a liquid.

The term "supramolecular structure" as used herein refers to a complex of molecules held together by non-covalent bonds.

The term "apparent $pK_a$" refers to an experimentally determined value of nanoparticles. This value is the pH at which the numbers of ionized (protonated) and deionized groups are equal in the system. The $pK_a$ value will depend on the measurement method used. Apparent $pK_a$ numbers for nanoparticles, including LNPs, reported herein are as determined using the 2-(-toluidino naphthalene-6-sulfonic acid (TNS) assay, for example as described herein.

The term "lipid molecular $pK_a$" as used herein refers to a calculated estimate of a $pK_a$ associated with a lipid molecule. Lipid molecular $pK_a$ numbers reported herein are as calculated using MarvinSketch version 22.22.

The term "base hydrolysis rate" as used herein refers to an experimentally determined value of the compounds of the application. This value is the rate at which the compounds of the application are degraded or the rate at which the hydrolysis products are formed in soluble conditions in the presence of base. The base hydrolysis rate value will depend on the measurement method used. Rate values reported herein are as determined using the method reported herein.

Compounds and Compositions

The present application includes a compound of Formula I, or a salt and/or a solvate thereof:

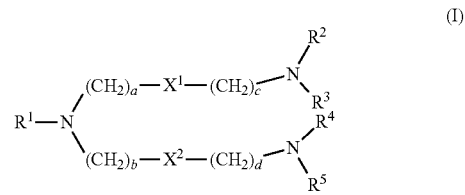

wherein:
$R^1$ is selected from $C_{1-20}$alkyl, $C_{2-20}$alkenyl, $C_{2-20}$alkynyl, $C_{1-20}$alkylenearyl, $C_{1-20}$alkyleneheteroaryl, $C_{1-20}$alkylene$C_{3-8}$heterocycloalkyl, $C_{1-20}$alkylene$C_{3-8}$cycloalkyl, $C_{3-8}$heterocycloalkyl, and $C_{3-8}$ cycloalkyl, in which each alkyl, alkenyl and alkylene is optionally substituted with one or more of OH, $OC_{1-10}$alkyl, $NR^6R^{6\prime}$, and $(NR^6C_{1-10}$alkylene$)_nNR^6R^{6\prime\prime}$, and the aryl, heteroaryl, heterocycloalkyl and cycloalkyl groups are additionally optionally substituted with one or more of OH, $C_{1-10}$alkyl, $OC_{1-10}$alkyl, O and $NR^7R^{7\prime}$, and wherein the alkyl is further optionally substituted with $NR^8R^{8\prime}$;

$X^1$ and $X^2$ are same or different and are selected from C(O)O and OC(O);

$R^2$, $R^3$, $R^4$ and $R^5$ are same or different and are selected from $C_{1-50}$alkyl, $C_{2-50}$alkenyl, $C_{1-20}$alkylene$C_{3-8}$heterocycloalkyl, and $C_{1-20}$alkylene$C_{3-8}$cycloalkyl, in which each alkyl, alkenyl and alkylene is optionally interrupted by one or more groups selected from S—S, C(O), OC(O), C(O)O, OC(O)O, $NR^9$C(O)O, OC(O)$NR^9$, C(O)S, SC(O), $NR^9$C(O), C(O)$NR^9$, and the alkyl, alkenyl, alkyleneheterocycloalkyl, and alkylenecycloalkyl are optionally substituted with one or more of OH and $C_{1-20}$alkyl;

$R^6$, $R^{6\prime}$, $R^{6\prime\prime}$, $R^7$, $R^{7\prime}$, $R^8$, $R^{8\prime}$, and $R^9$ are independently selected from H and $C_{1-10}$alkyl;

a, b, c and d are same or different and are selected from 2 to 6; and n is selected from 1 to 4.

In some embodiments, a, b, c and d are different. In some embodiments, a and b are the same and c and d are the same. In some embodiments, a, b, c and d are the same.

In some embodiments, a, b, c and d are all 2. In some embodiments, a+c≥5 and b+d≥5. In some embodiments, a is 2 and c is 3, 4, 5 or 6, and b is 2 and d is 3, 4, 5 or 6. In some embodiments, a, b, c and d are selected from 2 and 3. In some embodiments, c is 2 and a is 3, 4, 5 or 6, and d is 2 and b is 3, 4, 5 or 6. In some embodiments, a, b, c and d are selected from 3 and 4. In some embodiments, a, b, c and d are all 3. In some embodiments, a is 3 and c is 4, 5 or 6, and b is 3, and d is 4, 5 or 6. In some embodiments, c is 3 and a is 4, 5 or 6, and d is 3, and b is 4, 5 or 6. In some embodiments, a, b, c and d are all 4. In some embodiments, a is 4 and c is 5 or 6, and b is 4, and d is 5 or 6. In some embodiments, c is 4 and a is 5 or 6, and d is 4, and b is 5 or 6. In some embodiments, a, b, c and d are all 5. In some embodiments, a is 5 and c is 6, and b is 5, and d is 6. In some embodiments, c is 5 and a is 6, and d is 5, and b is 6.

In some embodiments, $X^1$ and $X^2$ are the same. In some embodiments, $X^1$ and $X^2$ are C(O)O. In some embodiments, $X^1$ and $X^2$ are OC(O).

In some embodiments, $R^1$ is selected from $C_{1-10}$alkyl, $C_{2-10}$alkenyl, $C_{2-10}$alkynyl, $C_{1-10}$alkylenearyl, $C_{1-10}$alkyleneheteroaryl, $C_{1-10}$alkylene$C_{3-8}$heterocycloalkyl, $C_{1-10}$alkylene$C_{3-8}$cycloalkyl, $C_{3-8}$heterocycloalkyl, and $C_{3-8}$cycloalkyl, in which each alkyl, alkenyl and alkylene is optionally substituted with one to four of OH, $OC_{1-5}$alkyl, $NR^6R^{6'}$, and $(NR^6C_{1-5}$alkylene$)_n NR^{6''}R^{6'''}$ and the aryl, heteroaryl, heterocycloalkyl and cycloalkyl groups are additionally optionally substituted with one to four of OH, $C_{1-5}$alkyl, $OC_{1-5}$alkyl, O and $NR^7R^{7'}$, and wherein the alkyl is further optionally substituted with $NR^8R^{8'}$.

In some embodiments, $R^1$ is selected from $C_{1-10}$alkyl, $C_{2-10}$alkenyl, $C_{2-10}$alkynyl, $C_{1-10}$alkylenephenyl, $C_{1-10}$alkyleneheteroaryl, $C_{1-10}$alkylene$C_{3-8}$heterocycloalkyl, $C_{1-10}$alkylene$C_{3-8}$cycloalkyl, $C_{3-8}$heterocycloalkyl, and $C_{3-8}$cycloalkyl, in which each alkyl, alkenyl and alkylene is optionally substituted with one or two of OH, $OC_{1-3}$alkyl, $NR^6R^{6'}$, and $(NR^6C_{1-5}$alkylene$)_n NR^{6''}R^{6'''}$ and the aryl, heteroaryl, heterocycloalkyl and cycloalkyl groups are additionally optionally substituted with one or two of OH, $C_{1-5}$alkyl, $OC_{1-3}$alkyl, O and $NR^7R^{7'}$, and wherein the alkyl is further optionally substituted with $NR^8R^{8'}$. In some embodiments, $R^6$, $R^{6'}$, $R^{6'''}$, $R^7$, $R^{7'}$, R, and $R^{8'}$ are independently selected from H and $C_{1-5}$alkyl. In some embodiments, n is 1 or 2.

In some embodiments, $R^1$ is selected from:

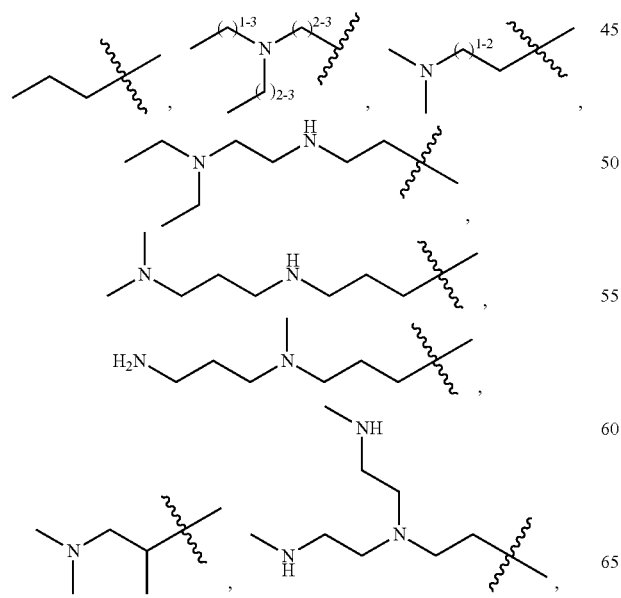

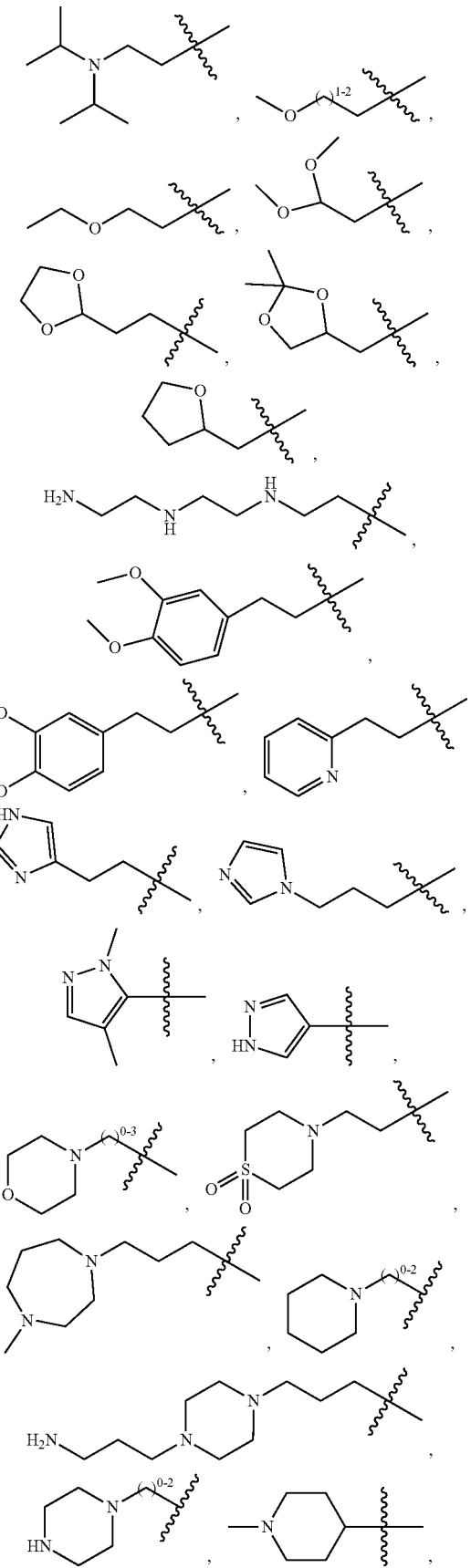

-continued

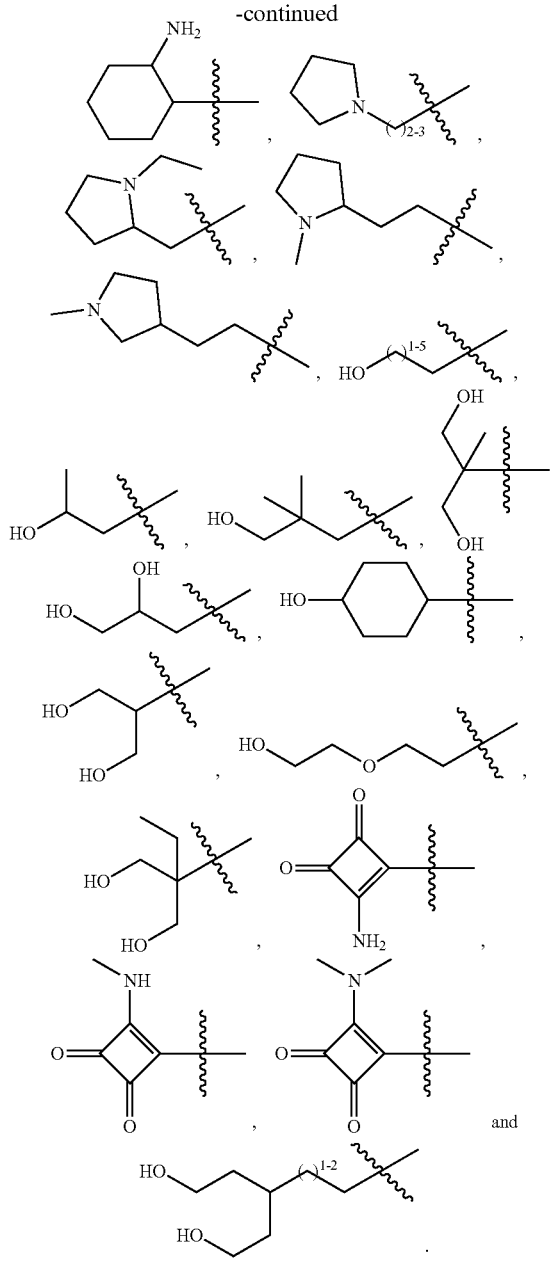

In some embodiments, $R^1$ is

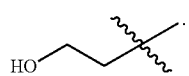

In some embodiments, $R^2$, $R^3$, $R^4$ and $R^5$ are same or different and are selected from $C_{1-50}$alkyl, $C_{2-50}$alkenyl, $C_{1-20}$alkylene$C_{3-8}$heterocycloalkyl, and $C_{1-20}$alkylene $C_{3-8}$cycloalkyl, in which each alkyl, alkenyl and alkylene is optionally interrupted by one to four groups selected from S—S, C(O), OC(O), C(O)O, OC(O)O, NR$^9$C(O)O, OC(O)NR$^9$, C(O)S, SC(O), NR$^9$C(O), C(O)NR$^9$, and the alkyl, alkenyl, alkyleneheterocycloalkyl, and alkylenecycloalkyl are optionally substituted with one to four of OH and $C_{1-10}$alkyl. In some embodiments, $R^9$ are independently selected from H and $C_{1-5}$alkyl.

In some embodiments, $R^2$, $R^3$, $R^4$ and $R^5$ are different. In some embodiments, $R^2$ and $R^3$ are same and $R^4$ and $R^5$ are same. In some embodiments, $R^2$, $R^3$, $R^4$ and $R^5$ are same.

In some embodiments, $R^2$, $R^3$, $R^4$ and $R^5$ are selected from:

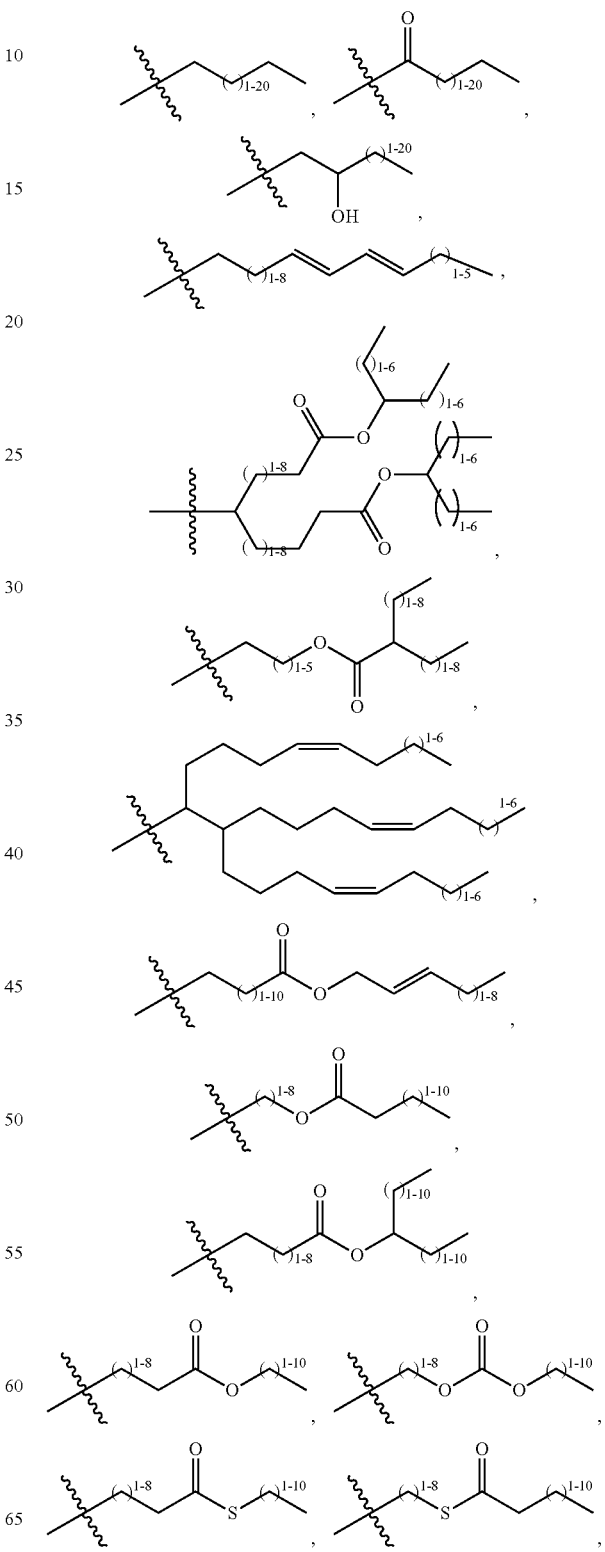

-continued
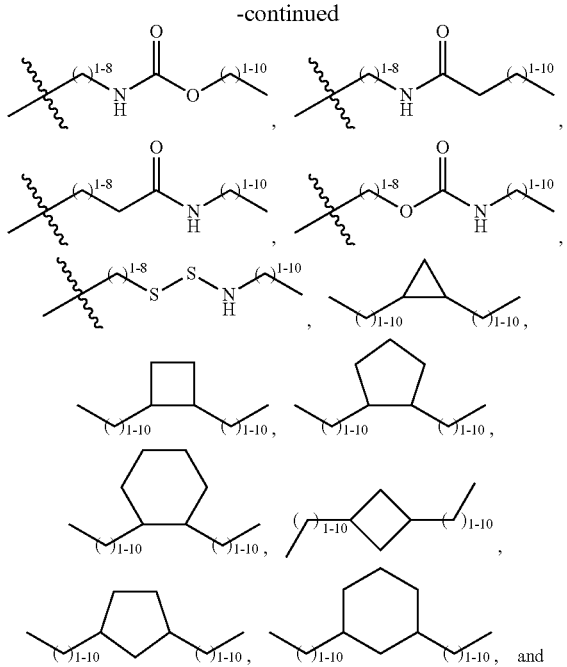
and the alkyl, alkenyl, alkyleneheterocycloalkyl, and alkylenecycloalkyl are optionally substituted with one or two of OH and $C_{1-10}$alkyl.
In some embodiments, $R^2$, $R^3$, $R^4$ and $R^5$ are selected from
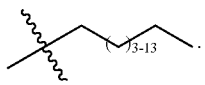
In some embodiments, all $R^2$, $R^3$, $R^4$ and $R^5$ are
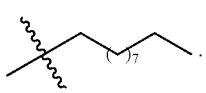
In some embodiments, the compound of Formula I is selected from:
| Compound | Structure |
|---|---|
| I-1 | 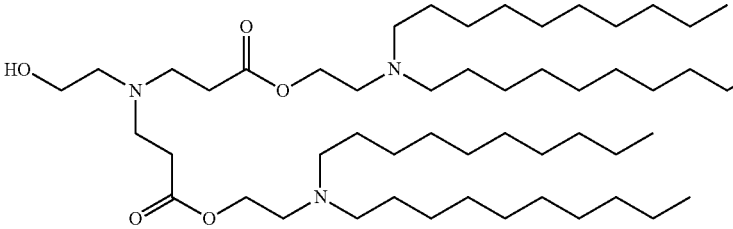 |
| I-2 | 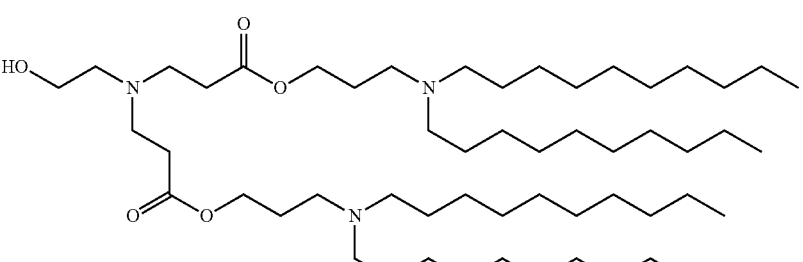 |
| I-3 | 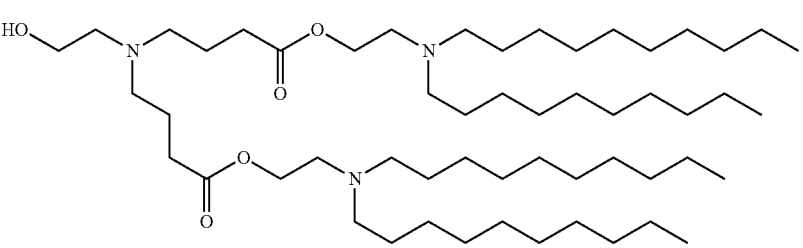 [SMILES: CCCCCCCCCCN(CCCCCCCCCC)CCOC(=O)CCCN(CCO)CCCC(=O)OCCN(CCCCCCCCCC)CCCCCCCCCC] |

-continued

| Compound | Structure |
|---|---|
| I-4 | |
| I-5 | |
| I-6 | |
| I-7 | |
| I-8 | |

| Compound | Structure |
|---|---|
| I-9 | (structure) |
| I-10 | (structure), and |
| I-11 | (structure) | or a salt and/or solvate thereof.

In some embodiments, the compound is selected from the group consisting of:

| Compound | Structure |
|---|---|
| I-4 | (structure) |

-continued

| Compound | Structure |
|---|---|
| I-5 | (structure) |
| I-6 | (structure) |
| I-8 | (structure) |
| I-12 | (structure) |

In some embodiments, the compounds of the application have a base hydrolysis rate greater than 0.001 min$^{-1}$. In some embodiments, the compounds of the application have a base hydrolysis rate less than 1 hour. In some embodiments, the compounds of the application have a base hydrolysis rate of about 0.001 min$^{-1}$ to about 1 min$^{-1}$. In some embodiments, the compounds of the application have a base hydrolysis rate of about 0.01 min to about 1 hour. It has been shown that the in vitro degradation rate is dependent on the distance between the ester and nearby electron-withdrawing groups and sterically-hindered groups. The compounds of the application, which have multiple carbons in the linker between the ester and the tertiary amines have been shown to have an increased in vitro degradation rate as compared to gold-standard lipids DLin-MC3-DMA, SM-102 and ALC-0315. In some embodiments, the hydrolysis rate is measured by base (e.g. KOH) hydrolysis reactions in an alcoholic solvent (e.g. methanol) and monitored using $^1$H NMR, however any other methods known in the art can also be used.

The present application also includes compositions comprising one or more compounds of the application. In some embodiments, the compounds of the application are incorporated into a nanoparticle in the compositions. Therefore, the present application also includes a nanoparticle comprising one or more compounds of the application. The present application also includes compositions comprising these nanoparticles. In some embodiments, the nanoparticles are formed by self-assembly of the one or more compounds. In some embodiments, the nanoparticles comprise two or more compounds of the application. In some embodiments, the nanoparticles are lipid nanoparticles (LNPs).

In some embodiments, the LNPs include one or more ionizable lipids (one or more compounds of the application), one or more bi-layer-forming lipids, one or more structural lipids and one or more lipid-conjugated polyethylene glycols (PEG-lipids).

In some embodiments, the nanoparticles have a maximum longest straight dimension (e.g., diameter) of 200 nm or more. In some embodiments, the nanoparticles have a maximum longest straight dimension (e.g., diameter) of 200 nm or less. In some embodiments, the nanoparticles have a mean diameter of about 150 nm, about 125 nm, about 100 nm, about 90 nm, about 80 nm, about 70 nm, about 60 nm or less. In some embodiments, the nanoparticles have a mean diameter of 50 nm or less. In some embodiments, the nanoparticles have a mean diameter of 40 nm or less, 30 nm or less, 20 nm or less, 10 nm or less, or 5 nm or less. Thus, in some embodiments, the nanoparticles have a mean diameter of about 1 nm to about 50 nm, about 5 nm to about 30 nm, about 10 nm to about 25 nm, about 10 nm to about 20 nm, or about 15 nm to about 20 nm. In some embodiments, the nanoparticles disclosed herein have a mean diameter of about 150 nm, about 100 nm, about 90 nm, about 80 nm, about 70 nm, about 60 nm, about 50 nm, about 40 nm, about 30 nm, about 20 nm, about 15 nm, about 10 nm, or about 5 nm. In some embodiments, the mean diameter is determined using dynamic light scattering intensity.

In some embodiments, one or more compounds of the application form colloids or supramolecular structures. Therefore, in some embodiments, the present application also includes a colloid comprising one or more compounds of the application or a supramolecular structure comprising one or more compounds of the application, as well as compositions comprising these colloids or supramolecular structures.

The present application also includes compositions comprising one or more compounds of the application and one or more agents to be delivered to a cell or subject. In some embodiments, the one or more agents to be delivered to a cell or subject are selected from unmodified or modified nucleic acids, mitochondrion, plasmids, PolyIC and related adjuvants, ribonucleoproteins, proteins, peptides, cells, stains, dyes, small molecule drugs and other organic and inorganic moieties. In some embodiments, the one or more agents to be delivered to a cell or subject are called a payload.

The present application also includes compositions comprising one or more compounds of the application and one or more therapeutic agents to be delivered to a cell or subject. In some embodiments, the one or more therapeutic agents to be delivered to a cell or subject are selected from unmodified or modified nucleic acids, mitochondrion, plasmids, PolyIC and related adjuvants, ribonucleoproteins, proteins, peptides, cells, stains, dyes, small molecule drugs and other organic and inorganic moieties. In some embodiments, the one or more therapeutic agents to be delivered to a cell or subject are called a payload. In some embodiments, the one or more therapeutic agents to be delivered to a cell or subject comprise a payload.

In some embodiments, the one or more agents to be delivered to a cell or a subject have an overall negative charge.

In some embodiments, the one or more agents to be delivered to a cell or a subject are located within a nanoparticle, colloid or supramolecular structure comprising one or more compounds of the application. By located within it is understood that the one or more agents are encapsulated within the nanoparticle, colloid or supramolecular structure and/or are non-covalently associated with any portion of the one or more compounds making up the nanoparticle, colloid or supramolecular structure.

In some embodiments, the proteins and peptides are selected from endonucleases, meganucleases, protease and kinases.

In some embodiments, the one or more agents to be delivered to a cell or a subject are one or more nucleic acids. In some embodiments, the one or more nucleic acids are selected from a short interfering RNA (e.g. small interfering RNA) (siRNA), circular RNA, cyclic RNA, long noncoding RNA (lncRNA), a microRNA (miRNA), a pri-miRNA, a messenger RNA (mRNA), a cluster regularly interspaced short palindromic repeats (CRISPR) related nucleic acid, a single guide RNA (sgRNA), a CRISPR-RNA (crRNA), a trans-activating crRNA (tracrRNA), a plasmid DNA (pDNA), a transfer RNA (tRNA), an antisense oligonucleotide (ASO), a guide RNA, a double stranded DNA (dsDNA), a single stranded DNA (ssDNA), exDNA, proform RNA, a single stranded RNA (ssRNA), and a double stranded RNA (dsRNA). In some embodiments, the one or more nucleic acids are selected from a siRNA, a tRNA, and a nucleic acid which is used in a CRISPR process. In some embodiments, the nucleic acid is a siRNA. In some embodiments, the nucleic acid which is used in a CRISPR process is a cluster regularly interspaced short palindromic repeats (CRISPR) related nucleic acid, a single guide RNA (sgRNA), a CRISPR-RNA (crRNA), and/or a trans-activating crRNA (tracrRNA). In some embodiments, the nucleic acid is a miRNA. In some embodiments, the nucleic acid is a mRNA. In some embodiments, the nucleic acid is a tRNA. In some embodiments, the nucleic acid is a guide RNA. In some embodiments, the guide RNA is used in CRISPR processes. In some embodiments, the nucleic acid is a pDNA.

In some embodiments the compositions of the application are for use in gene editing. In some embodiments, these compositions comprise cas9 mRNA and one or more guide RNA (gRNA) designed to target specific gene. In some embodiments these compositions further comprise DNA or are formulated for co-delivery with DNA, for homologous directed repair.

In some embodiments, the compositions of the application are for use in gene silencing. In some embodiments, these compositions comprise siRNA.

In some embodiments, the compositions of the application are for gene regulation. In some embodiments, these compositions comprise non-coding RNA (ncRNA).

In some embodiments, the compositions of the application are for gene expression upregulation or gene expression downregulation. In some embodiments, these compositions comprise unmodified or chemically modified messenger RNA (mRNA). In some embodiments, chemically modified mRNA refers to the partial or complete substitution of nucleotides with chemically modified nucleotides.

In some embodiments, the compositions of the application are for antiviral treatment. In some embodiments, these compositions comprise mRNA encoding the Ca9 protein, and one or more sgRNAs. In some embodiments, the one or more sgRNAs identify viral genes for deletion.

In some embodiments, the compounds and the one or more agents to be delivered to a cell or subject are present in a weight ratio from about 100:1 to about 1:5. In some embodiments, the weight ratio of compound to one or more agents to be delivered to a cell or subject is from about 50:1 to about 2:1. In some embodiments, the weight ratio of compound to one or more agents to be delivered to a cell or subject is 20:1.

In some embodiments, the composition further comprises one or more lipids. In some embodiments, the one or more lipids are selected from a steroid, a steroid derivative, a PEG-lipid, and a phospholipid, and mixtures thereof.

In some embodiments, the PEG-lipid is a compound which contains one or more $C_{6-24}$alkyl or $C_{6-24}$alkenyl groups or a $C_{6-24}$ fatty acid group attached to a linker group with a PEG chain. Some non-limiting examples of a PEG-lipid include a PEG-modified phosphatidylethanolamine, a PEG-modified phosphatidic acid, a PEG-ceramide conjugate, PEG-modified dialkylamine, PEG-modified 1,2-diacyloxypropan-3-amine, PEG-modified diacylglycerols and/or dialkylglycerols.

In some embodiments, the PEG-lipid is a PEG-modified 1,2-dimyristoyl-sn-glycero-3-phosphoethanolamine, a PEG-modified 1,2-distearoyl-sn-glycero-3-phosphoethanolamine, a PEG-modified 1,2-dioleoyl-sn-glycero-3-phosphoethanolamine, a PEG modified 1,2-dimyristoyl-sn-glycero-3-phosphoethanolamine, a PEG-modified 1,2-distearoyl-sn-glycero-3-phosphoethanolamine, a PEG-modified 1,2-dimyristoyl-rac-glycero-3-methoxypolyethylene glycol and/or a PEG-modified distearoyl-rac-glycerol.

In some embodiments, the PEG is measured by the molecular weight of PEG component of the lipid. In some embodiments, the PEG has a molecular weight from about 100 to about 15,000. In some embodiments, the molecular weight is from about 200 to about 10000, from about 400 to about 8000, from about 1000 to about 6000, or from about 2000 to about 5000. In some embodiments, the molecular weight of the PEG is from about 100, 200, 400, 500, 600, 800, 1,000, 1,250, 1,500, 1,750, 2,000, 2,250, 2,500, 2,750, 3,000, 3,500, 4,000, 4,500, 5,000, 6,000, 7,000, 8,000, 9,000, 10,000, 12,500, to about 15,000. Some non-limiting examples of lipids that may be used herein are taught by U.S. Pat. No. 5,820,873, WO 2010/141069, or U.S. Pat. No. 8,450,298, which is incorporated herein by reference.

In some embodiments, the compositions comprise a molar ratio of the PEG-lipid to the compounds from about 1:1 to about 1:400 or 1:1 to about 1:250. In some embodiments, the molar ratio is from about 1:1, 1:10, 1:20, 1:30, 1:40, 1:50, 1:60, 1:70, 1:80, 1:90, 1:100, 1:110, 1:120, 1:125, 1:150, 1:175, 1:200, 1:225, to about 1:250 or any range derivable therein. In some embodiments the PEG-lipid is present at 0 to 50 mol % of total lipids in the composition or any range derivable therein. In some embodiments, the PEG-lipid is present at 0 mol %, 1.5 mol %, 3 mol %, 10 mol %, 15 mol %, 20 mol % or 40 mol % or any range derivable therein.

In some embodiments, the structural lipid is a steroid or steroid derivative. In some embodiments, the steroid or steroid derivative is unmodified or modified cholesterol, a phytosterol, cholecalciferol, dexamethasone, or any combination thereof. In some embodiments, modified cholesterol is oxidized on the beta-ring or on the hydrocarbon tail structure. In another embodiment, phytosterols include but are not limited to 0-sitosterol, stigmasterol, β-sitostanol, campesterol, brassicasterol, salts and esters thereof. In some embodiments, the structural lipid and the compounds are present in the composition in a molar ratio from 2:1 to 1:20, or any range derivable therein. In some embodiments the structural lipid is present at 0 to 50 mol % of total lipids in the composition or any range derivable therein.

In some embodiments, bilayer-forming lipids are composed of naturally-occurring lipids or of synthetic origin, including phospholipids, sphingolipids and glycolipids. Phospholipids include but are not limited to 1,2-distearoyl-sn-glycero-3-phosphocholine (DSPC) and 1,2-dioleoyl-sn-glycero-3-phosphoethanolamine (DOPE). In one embodiment, the sphingolipid is sphingomyelin. In some embodiments, the bilayer-forming lipid and the compounds are present in the composition in a molar ratio from 2:1 to 1:20, or any range derivable therein. In some embodiments the bilayer-forming lipid is present at 0 to 50 mol %, or up to 50 mol % of total lipids, or any range derivable therein.

In some embodiments, the application includes a composition comprising one or more compounds of the application, one or more PEG-lipids, one or more phospholipids, and one or more steroids. In some embodiments, the one or more compounds are present in an amount of about 45 mol % to about 55 mol %, the one or more phospholipids are present in an amount of about 5 mol % to about 15 mol %, the one or more PEG-lipids are present in an amount of about 0.5 mol % to about 2.5 mol % and the one or more steroids are present in an amount of about 28 mol % to about 48 mol %. In some embodiments, the one or more compounds are present in an amount of about 50 mol %, the one or more phospholipids are present in an amount of about 38.5 mol %, the one or more PEG-lipids are present in an amount of about 1.5 mol % and the one or more steroids are present in an amount of about 10 mol %.

In some embodiments, the application includes a composition comprising one or more compounds of the application, one or more PEG-lipids, one or more phospholipids, one or more steroids and one or more agents to be delivered. In some embodiments, the steroid is cholesterol. In some embodiments, the steroid is β-sitosterol.

In some embodiments, when lipids are present in a composition comprising one or more agents to be delivered, the one or more agents to be delivered to a cell or subject are present in a weight ratio of the one or more compounds plus lipids:agent(s) of from about 100:1 to about 1:5, about 50:1 to about 2:1 or about 25:1. In some embodiments, the mol % ratio of the one or more compounds plus lipids:agent(s) is in the range of about 95 mol %:5 mol % to about 80 mol %:20 mol %.

In some embodiments, when the one or more agents to be delivered is RNA, the compositions comprise a lipid nitrogen to RNA phosphate ratio (N/P) of from about 13 to about 14.

The present application also includes a pharmaceutical composition comprising: a composition or compounds of the application and a pharmaceutically acceptable carrier.

In some embodiments, the pharmaceutical acceptable carrier is a solvent or solution. In some embodiments, the pharmaceutical composition is formulated for administration: orally, intraadiposally, intraarterially, intraarticularly, intracranially, intradermally, intralesionally, intramuscularly, intranasally, intraocularly, intrapericardially, intraperitoneally, intrapleurally, intraprostatically, intrarectally, intrathecally, intratracheally, intratumorally, intraumbilically, intravaginally, intravenously, intravesicularlly, intravitreally, liposomally, locally, mucosally, parenterally, rectally, subconjunctival, subcutaneously, sublingually, topically, transbuccally, transdermally, vaginally, in cremes, in lipid compositions, via a catheter, via a lavage, via continuous infusion, via infusion, via inhalation, via injection, via local delivery, or via localized perfusion. In some embodiments, the pharmaceutical composition is formulated for intravenous or intraarterial injection. In some embodiments, the pharmaceutical composition is formulated as a unit dose. In some embodiments, the pharmaceutical composition is formulated for administration intramuscularly.

In some embodiments, the compositions and pharmaceutical compositions of the application have at pH of about 2 to about 8.5. In some embodiments, the composition is formulated in 10 to 100 mM sodium acetate at pH 3, 4, 5 or 6. It is to be understood that the pH of the compositions of the application may be any suitable pH during preparation and storage. However, for delivery of the compositions of the application to a cell or subject, the pH is adjusted to be physiologically acceptable, such as a pH of about 7. In some embodiments, the compositions and pharmaceutical compositions of the application have a polydispersity index (PDI) of less than 0.2.

In some embodiments, the compositions and pharmaceutical compositions of the application have an apparent $pK_a$ of about 4 to about 8. In some embodiments, the compositions and pharmaceutical compositions of the application have an apparent $pK_a$ of about 5 to about 7 or about 5.5 to about 7.5. In some embodiments, the compositions and pharmaceutical compositions of the application have an apparent $pK_a$ of about 6 to about 7. In some embodiments, the compositions and pharmaceutical compositions of the application have an apparent $pK_a$ of about 6.5. In some embodiments, the apparent $pK_a$ value is dependent on the measurement method. In some embodiments, the apparent $pK_a$ value is determined using 2-(p-toluidino) naphthalene-6-sulfonic acid (TNS) assay, however any other methods known in the art can also be used. If another method is used to determine the apparent $pK_a$, the value of the apparent $pK_a$ may be different from the value obtained using the TNS assay.

In some embodiments, the LNPs have an apparent $pK_a$ of about 4 to about 8. In some embodiments, the LNPs have an apparent $pK_a$ of about 5 to about 7 or about 5.5 to about 7.5. In some embodiments, the LNPs have an apparent $pK_a$ of about 6 to about 7. In some embodiments, the LNPs have an apparent $pK_a$ of about 6.5. The apparent pKa as defined in the present application allows the LNPs to have a neutral charge in blood and a positive charge in acidic compartments such as endosomes. In some embodiments the pKa advantageously reduces toxicity, for example in comparison with LNPs having a permanent positive charge. In some embodiments, the apparent $pK_a$ value of the LNPs is determined using 2-(p-toluidino) naphthalene-6-sulfonic acid (TNS) assay, however any other methods known in the art can also be used. If another method is used to determine the apparent pKa, the value of the apparent pKa may be different from the value obtained using the TNS assay. The apparent pKa of the nanoparticles, such as for example LNPs, is determined based on the zeta potential (surface charge) of the nanoparticle, and is a function of the nanoparticle's pH (Carrasco, M. J. et al. Ionization and structural properties of mRNA lipid nanoparticles influence expression in intramuscular and intravascular administration. Commun Biology 4, 956, 2021). In some embodiments, the apparent pKa of LNPs is correlated with their effectiveness (Jayaraman, M. et al. Maximizing the Potency of siRNA Lipid Nanoparticles for Hepatic Gene Silencing In Vivo. *Angewandte Chemie Int Ed* 51, 8529-8533 (2012); Tilstra, G. et al. Iterative Design of Ionizable Lipids for Intramuscular mRNA Delivery. *J Am Chem Soc* (2023)).

In some embodiments, the application includes a LNP comprising one or more compounds of the application, wherein a, b, c, and d are each selected from 2 and 3 and the LNP has an apparent $pK_a$ of about 5.5 to about 6.0.

In some embodiments, the application includes a LNP comprising one or more compounds of the application, wherein a, b, c, and d are each selected from 3 and 4 and the LNP has an apparent $pK_a$ of about 6.0 to about 6.6.

In some embodiments, the application includes a LNP comprising one or more compounds of the application, wherein a, b, c, and d are each selected from 2 and 4 and the LNP has an apparent $pK_a$ of about 5.5 to about 6.6. In some embodiments, the application includes a LNP comprising one or more compounds of the application, wherein a, b, c, and d are each selected from 4, 5 and 6 and the LNP has an apparent $pK_a$ of ≥6.6.

In some embodiments, the compounds of the application have a lipid molecular $pK_a$ of about 7 to about 11. In some embodiments, the compounds of the application have a lipid molecular $pK_a$ of about 8 to about 11. In some embodiments, the value of the lipid molecular $pK_a$ is dependent on the calculation method. In some embodiments, the lipid $pK_a$ value is calculated by using MarvinSketch, however any other calculation methods known in the art can also be used. If another method is used to determine the lipid $pK_a$, the value of the lipid molecular $pK_a$ may be different from the value obtained using MarvinSketch.

In some embodiments, the compositions and pharmaceutical compositions of the application comprise one or more compounds of the application with a lipid molecular $pK_a$ of about 7 to about 11. In some embodiments, the compositions and pharmaceutical compositions of the application comprise one or more compounds of the application with a lipid molecular $pK_a$ of about 8 to about 11.

In some embodiments, the LNPs comprise one or more compounds of the application with a lipid molecular $pK_a$ of about 7 to about 11. In some embodiments, the LNPs comprise one or more compounds of the application with a lipid molecular $pK_a$ of about 8 to about 11. In some embodiments, the value of the lipid molecular $pK_a$ is dependent on the calculation method. In some embodiments, the lipid $pK_a$ value is calculated by using MarvinSketch, however any other calculation methods known in the art can also be used. If another method is used to determine the lipid molecular pKa, the value of the lipid pKa may be different from the value obtained using MarvinSketch.

In some embodiments, the one or more compounds of the application, wherein a, b, c, and d are each selected from 2 and 3, have a lipid molecular $pK_a$ of about 8.3 to about 9.3. In some embodiments, the application includes a LNP comprising one or more compounds of the application, wherein a, b, c, and d are each selected from 2 and 3 and the one or more compounds have a lipid molecular $pK_a$ of about 8.3 to about 9.3.

In some embodiments, the one or more compounds of the application, wherein a, b, c, and d are each selected from 3 and 4, have a lipid molecular $pK_a$ of about 8.5 to about 10. In some embodiments, the application includes a LNP comprising one or more compounds of the application, wherein a, b, c, and d are each selected from 3 and 4 and the one or more compounds have a lipid molecular $pK_a$ of about 8.5 to about 10.

In some embodiments, the one or more compounds of the application, wherein a, b, c, and d are each selected from 4, 5 and 6, have a lipid molecular $pK_a$ of about of ≥9.4. In some embodiments, the application includes a LNP comprising one or more compounds of the application, wherein a, b, c, and d are each selected from 4, 5 and 6 and the one or more compounds have a lipid molecular $pK_a$ of ≥9.4.

In some embodiments, the composition and pharmaceutical compositions of the application have an encapsulation efficiency of above about 70%, above about 80% or above about 90%. In some embodiments, the encapsulation efficiency is above about 93%. In some embodiments, the encapsulation efficiency is above about 95%.

The present also includes kits. Any of the components disclosed herein may be combined in the form of a kit. In some embodiments, the kits comprise a compound or a composition as described above.

The kits will generally include at least one vial, test tube, flask, bottle, syringe or other container, into which a component is placed, and optionally, suitably aliquoted. Where there is more than one component in the kit, the kit also will generally contain a second, third or other additional containers into which the additional components are separately placed. However, various combinations of components may be comprised in a container. In some embodiments, all of the delivery components are combined in a single container. In other embodiments, some or all of the compound delivery components are provided in separate containers.

The kits of the present application also will typically include packaging for containing the various containers in close confinement for commercial sale. Such packaging may include cardboard or injection or blow molded plastic packaging into which the desired containers are retained. In some embodiments, a kit will also include instructions for employing the kit components. Instructions may include variations that can be implemented. In some embodiments, the instructions are for delivery of the one or more compounds or the one or more compositions to a subject or cell.

Methods and Uses Thereof

The present application includes methods for delivering one or more agents to a cell or subject using the compounds and/or compositions of the application. Accordingly, in some embodiments, the present application includes a method of delivering one or more agents to a cell comprising contacting the cell with one or more compounds or compositions or pharmaceutical compositions of the application under conditions to cause uptake of the agent into the cell. In some embodiments, the present application includes a method of delivering one or more agents to a subject comprising contacting the subject with one or more compounds or compositions or pharmaceutical compositions of the application. In some embodiments, the cell is contacted in vitro. In some embodiments, the cell is contacted in vivo. In some embodiments, the cell is contacted ex vivo. In some embodiments, the contacting is for the purpose of treating a disease, disorder or condition. In some embodiments, the contacting is by administrating an effective amount of the one or more compounds or compositions or pharmaceutical compositions of the application to a cell or a subject in need thereof.

In some embodiments, are methods of treating a disease, disorder, or condition. In some embodiments, are methods of treating a disease, disorder, or condition in a subject in need thereof. In some embodiments, the subject is a murine animal. In some embodiments, the subject is a human. In some embodiments, the method comprises contacting the subject with one or more compounds or compositions or pharmaceutical compositions described herein.

In some embodiments, the present application also includes a use of one or more compounds or compositions or pharmaceutical compositions of the application for diagnostic, prophylactic, or therapeutic applications. In some embodiments, the uses are connected to the payload delivered by the composition. In some embodiments, the payloads include polynucleotides, chemically modified polynucleotides, small molecules, biologics or other organic or inorganic moieties. Diagnostic applications include use of one or more compounds or compositions or pharmaceutical compositions of the application as carriers of an identifiable label, such as a dye or radiolabel, that after administration can be detected and is indicative of a disease, disorder or condition. Prophylactic applications include use as vaccines, including vaccines for infectious disease, or vaccines for another anticipated or potential condition of a subject. Therapeutic applications include use for treating any disease, disorder or condition, including but not limited to, infectious disease, autoimmune disease, cancer, a genetic disease, chronic disease, traumatic injuries, wound healing, traumatic brain injury, muscular disease, neuromuscular disease and/or gastrointestinal disease. Therapeutic applications may be in vivo, or may be ex vivo therapy treatments where cells, tissues or organs are treated ex vivo and are implanted or transplanted into the subject.

In some embodiments, the present application also includes a use of one or more compounds or compositions or pharmaceutical compositions of the application to deliver one or more agents to a cell, either in vitro, in vivo or ex vivo.

In some embodiments, the one or more agents to be delivered to the cell are one or more nucleic acids. Therefore, the present application also includes methods of modulating the expression of a gene comprising delivering one or more nucleic acids to a cell, the methods comprising contacting the cell with one or more compounds or compositions or pharmaceutical compositions of the application under conditions to cause uptake of the one or more nucleic acids into the cell. In some embodiments, the cell is contacted in vitro. In some embodiments, the cell is contacted in vivo. In some embodiments, the cell is contacted ex vivo. In some embodiments, the modulation of the gene expression is sufficient to treat a disease, disorder or condition.

In some embodiments, the disease, disorder or condition is, for example, but not limited to, infectious disease, autoimmune disease, cancer, a genetic disease, chronic disease, traumatic injuries, wound healing, traumatic brain injury, neuromuscular disease and/or gastrointestinal disease.

In some embodiments, the present application also includes a use of one or more compounds or compositions or pharmaceutical compositions of the application for modulating the expression of a gene. In some embodiments the expression of the gene is modulated by delivering one or more nucleic acids to a cell, either in vitro, in vivo or ex vivo.

In some embodiments, when the compositions and pharmaceutical compositions of the application comprise siRNA, miRNA and mRNA as the one or more agents to be delivered to a cell or subject, this formulated delivery composition is designed to target the bone marrow endothelial cells to suppress, regulate and induce genes causing events leading to chronic inflammation. Currently autoimmune diseases are a major source of chronic inflammation and affect approximately two million Canadians. Due to their complex nature, autoimmune diseases are incompletely understood and therefore provide a challenge when discussing therapeutic options. Current treatments include immunosuppressants, corticosteroids and pain management. These current treatment options do not provide long term or permanent results and need to be optimized. Chronic and severe inflammation is caused by overexpression and the movement of monocytes and monocyte derived macrophages through the body to targeted areas. The majority of monocytes and monocyte derived macrophages are produced in the bone marrow and then are able to cross the endothelial barriers and travel through the bloodstream to targeted areas. With the bone marrow being a major source of production of monocytes, by directly targeting the area of mass production, the course of monocyte proliferation and egress into the blood stream can be altered. In some embodiments, the silencing effect of siRNA encompassed in the nanoparticle will be able to suppress the proliferation of monocytes as well as suppressing their ability to leave the bone marrow. By not only reducing their ability to travel freely but also reduce the total number within the body, the inflammatory response that is leading to damaging effects in people suffering from chronic inflammation can be effectively reduced. Accordingly, in some embodiments, the present application includes a method of treating chronic inflammation comprising administering an effective amount of a composition comprising one or more compounds of the application, siRNA, miRNA and mRNA to a cell or subject in need thereof. Also included is a use of a composition comprising one or more compounds of the application, siRNA, miRNA and mRNA to treat chronic inflammation. In some embodiments, the siRNA is siRNA against bone marrow endothelial genes needed for monocyte attachment and transit into blood circulation.

In some embodiments, the compositions of the application are for use in gene editing. Accordingly, in some embodiments, the present application includes a method of editing a genome of a cell comprising contacting the cell with one or more compositions of the application. Also included is a use of one or more compositions of the application for gene editing. In some embodiments, these compositions comprise cas9 mRNA and one or more guide RNA (gRNA) designed to target specific genes and the one or more compositions are contacted with the cell under conditions to cause uptake of the cas9 mRNA and one or more gRNA into the cell. Upon uptake into the cell, cas9 mRNA is translated into Cas9 protein and incorporates the gRNA to target the sequence of interest within the nucleus. DNA can also be co-delivered for homologous directed repair.

In some embodiments, the compositions of the application are for use in gene silencing. Accordingly, in some embodiments, the present application includes a method of silencing a gene in a cell comprising contacting the cell with one or more compositions of the application. Also included is a use of one or more compositions of the application for gene silencing. In some embodiments, these compositions comprise siRNA which upon delivery to a cell, silence genes corresponding to the siRNA. Accordingly, the one or more compositions are contacted with the cell under conditions to cause uptake of the siRNA into the cell.

In some embodiments, the compositions of the application are for gene regulation. In some embodiments, these compositions comprise non-coding RNA (ncRNA), and the one or more compositions are contacted with the cell under conditions to cause uptake of the ncRNA into the cell and upon uptake into the cell, regulate genes associated with the ncRNA.

In some embodiments, the compositions of the application are for gene expression upregulation or gene expression downregulation. Accordingly, in some embodiments, the present application includes a method of regulating expression of a gene in a cell comprising contacting the cell with one or more compositions of the application. Also included is a use of one or more compositions of the application for regulating expression of a gene in a cell. In some embodiments, these compositions comprise messenger RNA (mRNA) and the one or more compositions are contacted with the cell under conditions to cause uptake of the mRNA into the cell and upon uptake into the cell, express a protein.

In some embodiments, the compositions of the application may be used in the treatment or prevention of infectious diseases, autoimmune diseases, cancer, genetic diseases, chronic diseases, traumatic injuries, wound healing, traumatic brain injuries, neuromuscular diseases and/or gastrointestinal diseases.

In some embodiments, the compositions of the application are for antiviral treatment. Accordingly, in some embodiments, the present application includes a method of treating a viral infection comprising administering one or more compositions of the application to a cell or subject in need thereof. Also included is a use of one or more compositions of the application for treating a viral infection. In some embodiments, these compositions comprise mRNA encoding the Cas9 protein, and one or more sgRNAs. In some embodiments, the one or more sgRNAs identify viral genes for deletion. In some embodiments, the virus is a DNA virus or an RNA virus.

In some embodiments, the compositions of the application are used in methods of delivering one or more proteins to cells, delivering one or more small molecule drugs to cells or delivering one or more DNA molecules to cells.

In some embodiments, the compounds and the compositions of the application achieve higher intramuscular expression than their amide analogues.

In some embodiments, intravenous injection of the compositions of the application achieves the highest expression in spleen. As such, the compounds and the compositions of the application allow controllable biodistribution.

In some embodiments, the compounds and the compositions of the application achieve increased degradation rate. As such, the compounds related of the application are more readily hydrolyzed by various extracellular or intracellular enzymes than their amide analogues.

In some embodiments, the compositions of the application are used in cosmetic and/or personal care products and the one or more agents to be delivered to a cell or subject are any such agent. In some embodiments, the one or more agents for cosmetic and/or personal care products include, but are not limited to, hair moisturizing agents, hair growth agents, hair anti-frizz agents, skin moisturizing agents, anti-aging agents and temporary bioluminescent proteins.

In some embodiments, the compositions of the application are used in methods of preventing forgery, for example to confirm that a product or package has not been tampered with or is the original form. In these embodiments, the one or more agents will include unique DNA or RNA sequences (barcodes) that are put into product packaging/labels that can be read to ensure the product is genuine or not tampered with and the compositions of the application are delivered onto or into a subject that is a package.

In some embodiments, the compositions in the methods and uses are pharmaceutical compositions as defined above.

In some embodiments, the cells in the methods and the uses of the application are in vitro. In some embodiments, the cells in the methods and the uses of the application are in vivo. In some embodiments, the cells in the methods and the uses of the application are ex vivo.

In some embodiments, the cells include any cells with a cell membrane. As such, in some embodiments, the cells are prokaryotic cells or eukaryotic cells. In some embodiments, the cells are prokaryotic cells. in some embodiments, the cells are eukaryotic cells. In some embodiments, the cells are animal cells. In some embodiments, the animal cells are mammalian cells. In some embodiments, the cells are human cells. In some embodiments, the cells are plant cells. In some embodiments, the cells are insect cells. In some embodiments, the cell is a prokaryotic cell or an eukaryotic cell selected from an animal cell, an insect cell or a plant cell.

Preparation of Compounds of the Application

The compounds of the present application can be prepared by various synthetic processes. The choice of particular structural features and/or substituents may influence the selection of one process over another. The selection of a particular process to prepare a given compound of Formula (I) is within the purview of the person of skill in the art. Some starting materials for preparing compounds of the present application are available from commercial chemical sources. Other starting materials, are readily prepared from available precursors using straightforward transformations that are well known in the art.

In some embodiments, the compounds of Formula I are assembled by attaching the various portions of the molecule together in specific order depending on the functional groups that are present. Standard chemistries known in the art can be used to assemble the compounds of Formula I, including but not limited to, nucleophilic displacements, cross-couplings, Michael reactions and/or activating group strategies. As many of the portions of the compounds are known, or are based on known compounds, compounds that can be used to link the portions of the molecule together are readily available either from commercial sources or using synthetic methods known in the art. For example, an addition reaction of an amino alcohol with for example bromodecane (or any other suitable group) forms intermediate A, C, G and N, followed by esterification reaction with a suitable acid chloride, such as for example 3-bromopropionyl chloride to form intermediate B, D, E, F, I, H and J. Addition reaction of two different or two same intermediates selected from B, D, E, F, I, H and J with a suitable amino alcohol forms the compound of Formula I.

In an exemplary embodiment, to synthesize intermediates A, C, G and N for the preparation of compounds of Formula I, wherein $R^2$ and $R^3$ or $R^4$ and $R^5$ are same (marked in the scheme as $R^z$), and z represents c/d and is as defined for Formula I, the following step as shown in Scheme 1 is followed.

Scheme 1

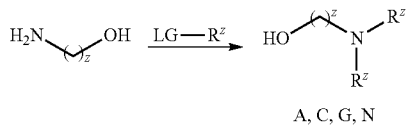

A, C, G, N

In this addition reaction, 1 equivalent of amino alcohol (such as ethanolamine, 3-amino-1-propanol and the like) and 2.2 equivalents of LG-$R^z$, wherein LG is a suitable leaving group, such as halo (for example 1-bromodecane), are dissolved in a suitable solvent, such as acetonitrile, and reacted in the presence of an excess amount of base such as $K_2CO_3$ (4.4 equivalents) and a halide salt such as KI (0.2 equivalents) under conditions to obtain intermediates A, C, G and N.

In an exemplary embodiment, to synthesize intermediates B and D for the preparation of compounds of Formula I, wherein $R^2$ and $R^3$ or $R^4$ and $R^5$ are same (marked in the scheme as $R^z$), and z represents c/d and is as defined for Formula I, the following step as shown in Scheme 2 is followed:

Scheme 2

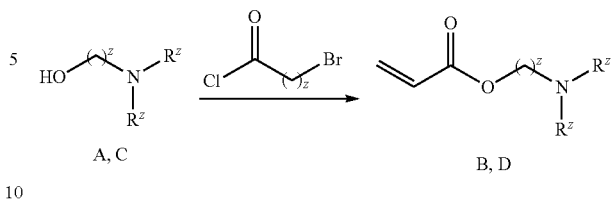

A, C                B, D

Therefore, intermediates B and D are synthesized by reacting 2 eq of intermediate A or C with 1 eq of acid chloride, for example, 3-bromopropionyl chloride or equivalent, in a suitable solvent, such as DCM, and in the presence of 1.2 eq of any suitable alcohol.

In an exemplary embodiment, to synthesize intermediates E, F, I, H, J for the preparation of compounds of Formula I, wherein $R^2$ and $R^3$ or $R^4$ and $R^5$ are same (marked in the scheme as $R^z$), z represents c/d and is as defined for Formula I, and z' represents a/b and is as defined for Formula I, the following step as shown in Scheme 3 is followed:

Scheme 3

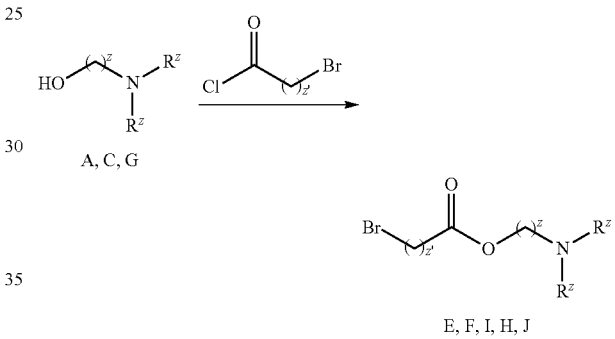

E, F, I, H, J

Therefore, intermediates E, F, I, H and J are synthesized by reacting 2 eq of intermediate A, C or G with 1 eq of an acid chloride (such as 3-bromopropionyl chloride, 4-bromopropionyl chloride, 4-bromobutyryl chloride and the like) in a suitable solvent, such as DCM, and in the presence of 1.2 eq of any suitable alcohol.

In an exemplary embodiment, to synthesize intermediate K for the preparation of compounds of Formula I, z' represents a/b and is 3, z" represents $R^1$ and is as defined for Formula I, the following steps as shown in Scheme 4 are followed:

Scheme 4

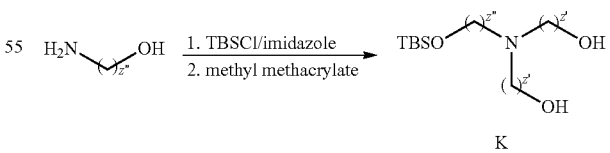

K

Therefore, one equivalent of amino alcohol (such as ethanolamine, 3-amino-1-propanol and the like), 1.1 equivalent of tert-butyldimethylsilyl chloride and 2 equivalents of imidazole are dissolved in a suitable solvent, such as DCM, then reacted with, for example, methyl acrylate, and lithium aluminum hydride under conditions to obtain intermediate "K".

In an exemplary embodiment, to synthesize the intermediate L for the preparation of compounds of Formula I, wherein $R^2$ and $R^3$ or $R^4$ and $R^5$ are same (marked in the scheme as $R^z$), and z represents c/d and is as defined for Formula I, the following step as shown in Scheme 5 is followed:

Scheme 5

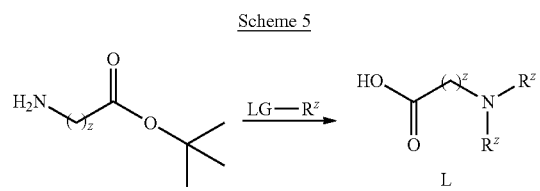

L

Therefore, $NH_2(CH_2)_zC(O)OC_4H_9$ (such as tert-butyl 4-aminobutanoate hydrochloride) (1 eq) and LG-$R^z$, wherein LG is a suitable leaving group such as halo, for example 1-bromodecane (2.1 eq), are dissolved in a suitable solvent, such as 1:1 mixture of acetonitrile and cyclopentyl methyl ether, and reacted in the presence of a base such as $K_2CO_3$ (4 eq) and a halide salt such as KI (1.1 eq). Then the t-butyl group is removed, for example with a suitable acid, such as TFA, and the reaction is quenched with a suitable base to obtain intermediate "L".

In an exemplary embodiment, to synthesize the compounds of Formula I, wherein $R^2$ and $R^3$ and/or $R^4$ and $R^5$ are same, two different or two same intermediates selected from B, D, E, F, H, I and J (1.8 eq) undergo an alkylation reaction with amino alcohol (such as ethanolamine, 3-amino-1-propanol and the like) (1 eq) in a suitable solvent, such as for example, a 1:1 mixture of acetonitrile: cyclopentyl methyl ether, in the presence of a base, such as $K_2CO_3$ (4 eq) and a halide salt such as KI (0.4 eq). In some embodiments, a non-nucleophilic base such as 1,8-diazabicyclo(5.4.0)undec-7-ene is added to the reaction.

Throughout the processes it is to be understood that, where appropriate, suitable protecting groups will be added to, and subsequently removed from, the various reactants and intermediates in a manner that will be readily understood by one skilled in the art. Conventional procedures for using such protecting groups as well as examples of suitable protecting groups are described, for example, in "*Protective Groups in Organic Synthesis*", T. W. Green, P. G. M. Wuts, Wiley-Interscience, New York, (1999). It is also to be understood that a transformation of a group or substituent into another group or substituent by chemical manipulation can be conducted on any intermediate or final product on the synthetic path toward the final product, in which the possible type of transformation is limited only by inherent incompatibility of other functionalities carried by the molecule at that stage to the conditions or reagents employed in the transformation. Such inherent incompatibilities, and ways to circumvent them by carrying out appropriate transformations and synthetic steps in a suitable order, will be readily understood to one skilled in the art. Examples of transformations are given herein, and it is to be understood that the described transformations are not limited only to the generic groups or substituents for which the transformations are exemplified. References and descriptions of other suitable transformations are given in "Comprehensive Organic Transformations—A Guide to Functional Group Preparations" R. C. Larock, VHC Publishers, Inc. (1989). References and descriptions of other suitable reactions are described in textbooks of organic chemistry, for example, "*Advanced Organic Chemistry*", March, 4th ed. McGraw Hill (1992) or, "*Organic Synthesis*", Smith, McGraw Hill, (1994).

Techniques for purification of intermediates and final products include, for example, straight and reversed phase chromatography on column or rotating plate, recrystallisation, distillation and liquid-liquid or solid-liquid extraction, which will be readily understood by one skilled in the art.

Salts of the compounds of the application are generally formed by dissolving a neutral compound in an inert organic solvent and adding either the desired acid or base and isolating the resulting salt by either filtration or other known means.

The formation of solvates of the compounds of the application will vary depending on the compound and the solvate. In general, solvates are formed by dissolving a compound in the appropriate solvent and isolating the solvate by cooling or using an antisolvent. The solvate is typically dried or azeotroped under ambient conditions. The selection of suitable conditions to form a particular solvate can be made by a person skilled in the art. Examples of suitable solvents are ethanol, water and the like. When water is the solvent, the molecule is referred to as a "hydrate". The following non-limiting examples are illustrative of the present application.

Compositions of the present application are prepared by combining compounds of the application and optional excipients under conditions to form nanoparticles, colloids and/or supramolecular structures, suitably comprising one or more agents to be delivered. In some embodiments, the conditions to form nanoparticles, colloids and/or supramolecular structures comprise first combining the one or more compounds and any optional excipients, including the one or more PEG-lipids, one or more phospholipids, and/or one or more steroids in a suitable solvent such as ethanol. In some embodiments, sonication and/or warming is used to eliminate any precipitate. Separately the one or more agents to be delivered are prepared in a suitable solvent, such as sodium acetate. The two solutions are then combined under conditions to form nanoparticles, colloids and/or supramolecular structures. In some embodiments, the two solutions are combined under continuous flow conditions using, for example, microfluidics. In some embodiments the resulting nanoparticles, colloids and/or supramolecular structures are treated using dialysis to adjust the pH. In some embodiments, particles are stored at room temperature or −20° C. for at least 48 hours without any noticeable changes.

EXAMPLES

General Synthesis Methods

General Synthesis Method A—Alkylation of Amino-Alcohols

Amino alcohol (1 equivalent) and 1-bromodecane (2.2 equivalents) were dissolved in acetonitrile in a round bottom flask. $K_2CO_3$ (4.4 equivalents) and KI (0.2 equivalents) were added. The flask was then covered with aluminum foil, fitted with a condenser, and heated to 85° C. for 18 hours. The reaction mixture was filtered through a celite plug and washed thoroughly with ethyl acetate. The filtrate was concentrated to a crude oil and then purified by column chromatography using a 10-40% (22% MeOH, 3% $NH_4OH$ in dichloromethane) in dichloromethane (DCM) gradient.

General Synthesis Method B—Esterification of Acid Chlorides

Alcohol (1.2 equivalents) and triethylamine (2 equivalents) were dissolved in dichloromethane (dried over anhydrous sieves) in a round bottoms flask and cooled to 0° C. Acid chloride (1 equivalent) was added slowly to the reaction while stirring. The ice bath was removed, and the flask was fitted with a condenser and heated to 55° C. for 2 hours. The reaction mixture was concentrated to a crude oil and then purified by column chromatography using a 0-60% ethyl acetate in hexanes gradient.

General Synthesis Method C—Alkylation of Ethanolamine Core

Ethanolamine (1 equivalent) and halide substrate (1.8 equivalents) were dissolved in a 1:1 mixture of acetonitrile:cyclopentyl methyl ether in a glass vial. $K_2CO_3$ (4 equivalents) and KI (0.4 equivalents) were added. The vial was then covered with aluminum foil and heated to 85° C. for 48 hours. The reaction mixture was filtered through a celite plug and washed thoroughly with ethyl acetate. The filtrate was concentrated to a crude oil and then purified by column chromatography using a 10-40% (22% MeOH, 3% $NH_4OH$ in dichloromethane) in dichloromethane gradient.

Example 1: Synthesis of Exemplary Compounds of the Application

Synthesis of Intermediates

Intermediate A

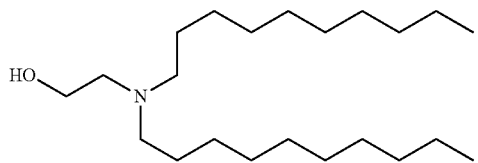 [SMILES: CCCCCCCCCCN(CCO)CCCCCCCCCC]

Intermediate A was synthesized according to General Synthesis Method A using ethanolamine and isolated as a pale yellow oil. $^1$H NMR (500 MHz, CDCl$_3$) δ 3.56 (t, J=5.6 Hz, 0H), 3.18 (s, 0H), 2.61 (t, J=5.4 Hz, 0H), 2.52-2.43 (m, 1H), 1.45 (p, J=7.2 Hz, 1H), 1.32-1.21 (m, 5H), 0.88 (t, J=7.2 Hz, 1H). $^{13}$C NMR (126 MHz, CDCl$_3$) δ 58.29, 55.70, 54.00, 32.04, 29.77, 29.73, 29.69, 29.68, 29.46, 27.53, 27.03, 22.82, 14.25.

Intermediate B

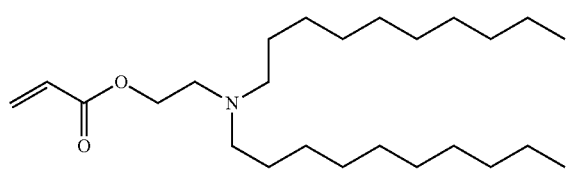 [SMILES: C=CC(=O)OCCN(CCCCCCCCCC)CCCCCCCCCC]

Intermediate B was synthesized according to General Synthesis Method B using Intermediate A and 3-bromopropionyl chloride. $^1$H NMR (500 MHz, CDCl$_3$) δ 6.39 (dd, J=17.3, 1.5 Hz, 1H), 6.12 (dd, J=17.4, 10.5 Hz, 1H), 5.81 (dd, J=10.4, 1.5 Hz, 1H), 4.20 (t, J=6.2 Hz, 2H), 2.72 (t, J=6.3 Hz, 2H), 2.48-2.42 (m, 4H), 1.42 (p, J=6.6 Hz, 4H), 1.26 (d, J=5.2 Hz, 29H), 0.87 (t, J=7.0 Hz, 6H). $^{13}$C NMR (126 MHz, CDCl$_3$) δ 166.36, 130.69, 128.71, 63.09, 55.00, 52.30, 32.05, 29.82, 29.81, 29.76, 29.75, 29.48, 27.60, 27.42, 22.83, 14.25.

Intermediate C

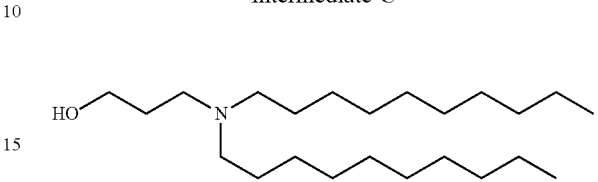

Intermediate C was synthesized according to General Synthesis Method A using 3-amino-1-propanol. $^1$H NMR (500 MHz, cdcl$_3$) δ 3.78 (t, J=5.3 Hz, 2H), 2.69 (t, J=5.8 Hz, 2H), 2.50-2.42 (m, 4H), 1.74-1.66 (m, 2H), 1.53-1.44 (m, 4H), 1.33-1.17 (m, 30H), 0.86 (t, J=7.4 Hz, 6H). $^{13}$C NMR (126 MHz, cdcl$_3$) δ 64.29, 55.04, 54.11, 32.01, 29.71, 29.69, 29.65, 29.42, 27.68, 27.55, 26.47, 22.79, 14.22.

Intermediate D

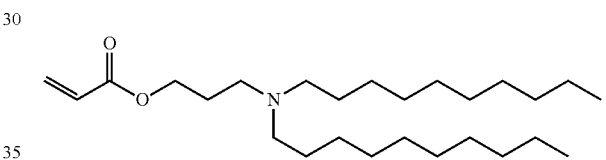

Intermediate D was synthesized according to General Synthesis Method B using Intermediate C and 3-bromopropionyl chloride. $^1$H NMR (500 MHz, cdcl$_3$) δ 6.38 (dd, J=17.3, 1.5 Hz, 1H), 6.10 (dd, J=17.3, 10.4 Hz, 1H), 5.79 (dd, J=10.4, 1.5 Hz, 1H), 4.19 (t, J=6.5 Hz, 2H), 2.49 (t, J=7.2 Hz, 2H), 2.41-2.34 (m, 4H), 1.79 (p, J=7.1 Hz, 2H), 1.45-1.35 (m, 4H), 1.34-1.23 (m, 27H), 0.92-0.80 (m, 6H). $^{13}$C NMR (126 MHz, cdcl$_3$) δ 166.34, 130.52, 128.74, 63.20, 54.29, 50.51, 32.04, 29.79, 29.75, 29.74, 29.47, 27.68, 27.19, 26.52, 22.81, 14.23.

Intermediate E

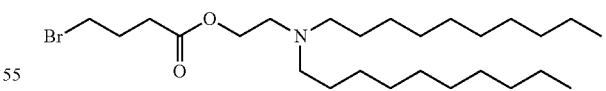

Intermediate E was synthesized according to General Synthesis Method B using Intermediate A and 4-bromobutyryl chloride. $^1$H NMR (500 MHz, cdcl$_3$) δ 4.21-4.11 (m, 2H), 3.46 (t, J=6.5 Hz, 1H), 2.70 (dt, J=12.1, 6.1 Hz, 2H), 2.55-2.39 (m, 5H), 2.21-2.12 (m, 1H), 1.51-1.37 (m, 4H), 1.34-1.19 (m, 29H), 0.88 (t, J=6.9 Hz, 6H). $^{13}$C NMR (126 MHz, cdcl$_3$) δ 174.89, 172.50, 62.81, 54.78, 54.76, 54.64, 52.20, 52.14, 32.68, 32.47, 31.90, 29.66, 29.65, 29.61, 29.60, 29.59, 29.59, 29.33, 27.76, 27.44, 27.44, 27.12, 22.67, 14.10, 12.88, 8.39.

Intermediate F

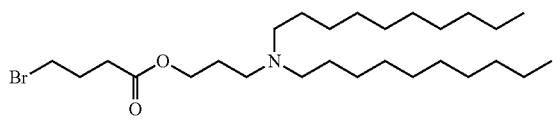 [SMILES: CCCCCCCCCCN(CCCCCCCCCC)CCCOC(=O)CCCBr]

Intermediate F was synthesized according to General Synthesis Method B using Intermediate C and 4-bromobutyryl chloride. $^1$H NMR (500 MHz, cdcl$_3$) δ 4.13 (t, J=6.5 Hz, 2H), 3.46 (t, J=6.4 Hz, 2H), 2.50 (t, J=7.1 Hz, 4H), 2.46-2.39 (m, 4H), 2.22-2.09 (m, 2H), 1.84-1.75 (m, 2H), 1.49-1.39 (m, 4H), 1.35-1.19 (m, 29H), 0.87 (t, J=7.0 Hz, 6H). $^{13}$C NMR (126 MHz, cdcl$_3$) δ 172.66, 63.21, 54.19, 50.55, 32.86, 32.59, 32.05, 29.80, 29.78, 29.74, 29.73, 29.48, 27.89, 27.65, 22.83, 14.26.

Intermediate G

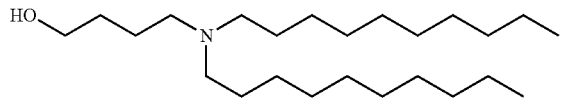 [SMILES: CCCCCCCCCCN(CCCCO)CCCCCCCCCC]

Intermediate G was synthesized according to General Synthesis Method A using 4-amino-1-butanol. $^1$H NMR (500 MHz, cdcl$_3$) δ 3.57 (t, J=5.4 Hz, 2H), 2.60-2.52 (m, 6H), 1.75-1.61 (m, 4H), 1.58-1.48 (m, 4H), 1.33-1.17 (m, 28H), 0.87 (t, J=6.9 Hz, 5H). $^{13}$C NMR (126 MHz, cdcl$_3$) δ 77.27, 77.02, 76.76, 62.32, 54.25, 53.36, 31.99, 31.86, 29.55, 29.52, 29.40, 29.27, 27.45, 25.18, 22.65, 14.08.

Intermediate H

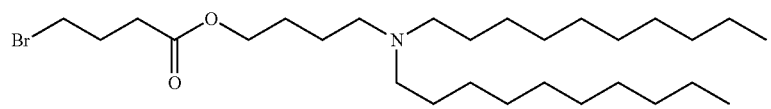 [SMILES: CCCCCCCCCCN(CCCCCCCCCC)CCCCOC(=O)CCCBr]

Intermediate H was synthesized according to General Synthesis Method B using Intermediate G and 4-bromobutyryl chloride. $^1$H NMR (500 MHz, cdcl$_3$) δ 4.09 (t, J=6.7 Hz, 2H), 3.46 (t, J=6.5 Hz, 2H), 2.49 (t, J=7.2 Hz, 2H), 2.43-2.36 (m, 3H), 2.40-2.33 (m, 5H), 2.17 (p, J=6.4 Hz, 2H), 1.63 (p, J=7.9 Hz, 2H), 1.52-1.43 (m, 2H), 1.44-1.35 (m, 4H), 1.36-1.18 (m, 29H), 0.87 (t, J=7.1 Hz, 6H). $^{13}$C NMR (126 MHz, cdcl$_3$) δ 172.73, 64.84, 60.52, 54.34, 53.85, 32.84, 32.63, 32.06, 31.73, 29.83, 29.80, 29.76, 29.49, 27.92, 27.79, 27.22, 26.83, 23.81, 22.83, 14.34, 14.26.

Intermediate I

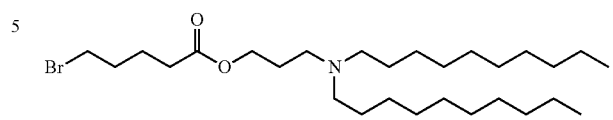

Intermediate I was synthesized according to General Synthesis Method B using Intermediate C and 5-bromovaleryl chloride. $^1$H NMR (500 MHz, cdcl$_3$) δ 4.10 (t, J=6.5 Hz, 2H), 3.40 (t, J=6.6 Hz, 2H), 2.48-2.42 (m, 2H), 2.35 (t, J=7.4 Hz, 4H), 2.33 (t, J=7.4 Hz, 2H), 1.93-1.85 (m, 2H), 1.82-1.69 (m, 4H), 1.39 (p, J=7.1 Hz, 5H), 1.33-1.19 (m, 27H), 0.87 (t, J=7.0 Hz, 6H). $^{13}$C NMR (126 MHz, cdcl$_3$) δ 173.25, 63.22, 54.33, 50.59, 33.45, 33.09, 32.15, 32.05, 31.72, 29.82, 29.79, 29.76, 29.48, 27.71, 27.30, 26.65, 23.67, 22.82, 22.78, 14.25.

Intermediate J

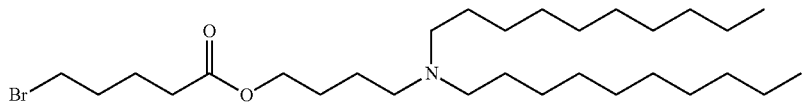 [SMILES: CCCCCCCCCCN(CCCCCCCCCC)CCCCOC(=O)CCCCBr]

Intermediate J was synthesized according to General Synthesis Method B using Intermediate G and 5-bromovaleryl chloride. $^1$H NMR (500 MHz, cdcl$_3$) δ 4.08 (t, J=6.7 Hz, 2H), 3.40 (t, J=6.6 Hz, 2H), 2.40 (t, J=7.5 Hz, 2H), 2.38-2.35 (m, 4H), 2.33 (t, J=6.9 Hz, 2H), 1.93-1.86 (m, 2H), 1.82-1.73 (m, 2H), 1.63 (p, J=7.9 Hz, 2H), 1.51-1.44 (m, 2H), 1.40 (p, J=6.9 Hz, 4H), 1.32-1.19 (m, 29H), 0.87 (t, J=7.1 Hz, 6H). $^{13}$C NMR (126 MHz, cdcl$_3$) δ 173.17, 64.53, 54.18, 53.71, 33.30, 32.96, 32.00, 31.90, 29.67, 29.64, 29.60, 29.58, 29.33, 27.63, 27.07, 26.70, 23.67, 23.52, 22.67, 14.10.

Intermediate K

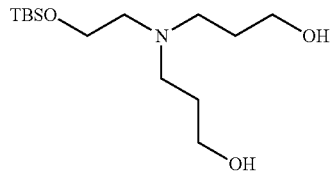 [SMILES: CC(C)(C)[Si](C)(C)OCCN(CCCO)CCCO]

Ethanolamine (0.305 g, 5 mmol, 1 eq), tert-butyldimethylsilyl chloride (0.829 g, 5.5 mmol, 1.1 eq) and imidazole (0.681 g, 10 mmol, 2 eq) were dissolved in dichloromethane (40 mL) and stirred for 3 hours at ambient temperatures. The reaction was then diluted with water (60 mL) and extracted with dichloromethane (3×30 mL). The organic fractions were combined and concentrated to a clear oil of 2-((tert-butyldimethylsilyl)oxy)ethan-1-amine (0.791 g, 90%). $^1$H NMR (500 MHz, cdcl$_3$) δ 3.59 (t, J=5.4 Hz, 2H), 2.74 (t, J=5.2 Hz, 2H), 0.86 (s, 9H), 0.03 (s, 6H). $^{13}$C NMR (126 MHz, cdcl$_3$) δ 65.10, 44.22, 25.87, 25.74, 18.27, −3.52, −5.36.

2-((tert-butyldimethylsilyl)oxy)ethan-1-amine (2.63 g, 15 mmol, 1 eq) and methyl acrylate (3.87 g, 45 mmol, 3 eq) were dissolved in methanol (10 mL) and stirred at ambient temperature for 18 hours. Methanol and excess tert-butyl acrylate were removed under vacuum to produce di-tert-butyl 3,3'-((2-((tert-butyldimethylsilyl)oxy)ethyl)azanediyl) dipropionate (5.21 g, quant.). $^1$H NMR (400 MHz, CDCl$_3$) δ 3.66-3.54 (m, 8H), 2.78 (t, J=6.9 Hz, 4H), 2.55 (t, J=6.4 Hz, 2H), 2.40 (t, J=7.2 Hz, 4H), 0.83 (s, 10H), −0.00 (s, 6H). $^{13}$C NMR (101 MHz, CDCl$_3$) δ 172.99, 61.82, 55.94, 51.50, 50.16, 32.85, 25.93, 25.74, 18.27, −3.51, −5.35.

1M Lithium aluminum hydride (LAH) in THF (13.0 mL, 13 mmol, 2.6 eq) was suspended in tetrahydrofuran (THF) (30 mL) at 0° C. A solution of dimethyl 3,3'-((2-((tert-butyldimethylsilyl)oxy)ethyl)azanediyl)dipropionate (1.80 g, 5.5 mmol, 1 eq) in THF (15 mL) was added dropwise to the LAH over 30 minutes. The combined solution was stirred at ambient temperatures for an additional 1 hour after addition was complete. The reaction was then cooled to 0° C. again, and 1 g of ice was added directly to the flask and allowed to stir for 10 minutes. Anhydrous Na$_2$SO$_4$ was added directly to the reaction mixture and allowed to stir for 15 minutes. The reaction was filtered through a celite plug and washed with additional THF. The filtrate was concentrated and purified by column chromatography using a gradient of 20-30% (22% MeOH, 3% NH$_4$OH in dichloromethane) in dichloromethane. 3,3'-((2-((tert-butyldimethylsilyl)oxy)ethyl)azanediyl)bis(propan-1-ol) was isolated as a pale yellow oil (0.340 g, 23%). $^1$H NMR (500 MHz, cdcl$_3$) δ 3.73-3.64 (m, 6H), 2.64 (t, J=6.4 Hz, 4H), 2.56 (t, J=6.0 Hz, 2H), 1.68 (qd, J=6.3, 5.4 Hz, 4H), 0.85 (s, 9H), 0.03 (s, 6H). $^{13}$C NMR (126 MHz, cdcl$_3$) δ 62.29, 61.01, 55.83, 53.28, 28.81, 25.98, 18.33, −5.37.

Intermediate L

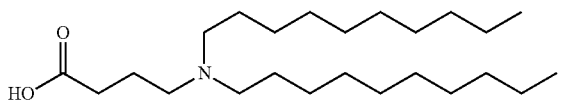 [SMILES: CCCCCCCCCCN(CCCCCCCCCC)CCCC(=O)O]

Tert-butyl 4-aminobutanoate hydrochloride (0.978 g, 5 mmol, 1 eq) and 1-bromodecane (2.32 g, 10.5 mmol, 2.1 eq) were dissolved in a 1:1 mixture of acetonitrile and cyclopentyl methyl ether (10 mL of each solvent). K$_2$CO$_3$ (2.76 g, 20 mmol, 4 eq) and KI (0.913 g, 5.5 mmol, 1.1 eq) were added to the reaction. The flask was fit with a condenser and stirred for 18 hours at 85° C. The reaction was filtered through a celite plug and washed with ethyl acetate. The filtrate was concentrated and purified by column chromatography using a gradient of 0-60% ethyl acetate in hexanes. Tert-butyl 4-(didecylamino)butanoate was isolated as a pale yellow oil (1.011 g, 46%). $^1$H NMR (500 MHz, cdcl$_3$) δ 2.42-2.31 (m, 7H), 2.21 (t, J=7.4 Hz, 2H), 1.68 (p, J=7.4 Hz, 2H), 1.42 (s, 9H), 1.41-1.35 (m, 3H), 1.33-1.17 (m, 31H), 0.86 (t, J=6.8 Hz, 6H). $^{13}$C NMR (126 MHz, cdcl$_3$) δ 173.30, 79.99, 54.34, 53.32, 33.57, 32.04, 29.81, 29.78, 29.74, 29.47, 28.23, 27.72, 27.34, 22.81, 22.78, 14.22.

Tert-butyl 4-(didecylamino)butanoate (1.011 g, 2.30 mmol) was dissolved in dichloromethane and cooled to 0° C. Trifluoroacetic acid (2.30 mL) was added dropwise to the reaction. The reaction was then stirred at ambient temperatures for 18 hours, then cooled to 0° C. and quenched by the addition of saturated NaHCO$_3$ (5 mL). The mixture was transferred to a separatory funnel and diluted with additional dichloromethane (5 mL). The organic layer was washed with saturated NaHCO$_3$ (3×10 mL), dried over anhydrous salt and then concentrated to produce 4-(didecylamino)butanoic acid as a white powder (0.835 g, 95%). $^1$H NMR (500 MHz, cdcl$_3$) δ 2.82-2.76 (m, 2H), 2.72-2.65 (m, 4H), 2.59-2.53 (m, 2H), 1.86-1.78 (m, 2H), 1.64-1.56 (m, 4H), 1.34-1.18 (m, 30H), 0.86 (t, J=7.0 Hz, 6H). $^{13}$C NMR (126 MHz, cdcl$_3$) δ 176.30, 55.50, 53.42, 53.01, 37.40, 31.82, 29.45, 29.43, 29.22, 27.55, 27.16, 24.30, 22.63, 21.20, 14.07.

Intermediate M

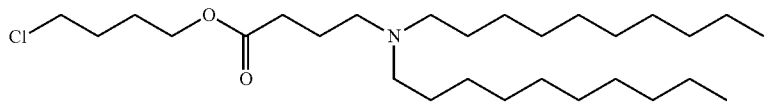 [SMILES: CCCCCCCCCCN(CCCCCCCCCC)CCCC(=O)OCCCCCl]

4-(didecylamino)butanoic acid (0.345 g, 0.9 mmol, 0.9 eq), 4-chloro-1-butanol (104.7 uL, 1 mmol, 1 eq accounting for purity of technical grade reagent), ethylene dichloride (EDC)*HCl (0.288 g, 2 mmol, 2 eq), 4-dimethylaminopyridine (DMAP) (0.024 g, 0.2 mmol, 0.2 eq), and N,N-diisopropylethylamine (DIPEA) (348 uL, 2 mmol, 2 eq) were dissolved in dichloromethane (10 mL) and stirred at ambient temperatures for 3 hours. The reaction mixture was concentrated to a crude oil and then purified by column chromatography using a gradient of 0-60% ethyl acetate in hexanes. Intermediate M was isolated as a pale yellow oil (0.315 g, 74%). $^1$H NMR (500 MHz, cdcl$_3$) S 4.10 (t, J=6.2 Hz, 2H), 3.56 (t, J=6.4 Hz, 2H), 2.39 (t, J=7.1 Hz, 2H), 2.37-2.34 (m, 4H), 2.32 (t, J=7.5 Hz, 2H), 1.88-1.76 (m, 4H), 1.73 (p, J=7.5 Hz, 2H), 1.38 (p, J=7.0 Hz, 4H), 1.33-1.18 (m, 28H), 0.87 (t, J=7.1 Hz, 6H). $^{13}$C NMR (126 MHz, cdcl$_3$) δ 173.97, 63.51, 54.29, 53.36, 44.58, 32.27, 32.05, 29.83, 29.80, 29.76, 29.48, 29.32, 27.73, 27.30, 26.24, 22.83, 22.74, 14.25.

Intermediate N

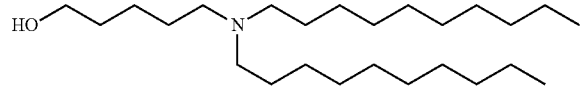 [SMILES: CCCCCCCCCCN(CCCCCO)CCCCCCCCCC]

Intermediate N was synthesized according to General Synthesis Method A using 5-amino-1-pentanol. $^1$H NMR (500 MHz, cdcl$_3$) δ 3.60 (t, J=6.5 Hz, 2H), 2.52-2.41 (m, 6H), 1.61-1.41 (m, 8H), 1.40-1.32 (m, 2H), 1.32-1.18 (m, 28H), 0.86 (t, J=6.9 Hz, 6H). $^{13}$C NMR (126 MHz, cdcl3) δ 62.53, 53.97, 32.48, 32.00, 29.73, 29.67, 29.64, 29.42, 27.66, 26.23, 26.15, 23.77, 22.77, 14.20.

Intermediate O

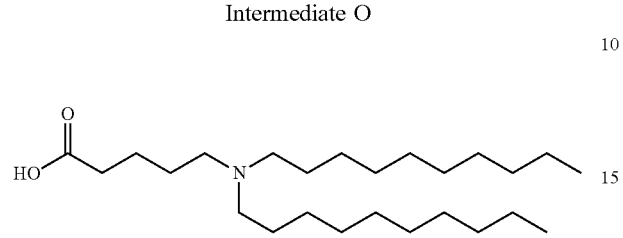

Intermediate N (0.386 g, 1.00 mmol, 1 eq), 1-hydroxycyclohexyl phenyl ketone (1.233 g, 6.04 mmol, 6 eq), and sodium hydroxide (0.256 g, 6.4 mmol, 6.4 eq) were added to a screw-cap vial with 1,2-dimethoxyethane (5 mL) and heated to 80° C. overnight. The reaction was quenched by the addition of water and 6N hydrochloric acid (533 uL, 6.4 mmol). The mixture was transferred to a separatory funnel and extracted with ethyl acetate (3×20 mL). The combined organic fractions were washed with brine (1×40 mL), dried over anhydrous salt, and then concentrated to a crude oil. The crude oil was purified by column chromatography using a gradient of 20-50% ultra in DCM to produce a yellow oil (0.299 g, 75%). $^1$H NMR (500 MHz, cdcl$_3$) δ 2.95-2.72 (m, 6H), 2.32-2.14 (m, 2H), 1.67 (d, J=4.4 Hz, 2H), 1.58 (d, J=4.0 Hz, 6H), 1.25 (d, J=21.7 Hz, 28H), 0.86 (t, J=6.9 Hz, 6H). $^{13}$C NMR (126 MHz, cdcl$_3$) δ 179.46, 53.25, 50.61, 36.79, 31.96, 29.57, 29.55, 29.36, 29.28, 27.11, 24.51, 23.67, 22.76, 22.62, 14.20.

Intermediate P

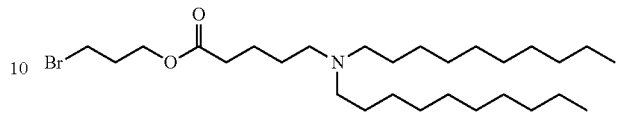

Intermediate O (0.299 g, 0.75 mmol, 1 eq), 3-bromo-1-propanol (75.06 uL, 0.83 mmol, 1.1 eq), EDC*HCl (0.217 g, 1.13 mmol, 2 eq), DMAP (18.3 mg, 0.15 mmol, 0.2 eq), and DIPEA (261.3 uL, 1.5 mmol, 2 eq) were dissolved in dichloromethane (10 mL) and stirred at ambient temperatures overnight. The reaction mixture was concentrated to a crude oil and then purified by column chromatography using a gradient of 0-60% ethyl acetate in hexanes. Intermediate P was isolated as a clear oil (0.148 g, 38%). $^1$H NMR (500 MHz, cdcl$_3$) δ 4.20 (t, J=6.1 Hz, 2H), 3.45 (t, J=6.6 Hz, 2H), 2.41-2.28 (m, 8H), 2.16 (p, J=6.4 Hz, 2H), 1.61 (p, J=7.5 Hz, 2H), 1.48-1.35 (m, 6H), 1.25 (s, 28H), 0.87 (t, J=6.8 Hz, 6H). $^{13}$C NMR (126 MHz, cdcl$_3$) δ 173.65, 62.09, 54.33, 53.84, 34.28, 32.04, 31.84, 29.81, 29.78, 29.74, 29.48, 29.47, 27.78, 27.15, 26.77, 23.16, 22.81, 14.24.

Intermediate Q

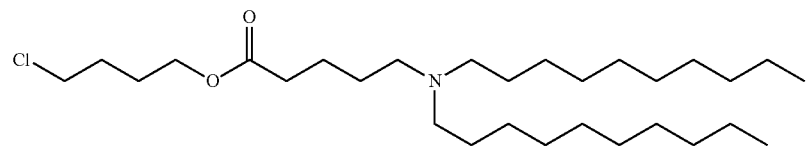 [SMILES: CCCCCCCCCCN(CCCCCCCCCC)CCCCC(=O)OCCCCCl]

Intermediate O (0.299 g, 0.75 mmol, 1 eq), 4-chloro-1-butanol (141.1 uL, 1.25 mmol, 1.2 eq accounting for purity of technical grade reagent), EDC*HCl (0.290 g, 1.52 mmol, 1.5 eq), DMAP (25 mg, 0.21 mmol, 0.2 eq), and DIPEA (362 uL, 2.08 mmol, 2 eq) were dissolved in dichloromethane (10 mL) and stirred at ambient temperatures overnight. The reaction mixture was concentrated to a crude oil and then purified by column chromatography using a gradient of 0-60% ethyl acetate in hexanes. Intermediate Q was isolated as a clear oil (0.391 g, 77%). $^1$H NMR (400 MHz, CDCl$_3$) δ 4.10 (t, J=6.1 Hz, 2H), 3.56 (t, J=6.2 Hz, 2H), 2.34 (m, 8H), 1.89-1.74 (m, 5H), 1.61 (p, J=7.4 Hz, 2H), 1.50-1.34 (m, 6H), 1.26 (m, 28H), 0.87 (t, J=6.6 Hz, 6H). $^{13}$C NMR (101 MHz, CDCl$_3$) δ 173.82, 63.52, 54.36, 53.89, 44.56, 34.38, 32.05, 29.82, 29.79, 29.75, 29.48, 29.32, 27.79, 27.19, 26.81, 26.25, 23.20, 22.82, 14.24.

Synthesis of Final Compounds

Synthesis of Compound I-1

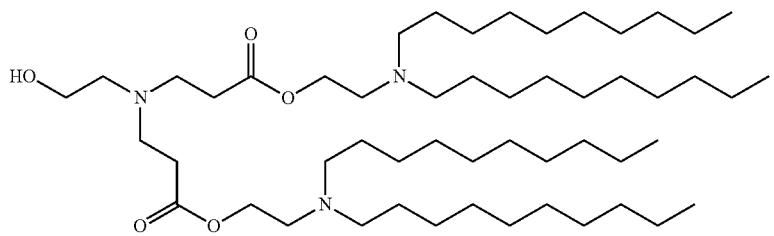 [SMILES: CCCCCCCCCCN(CCCCCCCCCC)CCOC(=O)CCN(CCO)CCC(=O)OCCN(CCCCCCCCCC)CCCCCCCCCC]

Ethanolamine (9.17 uL, 0.15 mmol, 0.4 eq), Intermediate B (0.150 g, 0.38 mmol, 1 eq), and 1,8-diazabicyclo(5.4.0)undec-7-ene (28.29 uL, 0.19 mmol, 0.5 eq) were dissolved in acetonitrile (0.5 mL) in a screw cap 2-vial and stirred at ambient temperature for 6 hours. The reaction was concentrated and purified by column chromatography using a 10-40% (22% MeOH, 3% $NH_4OH$ in dichloromethane) in dichloromethane gradient. Product was isolated as a clear oil (13 mg, 10%). $^1H$ NMR (400 MHz, $CDCl_3$) δ 4.13 (t, J=6.2 Hz, 4H), 3.60-3.52 (m, 2H), 2.78 (t, J=6.8 Hz, 5H), 2.73-2.64 (m, 6H), 2.57 (t, J=5.4 Hz, 2H), 2.51-2.40 (m, 13H), 1.41 (p, J=7.3 Hz, 9H), 1.34-1.17 (m, 70H), 0.86 (t, J=7.0 Hz, 14H). $^{13}C$ NMR (101 MHz, $CDCl_3$) δ 172.63, 59.27, 56.02, 54.79, 52.28, 49.21, 32.73, 32.02, 31.98, 29.79, 29.72, 29.64, 29.63, 29.45, 29.39, 27.57, 27.27, 27.08, 22.79, 22.77, 14.21, 14.20. MS (ESI+): m/z (MH+) 852.81 for C52H105N3O5.

Synthesis of Compound I-2

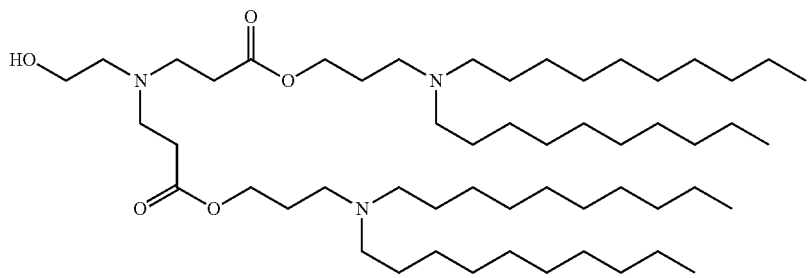 [SMILES: CCCCCCCCCCN(CCCCCCCCCC)CCCOC(=O)CCN(CCO)CCC(=O)OCCCN(CCCCCCCCCC)CCCCCCCCCC]

Ethanolamine (12.1 uL, 0.20 mmol, 1 eq) and Intermediate C (0.147 g, 0.36 mmol, 1.8 eq) were combined in a screw cap vial and stirred at 70° C. temperature for 8 hours. The reaction was concentrated and purified by column chromatography using a 10-40% (22% MeOH, 3% $NH_4OH$ in dichloromethane) in dichloromethane gradient. The product was isolated as a clear oil (61 mg, 38% yield). $^1H$ NMR (400 MHz, $CDCl_3$) δ 4.13 (t, J=6.2 Hz, 4H), 3.60-3.52 (m, 2H), 2.78 (t, J=6.8 Hz, 5H), 2.73-2.64 (m, 6H), 2.57 (t, J=5.4 Hz, 2H), 2.51-2.40 (m, 13H), 1.41 (p, J=7.3 Hz, 9H), 1.25 (d, J=4.2 Hz, 70H), 0.86 (t, J=7.0 Hz, 14H). $^{13}C$ NMR (101 MHz, $CDCl_3$) δ 172.63, 59.27, 56.02, 54.79, 52.28, 49.21, 32.73, 32.02, 31.98, 29.79, 29.72, 29.64, 29.63, 29.45, 29.39, 27.57, 27.27, 27.08, 22.79, 22.77, 14.21, 14.20. MS (ESI+): m/z (MH+) 880.84 for C54H109N3O5.

Synthesis of Compound I-3

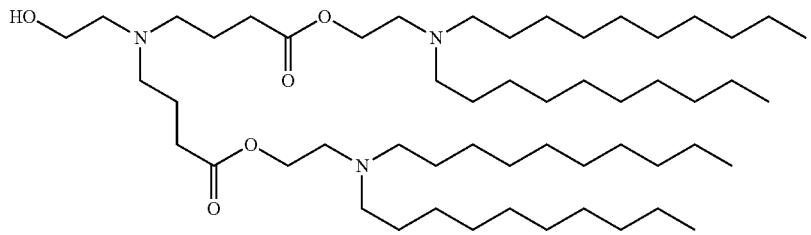 [SMILES: CCCCCCCCCCN(CCCCCCCCCC)CCOC(=O)CCCN(CCO)CCCC(=O)OCCN(CCCCCCCCCC)CCCCCCCCCC]

Compound 3 was synthesized according to General Synthesis Method C using Intermediate E. Product was isolated as a clear oil (24.9 mg, 9% yield). $^1$H NMR (500 MHz, cdcl$_3$) δ 4.11 (t, J=6.4 Hz, 4H), 3.53 (t, 2H), 2.67 (t, J=6.4 Hz, 4H), 2.58 (t, J=5.4 Hz, 2H), 2.48 (t, J=7.9 Hz, 4H), 2.43 (t, J=8.1 Hz, 8H), 2.31 (t, J=7.3 Hz, 3H), 1.76 (p, J=7.3 Hz, 4H), 1.46-1.35 (m, 8H), 1.32-1.20 (m, 56H), 0.87 (t, J=6.9 Hz, 12H). $^{13}$C NMR (126 MHz, cdcl$_3$) δ 173.45, 62.72, 58.74, 55.71, 54.78, 52.80, 52.21, 31.91, 31.90, 29.67, 29.66, 29.64, 29.61, 29.60, 29.58, 29.33, 27.47, 27.16, 22.67, 22.21, 14.10. MS (ESI+): m/z (MH+) 880.84 for C54H109N3O5.

Synthesis of Compound I-4

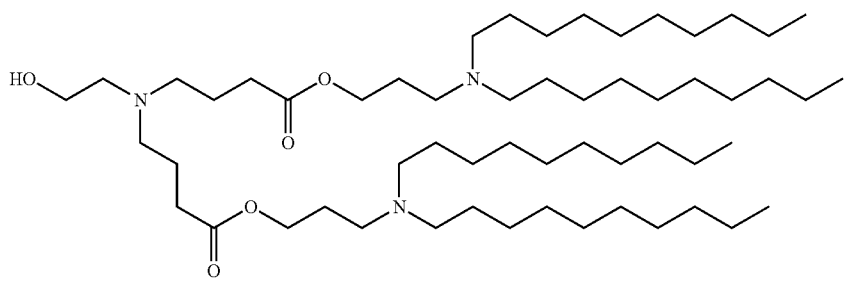 [SMILES: CCCCCCCCCCN(CCCCCCCCCC)CCCOC(=O)CCCN(CCO)CCCC(=O)OCCCN(CCCCCCCCCC)CCCCCCCCCC]

Compound 4 was synthesized according to General Synthesis Method C using Intermediate F. Product was isolated as a clear oil (22 mg, 13%) $^1$H NMR (500 MHz, cdcl$_3$) δ 4.10 (t, J=6.5 Hz, 4H), 3.79 (t, J=5.4 Hz, 1H), 3.53 (t, J=5.3 Hz, 2H), 2.70 (t, J=5.7 Hz, 1H), 2.58 (t, J=5.4 Hz, 3H), 2.57-2.52 (m, 3H), 2.51-2.41 (m, 13H), 2.30 (t, J=7.2 Hz, 4H), 1.85-1.80 (m, 3H), 1.76 (p, J=7.2 Hz, 5H), 1.72-1.67 (m, 1H), 1.45 (m, 9H), 1.34-1.19 (m, 72H), 0.95-0.77 (m, 15H). $^{13}$C NMR (126 MHz, cdcl$_3$) δ 173.56, 62.97, 58.86, 55.88, 53.99, 52.97, 50.57, 32.03, 32.01, 29.77, 29.71, 29.69, 29.68, 29.64, 29.45, 29.43, 27.59, 27.54, 22.80, 22.38, 14.24. MS (ESI+): m/z (MH+) 908.87 for C56H113N3O5.

Synthesis of Compound I-5

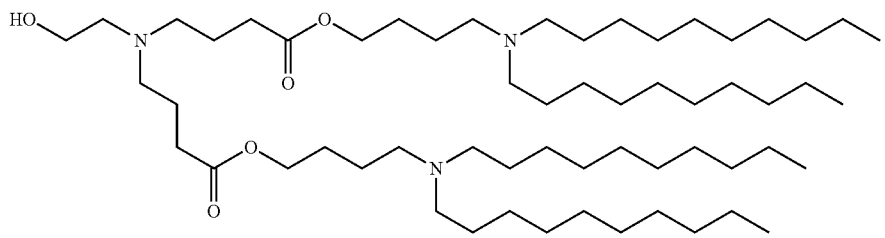 [SMILES: CCCCCCCCCCN(CCCCCCCCCC)CCCCOC(=O)CCCN(CCO)CCCC(=O)OCCCCN(CCCCCCCCCC)CCCCCCCCCC]

Compound 5 was synthesized according to General Synthesis Method C using Intermediate H. Product was isolated as a clear oil (78 mg, 18% yield). $^1$H NMR (500 MHz, cdcl$_3$) δ 4.08 (t, J=6.6 Hz, 4H), 3.53 (t, J=5.4 Hz, 2H), 2.58 (t, J=5.4 Hz, 2H), 2.49 (t, J=7.1 Hz, 5H), 2.46-2.36 (m, 10H), 2.31 (t, J=7.2 Hz, 4H), 1.76 (p, J=7.3 Hz, 4H), 1.63 (p, J=6.8 Hz, 4H), 1.51 (p, J=8.2 Hz, 5H), 1.43 (p, J=6.9 Hz, 8H), 1.34-1.17 (m, 56H), 0.87 (t, J=6.8 Hz, 12H). $^{13}$C NMR (126 MHz, cdcl$_3$) δ 173.71, 64.55, 58.92, 55.90, 54.16, 53.77, 53.01, 32.10, 32.05, 29.81, 29.77, 29.75, 29.74, 29.48, 27.74, 26.82, 22.83, 22.43, 14.26. MS (ESI+): m/z (MH+) 936.91 for C58H117N3O5.

Synthesis of Compound I-6

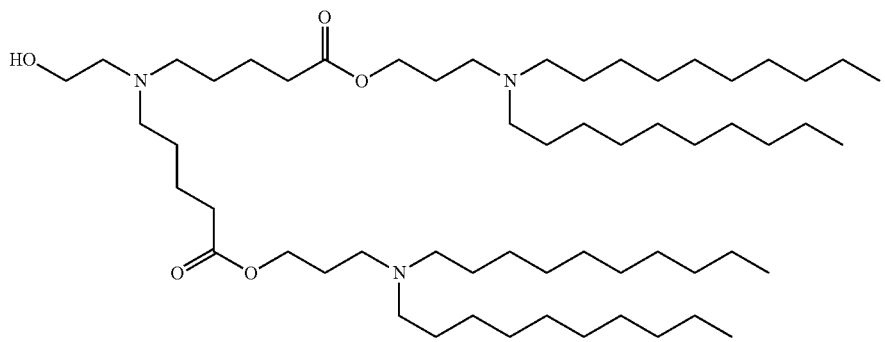 [SMILES: CCCCCCCCCCN(CCCCCCCCCC)CCCOC(=O)CCCCN(CCO)CCCCC(=O)OCCCN(CCCCCCCCCC)CCCCCCCCCC]

Compound 6 was synthesized according to General Synthesis Method C using Intermediate I. Product was isolated as a clear oil (36 mg, 8% yield). $^1$H NMR (500 MHz, cdcl$_3$) δ 4.10 (t, J=6.5 Hz, 5H), 3.52 (t, J=5.4 Hz, 2H), 2.57 (t, J=5.4 Hz, 2H), 2.48 (dt, J=14.9, 7.4 Hz, 9H), 2.40 (t, J=7.6 Hz, 9H), 2.30 (t, J=7.4 Hz, 5H), 1.77 (p, J=6.7 Hz, 5H), 1.61 (p, J=7.4 Hz, 4H), 1.52-1.36 (m, 14H), 1.34-1.16 (m, 56H), 0.95-0.73 (m, 11H). $^{13}$C NMR (126 MHz, cdcl$_3$) δ 173.62, 63.01, 58.59, 55.69, 54.18, 53.65, 50.60, 34.20, 32.04, 29.80, 29.76, 29.75, 29.74, 29.47, 27.67, 26.97, 26.81, 26.38, 22.91, 22.82, 14.25. MS (ESI+): m/z (MH+) 936.90 for C58H117N3O5.

Synthesis of Compound I-7

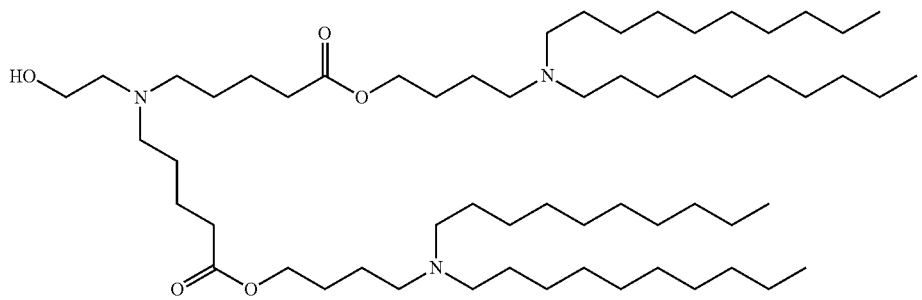 [SMILES: CCCCCCCCCCN(CCCCCCCCCC)CCCCOC(=O)CCCCN(CCO)CCCCC(=O)OCCCCN(CCCCCCCCCC)CCCCCCCCCC]

Compound 7 was synthesized according to General Synthesis Method C using Intermediate J. Product was isolated as a clear oil (100 mg, 24% yield). $^1$H NMR (500 MHz, cdcl$_3$) δ 4.05 (t, J=6.7 Hz, 4H), 3.51 (t, J=5.4 Hz, 2H), 2.54 (t, J=5.4 Hz, 2H), 2.47-2.34 (m, 16H), 2.29 (t, J=7.4 Hz, 4H), 1.66-1.55 (m, 8H), 1.52-1.35 (m, 16H), 1.27-1.22 (m, 46H), 0.93-0.80 (m, 12H). $^{13}$C NMR (126 MHz, cdcl$_3$) δ 173.56, 64.33, 58.51, 55.56, 54.07, 53.65, 53.52, 50.54, 34.06, 31.88, 29.64, 29.60, 29.57, 29.56, 29.31, 27.60, 26.79, 26.69, 26.67, 23.48, 22.76, 22.65, 14.08. MS (ESI+): m/z (MH+) 964.94 for C60H121N3O5.

Synthesis of Compound I-8

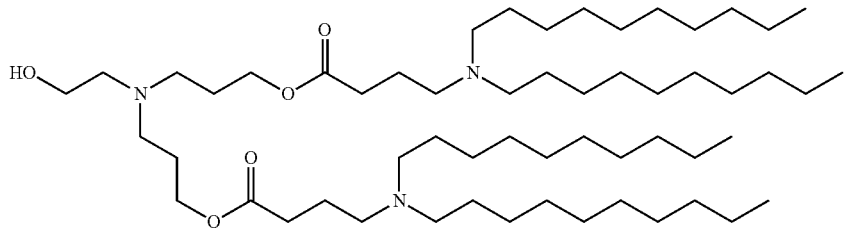 [SMILES: CCCCCCCCCCN(CCCCCCCCCC)CCCC(=O)OCCCN(CCO)CCCOC(=O)CCCN(CCCCCCCCCC)CCCCCCCCCC]

Intermediate K (0.032 g, 0.11 mmol, 1 eq), Intermediate L (0.105 g, 0.27 mmol, 2.5 eq), EDC*HCl (0.063 g, 0.33 mmol, 3 eq), DMAP (0.005 g, 0.04 mmol, 0.4 eq), and DIPEA (113 uL, 0.65 mmol, 6 eq) were dissolved in DCM (5 mL) and stirred at ambient temperatures for 18 hours. The reaction was then concentrated to a crude oil and purified by column chromatography using a 10-30% (22% MeOH, 3% NH$_4$OH in dichloromethane) in dichloromethane gradient. ((2-((tert-butyldimethylsilyl)oxy)ethyl)azanediyl)bis(propane-3,1-diyl)bis(4-(didecylamino)butanoate) was isolated as a clear oil (0.143 mg, 130% yield with remaining solvent impurities). $^1$H NMR (500 MHz, cdcl$_3$) δ 4.09 (t, J=6.6 Hz, 4H), 3.62 (t, J=6.5 Hz, 2H), 2.66-2.42 (m, 18H), 2.33 (t, J=7.2 Hz, 4H), 1.85-1.77 (m, 4H), 1.73 (p, J=7.1 Hz, 5H), 1.53-1.44 (m, 7H), 1.33-1.17 (m, 64H), 0.91-0.83 (m, 23H), 0.04 (s, 6H). $^{13}$C NMR (126 MHz, cdcl$_3$) δ 173.58, 62.86, 61.91, 56.29, 53.87, 53.55, 51.42, 32.02, 29.75, 29.72, 29.70, 29.64, 29.44, 27.56, 26.95, 26.05, 22.80, 18.40, 14.23, −5.21. MS (ESI+): m/z (MH+) 1022.96 for C62H127N3O5Si.

((2-((tert-butyldimethylsilyl)oxy)ethyl)azanediyl)bis(propane-3,1-diyl) bis(4-(didecylamino)butanoate) (0.120 g, 0.1 1 mmol, 1 eq) and 1M tetra-n-butylammonium fluoride in THF (440 uL, 0.44 mmol, 4 eq) were dissolved in diethyl ether (5 mL) and stirred at ambient temperatures for 18 hours. The reaction mixture was transferred to a separatory funnel and diluted with dichloromethane (5 mL). The organic layer was washed with 10% NaOH in saturated NH$_4$OH (4×15 mL), brine (1x 50 mL), and then dried over anhydrous salt. The organic fraction was concentrated to a crude oil and purified by column chromatography using a 10-30% (22% MeOH, 3% NH$_4$OH in dichloromethane) in dichloromethane gradient. Compound 8 was isolated as a clear oil (57 mg, 57%). $^1$H NMR (500 MHz, cdcl$_3$) δ 4.10 (t, J=6.4 Hz, 4H), 3.54 (dd, J=5.7, 4.9 Hz, 2H), 2.58 (t, J=5.2 Hz, 2H), 2.53 (t, J=7.5 Hz, 4H), 2.41 (t, J=7.3 Hz, 4H), 2.39-2.35 (m, 8H), 2.31 (t, J=7.4 Hz, 4H), 1.83-1.66 (m, 8H), 1.49-1.35 (m, 11H), 1.33-1.19 (m, 64H), 0.91 (t, J=7.3 Hz, 4H), 0.87 (t, J=6.9 Hz, 12H). $^{13}$C NMR (126 MHz, cdcl$_3$) δ 173.73, 62.28, 58.75, 55.82, 54.06, 53.68, 53.20, 50.31, 32.07, 31.90, 29.67, 29.63, 29.60, 29.33, 27.57, 27.01, 26.42, 22.67, 22.45, 20.71, 14.10, 14.02. MS (ESI+): m/z (MH+) 908.87 for C56H113N3O5.

Synthesis of Compound I-9

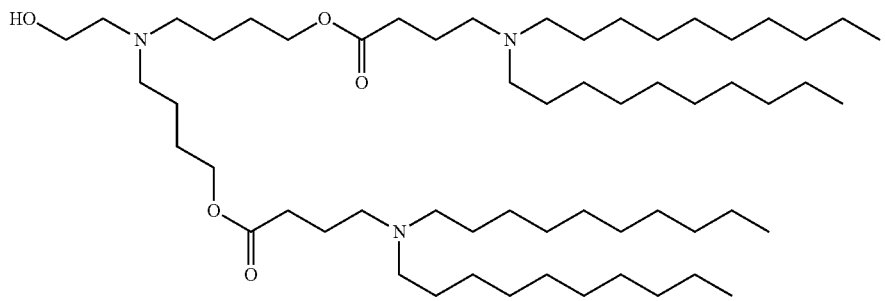 [SMILES: CCCCCCCCCCN(CCCCCCCCCC)CCCC(=O)OCCCCN(CCO)CCCCOC(=O)CCCN(CCCCCCCCCC)CCCCCCCCCC]

Compound 9 was synthesized according to General Synthesis Method C using Intermediate M. Product was isolated as a clear oil (59 mg, 10%). $^1$H NMR (500 MHz, cdcl$_3$) δ 4.04 (t, J=6.6 Hz, 4H), 3.52 (t, J=5.5 Hz, 2H), 2.59-2.44 (m, 17H), 2.33 (t, J=7.2 Hz, 4H), 1.81 (p, J=7.3 Hz, 3H), 1.60 (p, J=6.7 Hz, 5H), 1.53-1.43 (m, 11H), 1.31-1.16 (m, 58H), 0.85 (t, J=6.9 Hz, 12H). $^{13}$C NMR (126 MHz, cdcl$_3$) δ 173.48, 64.29, 58.55, 55.62, 53.73, 53.57, 52.95, 52.87, 31.96, 31.92, 31.86, 29.68, 29.65, 29.63, 29.61, 29.55, 29.50, 29.45, 29.38, 29.37, 29.32, 29.31, 27.47, 27.44, 26.59, 26.10, 23.68, 22.74, 21.58, 14.18. MS (ESI+): m/z (MH+) 936.90 for C58H117N3O5.

Synthesis of Compound I-10

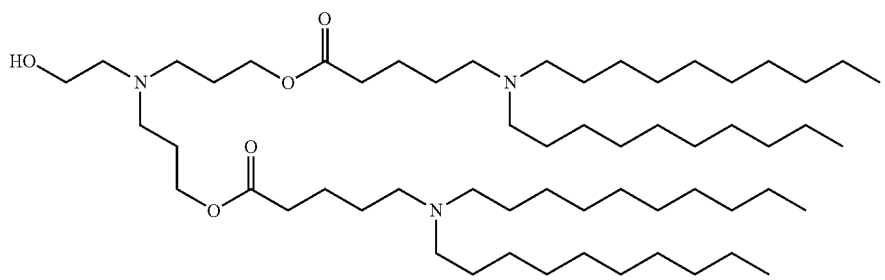 [SMILES: CCCCCCCCCCN(CCCCCCCCCC)CCCCC(=O)OCCCN(CCO)CCCOC(=O)CCCCN(CCCCCCCCCC)CCCCCCCCCC]

Compound 10 was synthesized according to General Synthesis Method C using Intermediate P. Product was isolated as a clear oil (38 mg, 43%). $^1$H NMR (500 MHz, cdcl$_3$) δ 4.10 (t, J=6.4 Hz, 4H), 3.53 (t, J=5.4 Hz, 2H), 2.57 (t, J=5.4 Hz, 2H), 2.53 (t, J=7.0 Hz, 3H), 2.40-2.33 (m, 12H), 2.30 (t, J=7.5 Hz, 4H), 1.76 (p, J=6.6 Hz, 4H), 1.59 (p, J=7.3 Hz, 4H), 1.49-1.34 (m, 13H), 1.32-1.18 (m, 58H), 0.86 (t, J=7.0 Hz, 12H). $^{13}$C NMR (126 MHz, cdcl$_3$) δ 173.76, 62.41, 58.93, 55.98, 54.26, 53.87, 53.52, 50.45, 34.32, 32.02, 29.79, 29.76, 29.72, 29.45, 27.77, 27.02, 26.77, 26.54, 23.16, 22.79, 14.22. MS (ESI+): m/z (MH+) 936.91 for C58H117N3O5.

Synthesis of Compound I-11

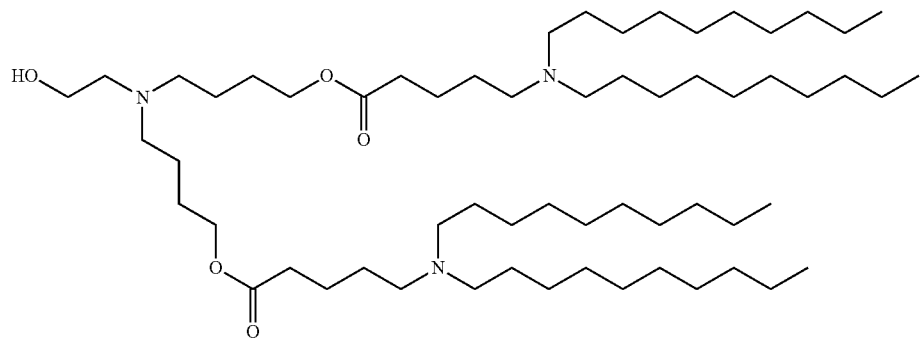 [SMILES: CCCCCCCCCCN(CCCCCCCCCC)CCCCC(=O)OCCCCN(CCO)CCCCOC(=O)CCCCN(CCCCCCCCCC)CCCCCCCCCC]

Compound 11 was synthesized according to General Synthesis Method C using Intermediate Q. Product was isolated as a clear oil (43 mg, 12%). $^1$H NMR (500 MHz, cdcl$_3$) δ 4.05 (t, J=6.6 Hz, 4H), 3.52 (t, J=5.5 Hz, 2H), 2.56 (t, J=5.5 Hz, 2H), 2.46 (t, J=7.3 Hz, 4H), 2.41-2.33 (m, 12H), 2.30 (t, J=7.5 Hz, 4H), 1.65-1.55 (m, 8H), 1.52-1.35 (m, 16H), 1.24 (m, 58H), 0.91-0.81 (m, 12H). $^{13}$C NMR (126 MHz, cdcl$_3$) δ 173.84, 64.17, 58.66, 55.68, 54.26, 53.85, 53.61, 34.35, 32.02, 29.79, 29.76, 29.72, 29.45, 27.76, 27.02, 26.71, 26.68, 23.78, 23.17, 22.80, 14.23. MS (ESI+): m/z (MH+) 964.93 for C60H121N3O5.

Synthesis of Compound I-12

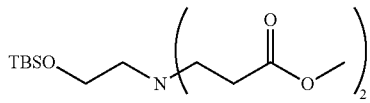

2-amino-1-ethanol (0.916, 15 mmol, 1 eq) was added to a mixture of imidazole (2.042 g, 30 mmol, 2 eq) and tert-butyldimethylsilyl chloride (2.487 g, 16.5 mmo, 1.1 eq) in dichloromethane (50 mL) and stirred for 3 hr at room temperature. The mixture was then diluted with water (60 mL) and extracted with dichloromethane (3×30 mL). The organic fractions were washed with brine (1×50 mL) and then dried over anhydrous salt. The organic fractions were concentrated under vacuum to produce 2-((tert-butyldimethylsilyl)oxy)ethan-1-amine (2.96 g, 112%) and used without further purification. $^1$H NMR (400 MHz, CDCl$_3$) δ 3.58 (t, J=5.3 Hz, 2H), 2.73 (t, 2H), 0.86 (s, 9H), 0.02 (s, 6H).

2-((tert-butyldimethylsilyl)oxy)ethan-1-amine (2.96 g, 16.9 mmol, 1 eq) was combined with methyl acrylate (3.87 g, 45 mmol, 3 eq) in methanol (10 mL). The mixture was purged with nitrogen, covered with foil, and stirred for 3 days at room temperature. Consumption of 2-amino-1-ethanol was monitored by TLC (20% MeOH/DCM). Solvent and excess methyl acrylate were removed under vacuum to produce Intermediate R as a clear, colourless oil (3.72 g, 71%). $^1$H NMR (400 MHz, CDCl$_3$) δ 3.59 (s, 7H), 2.76 (t, J=7.2 Hz, 4H), 2.53 (t, J=6.4 Hz, 2H), 2.38 (d, J=14.3 Hz, 2H), 0.82 (s, 9H), −0.02 (s, 6H).

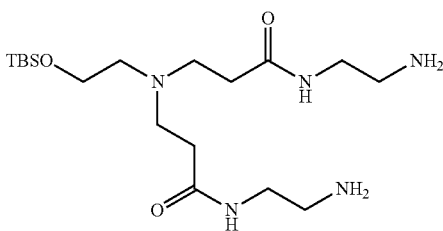 [SMILES: CC(C)(C)[Si](C)(C)OCCN(CCC(=O)NCCN)CCC(=O)NCCN]

Ethylenediamine (3.01 g, 50 mmol, 10 eq) and Intermediate R (1.74 g, 5 mmol, 1 eq) were added together in methanol (10 mL). The mixture was purged with nitrogen, covered with foil, and stirred for 3 days at room temperature. Consumption of Intermediate R was monitored by TLC (10% MeOH/DCM). Solvent and excess ethylenediamine were removed under reduced pressure. The residual ethylenediamine was removed by successive washes with diethyl ether (5×30 mL). Residual ether was removed under vacuum to yield Intermediate S as a clear, colourless, viscous oil (0.510 g, 1.26 mmol, 25%). $^1$H NMR (500 MHz, CDCl$_3$) δ 7.57 (t, J=5.8 Hz, 2H), 3.64 (t, J=5.9 Hz, 2H), 3.24 (q, J=5.8 Hz, 4H), 2.80-2.73 (m, 8H), 2.58 (t, J=5.9 Hz, 2H), 2.32 (t, J=6.3 Hz, 4H), 0.84 (s, 9H), 0.01 (s, 6H). $^{13}$C NMR (500 MHz, CDCl$_3$) δ 172.87, 61.11, 55.68, 50.67, 50.10, 41.83, 41.36, 34.09, 25.87, 18.25, −5.35.

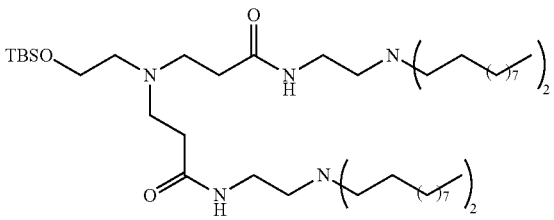

A mixture of 1-bromodecane (0.274 g, 1.239 mmol, 5 eq), DIPEA (0.216 mL, 1.239 mmol, 5 eq) and Intermediate S (0.100 g, 0.248 mmol, 1 eq) were dissolved together in ethanol (3 mL) in an 8-dram screw-cap vial. The mixture was covered with foil and stirred at 65° C. overnight. The crude oil was purified by flash chromatography using a 25 g silica cartridge and a solvent gradient from 10% ULTRA/DCM to 40% ULTRA/DCM. The desired fractions were combined and concentrated under vacuum to a pale yellow, clear, viscous oil of Intermediate T (0.0675 g, 0.700 mmol, 28%). $^1$H NMR (500 MHz, CDCl$_3$) δ 7.12 (s, 2H), 3.66 (q, J=5.9 Hz, 2H), 3.29 (p, J=6.3 Hz, 4H), 2.80 (t, J=6.7 Hz, 4H), 2.65-2.55 (m, 6H), 2.47 (t, J=7.7 Hz, 7H), 2.32 (t, J=6.6 Hz, 4H), 1.43 (p, J=7.3 Hz, 8H), 1.32-1.17 (m, 53H), 0.90-0.82 (m, 23H), 0.03 (t, J=1.4 Hz, 6H). $^{13}$C NMR (500 MHz, CDCl$_3$) δ 172.31, 61.24, 53.97, 52.96, 50.70, 50.48, 33.91, 32.01, 32.00, 31.98, 29.80, 29.71, 29.69, 29.44, 27.61, 26.02, 26.01, 22.78, 18.35, 14.21, -5.21.

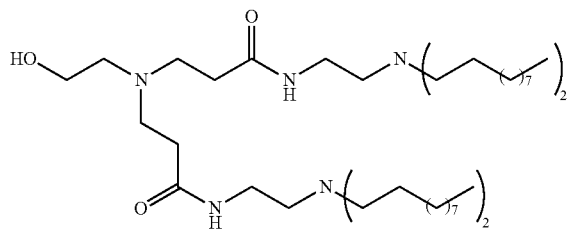

Intermediate T was dissolved in diethyl ether (50 mL) cooled to 0° C. and a solution of tetra-n-butylammonium fluoride (TBAF) was added. The reaction mixture was returned to room temperature, covered with foil, and stirred for 18 hours. Consumption of the TBS protected material was monitored by TLC (35% ULTRA/DCM). The organic fractions were washed with 20% 1M sodium hydroxide in saturated ammonium chloride (5×15 mL) and brine (lx 50 mL), and then dried over anhydrous salt. The organic fractions were concentrated to a crude oil and purified by flash chromatography using a 50 g silica cartridge and a solvent gradient from 20% ULTRA/DCM to 50% ULTRA/DCM. The desired fractions were collected and concentrated under vacuum to yield a clear, colourless, viscous oil (0.0270 g, 0.0317 mmol, 45%). $^{1}$H NMR (500 MHz, CDCl$_3$) δ 7.17 (s, 2H), 3.60 (t, J=4.9 Hz, 1H), 3.28 (q, J=5.7 Hz, 4H), 2.76 (t, J=6.3 Hz, 4H), 2.60-2.52 (m, 5H), 2.44 (t, J=7.5 Hz, 5H), 2.34 (t, J=6.3 Hz, 4H), 1.42 (p, J=7.7 Hz, 7H), 1.38-1.17 (m, 52H), 0.92 (t, J=7.4 Hz, 2H), 0.87 (t, J=7.1 Hz, 12H). $^{13}$C NMR (500 MHz, CDCl$_3$) δ 172.36, 59.16, 56.24, 53.89, 53.18, 50.08, 36.91, 33.96, 32.05, 29.84, 29.77, 29.74, 29.70, 29.48, 27.74, 26.32, 22.82, 20.80, 14.25, 14.12. MS (ESI+) m/z: [M+H]+ calc'd for $C_{52}H_{107}N_5O_3$, 850.84; found, 850.84.

Example 2: mRNA-LNP Formulation and Characterization

A. mRNA synthesis

Linearized DNA templates (Genscript USA, NJ, USA) containing a 101 nucleotides (nt) poly(A) tail were transcribed using the HiScribe T7 mRNA Kit with CleanCap Reagent AG (New England Biolabs, MA, USA). In vitro transcription was performed with complete substitution of uridine with n1-methylpseudouridine (Trilink Biotechnologies, CA, USA.). All mRNAs were purified by silica-column chromatography followed by cellulose purification to remove dsRNA impurities (Baiersdörfer, M. et al. A Facile Method for the Removal of dsRNA Contaminant from In Vitro-Transcribed mRNA. Mol Ther—Nucleic Acids 15, 2019). The length and integrity of mRNA samples were validated on an Agilent TapeStation system (Agilent Technologies, CA, USA) at The Centre for Applied Genomics (Toronto, ON, CA). A260/A280 and A260/A230 ratios were greater than 1.9 and 2.0, respectively.

TABLE 1

| mRNA sequences | | |
|---|---|---|
| Encoded protein | Length | mRNA sequence (5' to 3') |
| Firefly luciferase | 1865 nt | AGGGAGACUGCCACCAUGGAGGACGCCAAGAACAUCA AGAAGGGCCCCGCCCCCUUCUACCCCCUGGAGGACGG CACCGCCGGCGAGCAGCUGCACAAGGCCAUGAAGCGG UACGCCCUGGUGCCCGGCACCAUCGCCUUCACCGACG CCCACAUCGAGGUGGACAUCACCUACGCCGAGUACUU CGAGAUGAGCGUGCGGCUGGCCGAGGCCAUGAAGCGG UACGGCCUGAACACCAACCACCGGAUCGUGGUGUGCA GCGAGAACAGCCUGCAGUUCUUCAUGCCCGUGCUGGG CGCCCUGUUCAUCGGCGUGGCCGUGGCCCCCGCCAAC GACAUCUACAACGAGCGGGAGCUGCUGAACAGCAUGG GCAUCAGCCAGCCCACCGUGGUGUUCGUGAGCAAGAA GGGCCUGCAGAAGAUCCUGAACGUGCAGAAGAAGCU GCCCAUCAUCCAGAAGAUCAUCAUCAUGGACAGCAAG ACCGACUACCAGGGCUUCCAGAGCAUGUACACCUUCG UGACCAGCCACCUGCCCCCCGGCUUCAACGAGUACGA CUUCGUGCCCGAGAGCUUCGACCGGGACAAGACCAUC GCCCUGAUCAUGAACAGCAGCGGCAGCACCGGCCUGC CCAAGGGCGUGGCCCUGCCCCACCGGACCGCCUGCGU GCGGUUCAGCCACGCCCGGGACCCCAUCUUCGGCAAC CAGAUCAUCCCCGACACCGCCAUCCUGAGCGUGGUGC CCUUCCACCACGGCUUCGGCAUGUUCACCACCCUGGG CUACCUGAUCUGCGGCUUCGGGUGGUGCUGAUGUAC CGGUUCGAGGAGGAGCUGUUCCUGCGGAGCCUGCAGG ACUACAAGAUCCAGAGCGCCCUGCUGGUGCCCACCCU GUUCAGCUUCUUCGCCAAGAGCACCCUGAUCGACAAG UACGACCUGAGCAACCUGCACGAGAUCGCCAGCGGCG GCGCCCCCCUGAGCAAGGAGGUGGGCGAGGCCGUGGC CAAGCGGUUCCACCUGCCCGGCAUCCGGCAGGGCUAC GGCCUGACCGAGACCACCAGCGCCAUCCUGAUCACCC CCGAGGGCGACGACAAGCCCGGCGCCGUGGGCAAGGU GGUGCCCUUCUUCGAGGCCAAGGUGGUGGACCUGGAC ACCGGCAAGACCCUGGGCGUGAACCAGCGGGGCGAGC UGUGCGUGCGGGGCCCCAUGAUCAUGAGCGGCUACGU GAACAACCCCGAGGCCACCAACGCCCUGAUCGACAAG GACGGCUGGCUGCACAGCGGCGACAUCGCCUACUGGG |

TABLE 1-continued

| mRNA sequences | | |
|---|---|---|
| Encoded protein | Length | mRNA sequence (5' to 3') |
| | | ACGAGGACGAGCACUUCUUCAUCGUGGACCGGCUCAA<br>GAGCCUGAUCAAGUACAAGGGCUACCAGGUGGCCCCC<br>GCCGAGCUGGAGAGCAUCCUGCUGCAGCACCCCAACA<br>UCUUCGACGCCGGCGUGGCCGGCCUGCCCGACGACGA<br>CGCCGGCGAGCUGCCCGCCGCCGUGGUGGUGCUGGAG<br>CACGGCAAGACCAUGACCGAGAAGGAGAUCGUGGACU<br>ACGUGGCCAGCCAGGUGACCACCGCCAAGAAGCUGCG<br>GGGCGGCGUGGUGUUCGUGGACGAGGUGCCCAAGGG<br>CCUGACCGGCAAGCUGGACGCCCGGAAGAUCCGGGAG<br>AUCCUGAUCAAGGCCAAGAAGGGCGGCAAGAUCGCCG<br>UGUGAUAAGCUGCCUUCUGCGGGGCUUGCCUUCUGGC<br>CAUGCCCUUCUUCUCUCCCUUGCACCUGUACCUCUUG<br>GUCUUUGAAUAAAGCCUGAGUAGGAAGAAAAAAAAA<br>AAAAAAAAAAAAAAAAAAAAAAAAAAAAAAAAAAAA<br>AAAAAAAAAAAAAAAAAAAAAAAAAAAAAAAAAAAA<br>AAAAAAAAAAAAAAAAAAAA (SEQ ID NO: 1) |
| Human Erythropoietin (hEPO) | 794 nt | AGGGAGACUGCCACCAUGGGCGUGCACGAGUGCCCCG<br>CCUGGCUGUGGCUGCUGCUGAGCCUGCUGAGCCUGCC<br>CCUGGGCCUGCCCGUGCUGGGCGCCCCCCCCCGGCUG<br>AUCUGCGACAGCCGGGUGCUGGAGCGGUACCUGCUGG<br>AGGCCAAGGAGGCCGAGAACAUCACCACCGGCUGCGC<br>CGAGCACUGCAGCCUGAACGAGAACAUCACCGUGCCC<br>GACACCAAGGUGAACUUCUACGCCUGGAAGCGGAUGG<br>AGGUGGGCCAGCAGGCCGUGGAGGUGUGGCAGGGCC<br>UGGCCCUGCUGAGCGAGGCCGUGCUGCGGGGCCAGGC<br>CCUGCUGGUGAACAGCAGCCAGCCCUGGGAGCCCCUG<br>CAGCUGCACGUGGACAAGGCCGUGAGCGGCCUGCGGA<br>GCCUGACCACCCUGCUGCGGGCCCUGGGCGCCCAGAA<br>GGAGGCCAUCAGCCCCCCCGACGCCGCCAGCGCCGCC<br>CCCCUGCGGACCAUCACCGCCGACACCUUCCGGAAGC<br>UGUUCCGGGUGUACAGCAACUUCCUGCGGGGCAAGCU<br>GAAGCUGUACACCGGCGAGGCCUGCCGGACCGGCGAC<br>CGGUGAUAAGCUGCCUUCUGCGGGGCUUGCCUUCUGG<br>CCAUGCCCUUCUUCUCUCCCUUGCACCUGUACCUCUU<br>GGUCUUUGAAUAAAGCCUGAGUAGGAAGAAAAAAAA<br>AAAAAAAAAAAAAAAAAAAAAAAAAAAAAAAAAAAA<br>AAAAAAAAAAAAAAAAAAAAAAAAAAAAAAAAAAAA<br>AAAAAAAAAAAAAAAAAAAAA (SEQ ID NO: 2) |
| Hemagglutinin of influenza A H1N1 strain A/PR/8/34 (PR8) | 1911 nt | AGGGAGACTGCCACCATGAAGGCCAACCTGCTGGTGCT<br>GCTGTGCGCCCTGGCCGCCGCCGACGCCGACACCATCT<br>GCATCGGCTACCACGCCAACAACAGCACCGACACCGTG<br>GACACCGTGCTGGAGAAGAACGTGACCGTGACCCACA<br>GCGTGAACCTGCTGGAGGACAGCCACAACGGCAAGCT<br>GTGCCGGCTGAAGGGCATCGCCCCCCTGCAGCTGGGCA<br>AGTGCAACATCGCCGGCTGGCTGCTGGGCAACCCCGAG<br>TGCGACCCCCTGCTGCCCGTGCGGAGCTGGAGCTACAT<br>CGTGGAGACCCCCAACAGCGAGAACGGCATCTGCTACC<br>CCGGCGACTTCATCGACTACGAGGAGCTGCGGGAGCA<br>GCTGAGCAGCGTGAGCAGCTTCGAGCGGTTCGAGATCT<br>TCCCCAAGGAGAGCAGCTGGCCCAACCACAACACCAA<br>CGGCGTGACCGCCGCCTGCAGCCACGAGGGCAAGAGC<br>AGCTTCTACCGGAACCTGCTGTGGCTGACCGAGAAGGA<br>GGGCAGCTACCCCAAGCTGAAGAACAGCTACGTGAAC<br>AAGAAGGGCAAGGAGGTGCTGGTGCTGTGGGGCATCC<br>ACCACCCCAGCAACAGCAAGGAGCAGCAGAACCTGTA<br>CCAGAACGAGAACGCCTACGTGAGCGTGGTGACCAGC<br>AACTACAACCGGCGGTTCACCCCCGAGATCGCCGAGCG<br>GCCCAAGGTGCGGGACCAGGCCGGCCGGATGAACTAC<br>TACTGGACCCTGCTGAAGCCCGGCGACACCATCATCTT<br>CGAGGCCAACGGCAACCTGATCGCCCCCATGTACGCCT<br>TCGCCCTGAGCCGGGGCTTCGGCAGCGGCATCATCACC<br>AGCAACGCCAGCATGCACGAGTGCAACACCAAGTGCC<br>AGACCCCCCTGGGCGCCATCAACAGCAGCCTGCCCTAC<br>CAGAACATCCACCCCGTGACCATCGGCGAGTGCCCCAA<br>GTACGTGCGGAGCGCCAAGCTGCGGATGGTGACCGGC<br>CTGCGGAACATCCCCAGCATCCAGAGCCGGGGCCTGTT<br>CGGCGCCATCGCCGGCTTCATCGAGGGCGGCTGGACCG<br>GCATGATCGACGGCTGGTACGGCTACCACCACCAGAAC<br>GAGCAGGGCAGCGGCTACGCCGCCGACCAGAAGAGCA<br>CCCAGAACGCCATCAACGGCATCACCAACAAGGTGAA<br>CACCGTGATCGAGAAGATGAACATCCAGTTCACCGCCG<br>TGGGCAAGGAGTTCAACAAGCTGGAGAAGCGGATGGA<br>GAACCTGAACAAGAAGGTGGACGACGGCTTCCTGGAC<br>ATCTGGACCTACAACGCCGAGCTGCTGGTGCTGCTGGA |

TABLE 1-continued mRNA sequences

| Encoded protein | Length | mRNA sequence (5' to 3') |
|---|---|---|
| | | GAACGAGCGGACCCTGGACTTCCACGACAGCAACATG<br>AAGAACCTGTACGAGAAGGTGAAGAGCCAGCTGAAGA<br>ACAACGCCAAGGAGATCGGCAACGGCTGCTTCGAGTTC<br>TACCACAAGTGCGACAACGAGTGCATGGAGAGCGTGC<br>GGAACGGCACCTACGACTACCCCAAGTACAGCGAGGA<br>GAGCAAGCTGAACCGGGAGAAGGTGGACGGCGTGAAG<br>CTGGAGAGCATGGGCATCTACCAGATCCTGGCCATCTA<br>CAGCACCGTGGCCAGCAGCCTGGTGCTGCTGGTGAGCC<br>TGGGCGCCATCAGCTTCTGGATGTGCAGCAACGGCAGC<br>CTGCAGTGCCGGATCTGCATCTGATAAGCTGCCTTCTG<br>CGGGGCTTGCCTTCTGGCCATGCCCTTCTTCTCTCCCTT<br>GCACCTGTACCTCTTGGTCTTTGAATAAAGCCTGAGTA<br>GGAAGAAAAAAAAAAAAAAAAAAAAAAAAAAAAAAA<br>AAAAAAAAAAAAAAAAAAAAAAAAAAAAAAAAAAAA<br>AAAAAAAAAAAAAAAAAAAAAAAAAAAAAAAAAAT<br>(SEQ ID NO: 3) |

B. mRNA-LNP Formulation

Lipid components were combined at specific molar ratios (50 mol % Compound of the application or Table 2, 38.5 mol % cholesterol (VWR 97061-660), 10 mol % 1,2-distearoyl-sn-glycero-3-phosphocholine (DSPC) (VWR TCD3926), and 1.5 mol % 1,2-dimyristoyl-rac-glycero-3-methoxypoly-ethylene glycol-2000 (PEG-DMG) (Avanti Polar Lipids 880151)) in ethanol at final lipid concentration of 16 mg/ml. SM-102, ALC-0315, and DLin-MC3-DMA were purchased from Cayman Chemicals. Compound I-12 was synthesized as previously described (Tilstra, G. et al. Iterative Design of Ionizable Lipids for Intramuscular mRNA Delivery. J Am Chem Soc, 2023, herein incorporated by reference in its entirety). Messenger RNA was diluted to 0.27 mg/ml in 25 mM sodium acetate pH 4.5. Formulations were prepared at a total lipid-to-mRNA weight ratio of 20:1, each batch using 0.1 mg of mRNA and 2 mg of lipids. The molar ratio of tertiary amines of the compound of application to mRNA phosphates, also known as the N/P ratio, thus varied between formulations. The lipid and mRNA phases were rapidly injected with syringe pumps into a herringbone micromixer at flow rates of 4.5 ml/min and 1.5 ml/min, respectively. Formulated mRNA was directly collected into a dialysis device with a molecular weight cutoff of 10 kDa (Thermo Scientific 66383). Formulations were dialyzed twice against 1000-fold volume of 20 mM Tris-HCl pH 7.5 at 4° C. The first dialysis was carried out for 4 hours, and formulations were then dialyzed overnight. The resulting LNP suspension was removed from the dialysis device and filtered through a 0.2 μm polyethersulfone syringe filter (Cytiva 99161302). The LNP solution was diluted with concentrated sucrose to a final concentration of 20 mM Tris-HCl and 8% sucrose. LNP formulations in Tris-sucrose buffer were stored at −80° C. in 1.5 ml polypropylene tubes (Eppendorf 022431021) at mRNA concentrations ranging from 0.03 to 0.05 mg/ml. Aliquots were thawed overnight at 4° C. and diluted in 20 mM Tris-HCl/8% sucrose.

TABLE 2

Exemplary Lipid Compounds

| Compound | Structure |
|---|---|
| I-12 | [chemical structure] |
| SM-102 | [chemical structure] |

TABLE 2-continued

Exemplary Lipid Compounds

| Compound | Structure |
|---|---|
| DLin-MC3-DMA | 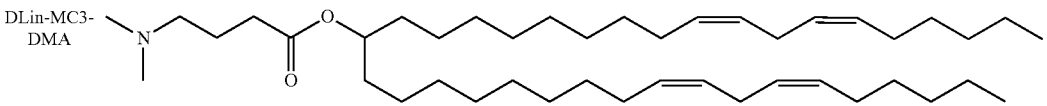 |
| ALC-0315 | 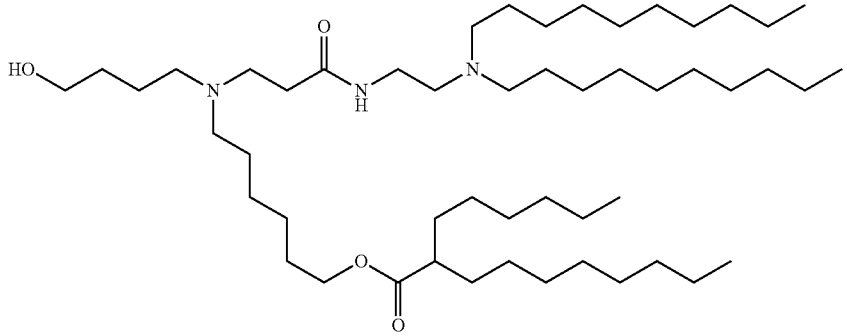 [SMILES: CCCCCCCCCCN(CCCCCCCCCC)CCNC(=O)CCN(CCCCO)CCCCCCOC(=O)C(CCCCCC)CCCCCCCC] |

TABLE 3

LNP formulations

| LNP # | Compound | mRNA | Lipids-to-mRNA mass ratio | N/P | Lipid molar ratios (Compound/Cholesterol/DSPC/PEG-DMG) |
|---|---|---|---|---|---|
| F04 | I-1 | Firefly luciferase | 20 | 14.0 | 50/38.5/10/1.5 |
| F05 | I-2 | Firefly luciferase | 20 | 13.7 | 50/38.5/10/1.5 |
| F06 | I-3 | Firefly luciferase | 20 | 13.7 | 50/38.5/10/1.5 |
| F07 | I-4 | Firefly luciferase | 20 | 13.5 | 50/38.5/10/1.5 |
| F08 | I-8 | Firefly luciferase | 20 | 13.5 | 50/38.5/10/1.5 |
| F10 | SM-102 | Firefly luciferase | 20 | 5.2 | 50/38.5/10/1.5 |
| F11 | ALC-0315 | Firefly luciferase | 20 | 5.0 | 50/38.5/10/1.5 |
| F12 | DLin-MC3-DMA | Firefly luciferase | 20 | 5.5 | 50/38.5/10/1.5 |
| F13 | I-5 | Firefly luciferase | 20 | 13.2 | 50/38.5/10/1.5 |
| F14 | I-6 | Firefly luciferase | 20 | 13.2 | 50/38.5/10/1.5 |
| F15 | I-7 | Firefly luciferase | 20 | 13.0 | 50/38.5/10/1.5 |
| F16 | I-12 | Firefly luciferase | 20 | 14.0 | 50/38.5/10/1.5 |
| F17 | I-6 | hEPO | 20 | 13.2 | 50/38.5/10/1.5 |
| F18 | I-12 | hEPO | 20 | 14.1 | 50/38.5/10/1.5 |
| F19 | SM-102 | hEPO | 20 | 5.2 | 50/38.5/10/1.5 |
| F26 | I-12 | PR8 | 20 | 14.8 | 50/38.5/10/1.5 |
| F27 | I-6 | PR8 | 20 | 13.9 | 50/38.5/10/1.5 |
| F28 | SM-102 | PR8 | 20 | 5.5 | 50/38.5/10/1.5 |

C. mRNA-LNP Characterization

Size Distribution and Zeta Potential

A Zetasizer (Malvern Instruments Ltd, Malvern, Worcestershire, UK) was used to determine the nanoparticle size (expressed as the Z average of the hydrodynamic diameter), the polydispersity index (PDI) and the zeta potential (ZP) of LNPs diluted at 2 ng/d in 20 mM Tris-HCl pH 7.5.

mRNA Concentration and Encapsulation Efficiency

For LNPs encapsulating mRNA, mRNA concentration and encapsulation efficiency were determined using a modified Quant-iT RiboGreen assay (Invitrogen). The assay was performed in triplicates in a 96 well plate. 12 µL of the LNP sample or TE buffer (composed of 10 mM Tris-HCl containing 1 mM EDTA·Na$_2$) (blank sample) was diluted in 300 µL of 1×TE buffer pH 7.5. 50 µL of the diluted samples were transferred to 6 separate wells and either 50 µL of TE buffer or 50 µL of a 4% Triton X-100 solution in TE buffer was added to the wells. Two 6-point standard curves (5 mg/ml to 0.156 g/ml) were prepared in the same plate by diluting Firefly luciferase mRNA to a final volume of 100 µL in 2% Triton X-100 or TE buffer. The plate was then incubated for 10 min at 40° C. with gentle shaking. The Ribogreen reagent was diluted 1:100 in TE buffer, and 100 µL of this solution was added to each well. 180 µL of this mixture was immediately transferred to a black 96-well plate. The plate was incubated for 5 minutes with gentle shaking away from light. Fluorescence intensity was measured with a plate reader at an excitation wavelength of 480 nm and an emission wavelength of 525 nm. The raw fluorescence values were subtracted by the background fluorescence (blank sample). The concentration of free mRNA and total mRNA were determined by linear interpolation of the appropriate standard curve. Encapsulation efficiency was determined by dividing the calculated concentration of encapsulated mRNA by the total mRNA concentration in the LNP sample.

Apparent pK$_a$

Determination of the apparent pK$_a$ of LNPs was carried out using a TNS assay. Briefly, a series of buffers was generated by titrating a solution containing 10 mM citrate, 10 mM phosphate, 10 mM borate, and 150 mM NaCl with 1.0 M HCl. Aliquots of this combined buffer were taken to generate 12 total buffers ranging from pH 4.0 to 9.5 in increments of 0.5 pH. LNPs (diluted to 100 uM of ionizable lipid in distilled water) and 6-(p-toluidino)-2-naphthalenesulfonic acid (TNS, Sigma Aldrich, 60 uM in distilled water) were diluted into these buffers to a final concentration of 9 and 5.45 µM, respectively. The plate was covered and equilibrated at room temperature for 20 min. Fluorescence intensity was determined using a BioTek H1 Synergy plate reader (325 nm excitation/435 nm emission). The raw fluorescence values were fit using GraphPad Prism 8 to determine pK$_a$, which corresponds to the pH value at 50% max fluorescence.

Lipid pK$_a$

Calculation of lipid molecular pK$_a$ (that is, the pK$_a$ associated with the lipid molecule, rather than with the formulated LNP) was carried out using MarvinSketch version 22.22. A lipid structure was imported into MarvinSketch and the built in pK$_a$ function was used to determine % Ionization of all amines over the pH range 0-14 (Calculation>Protonation>pK$_a$. The following settings are used: Mode=macro, Acid/base prefix=static, Minimal basic pK$_a$=-2, Maximal acidic pK$_a$=16, Temperature (K)=298, Correction Library=Selected, Consider tautomerization/resonance=Selected, Show distribution chart=selected). The outputs of % ionization vs pH for each lipid were fit using GraphPad Prism 8 to determine lipid pK$_a$, which corresponds to the pH value at 50% ionization.

Characterization of LNPs Before Freezing

As shown in Table 4, the choice of Compound dramatically affects the size, PDI, mRNA encapsulation efficiency, and apparent pK$_a$. The type of degradable functional group also has a significant impact on nanoparticle characteristics. The direct substitution of amides (Compound I-12) with esters (Compound I-1) while keeping the same number of carbons in the linkers, significantly reduced both mRNA encapsulation efficiency and Apparent pK$_a$. Compounds I-3, I-5, 1-6, 1-7 were highly efficient (>90%) at encapsulating formulated mRNA. Compounds I-4, I-5, I-6, I-7, I-8 have an Apparent pK$_a$ between 6 and 7, which has been repeatedly shown to be an optimal range for in vivo efficacy and tolerability of ionizable LNPs (Jayaraman, M. et al. Maximizing the Potency of siRNA Lipid Nanoparticles for Hepatic Gene Silencing In Vivo. Angewandte Chemie Int Ed 51, 8529-8533 (2012), Hassett, K. J. et al. Optimization of Lipid Nanoparticles for Intramuscular Administration of mRNA Vaccines. Mol Ther—Nucleic Acids 15, 1-11 (2019), Tilstra, G. et al. Iterative Design of Ionizable Lipids for Intramuscular mRNA Delivery. J Am Chem Soc (2023)). The number of carbons flanking the ester of Compounds I-1, 1-2, 1-3, 1-4, 1-5, I-6, I-7 directly correlated with Apparent pK$_a$ (FIG. 1). Increasing the number of carbons between the ester and tertiary amines likely increases the pK$_a$ of the ionizable compound.

TABLE 4

Characterization of LNP before freezing

| Compound | Formulation ID | Size (nm) | PDI | ZP (mV) | ZP Deviation (mV) | EE (%) | Apparent pK$_a$ |
|---|---|---|---|---|---|---|---|
| I-1 | F04 | 110.8 | 0.067 | −5.0 | 10.2 | 77.2 | 5.5 |
| I-2 | F05 | 119.5 | 0.078 | −4.7 | 8.5 | 80.5 | 5.9 |
| I-3 | F06 | 89.3 | 0.126 | −2.4 | 9.4 | 92.7 | 5.8 |
| I-4 | F07 | 108.7 | 0.080 | −3.5 | 8.1 | 86.7 | 6.2 |
| I-5 | F13 | 116.8 | 0.087 | −2.5 | 8.6 | 90.7 | 6.3 |
| I-6 | F14 | 100.5 | 0.098 | −2.6 | 11.0 | 93.5 | 6.4 |
| I-7 | F15 | 105.1 | 0.174 | −0.5 | 5.1 | 96.0 | 6.6 |
| I-8 | F08 | 117.7 | 0.118 | −4.2 | 8.5 | 82.5 | 6.2 |
| ALC-0315 | F11 | 86.1 | 0.190 | −6.6 | 10.7 | 91.8 | 6.1 |
| DLin-MC3-DMA | F12 | 75.5 | 0.108 | −5.0 | 12.7 | 93.0 | 6.4 |
| I-12 | F16 | 110.1 | 0.104 | −4.4 | 4.0 | 90.9 | 6.5 |
| SM-102 | F10 | 107.0 | 0.107 | −4.7 | 7.9 | 89.8 | 6.5 |
| I-6 | F17 | 100.3 | 0.106 | −4.7 | 8.4 | 93.4 | n.d. |
| I-12 | F18 | 105.3 | 0.075 | −4.0 | 7.1 | 93.8 | n.d. |
| SM-102 | F19 | 76.4 | 0.075 | −4.1 | 4.6 | 94.9 | n.d. |
| I-12 | F26 | 113.0 | 0.089 | −11.1 | 9.1 | 90.4 | n.d. |
| I-6 | F27 | 112.7 | 0.039 | −4.7 | 8.6 | 92.6 | n.d. |
| SM-102 | F28 | 78.9 | 0.054 | −7.0 | 9.4 | 95.0 | n.d. |

TABLE 5

Characterization of LNPs after freeze-thaw

| Compound | Formulation ID | Size (nm) | PDI | ZP (mV) | ZP Deviation (mV) | EE (%) | Stable? |
|---|---|---|---|---|---|---|---|
| I-1 | F04 | 113.6 | 0.112 | −5.0 | 5.3 | 72.5 | Yes |
| I-2 | F05 | 122.1 | 0.077 | −4.5 | 6.9 | 76.4 | Yes |
| I-3 | F06 | 95.5 | 0.134 | −6.9 | 5.5 | 90.4 | Yes |
| I-4 | F07 | 110.7 | 0.083 | −5.1 | 5.7 | 85.7 | Yes |
| I-5 | F13 | 120.8 | 0.075 | −5.9 | 6.6 | 87.3 | Yes |
| I-6 | F14 | 105.5 | 0.102 | −7.6 | 7.4 | 91.1 | Yes |
| I-7 | F15 | 232.1 | 0.392 | −4.1 | 4 | 72.7 | No |
| I-8 | F08 | 119.0 | 0.116 | −7.0 | 5.5 | 81.4 | No |
| ALC-0315 | F11 | 107.7 | 0.224 | −6.8 | 5.9 | 85.2 | No |
| DLin-MC3-DMA | F12 | 109.2 | 0.329 | −13.5 | 7.2 | 86.9 | No |
| I-12 | F16 | 116.4 | 0.095 | −13.8 | 10.8 | 86.71 | Yes |
| SM-102 | F10 | 109.5 | 0.090 | −8.0 | 7.8 | 85.79 | Yes |

Example 3: Intramuscular Expression Profile in Mice

All procedures used in animal studies conducted at the University of Toronto were approved by Institutional Animal Care and Use committee (IACUC) under protocol number 20012621 and comply with all applicable local, provincial, and federal regulations. Female BALB/c mice (7-8 weeks old) were purchased from Charles River Laboratories and acclimated for 1 to 2 weeks before initiation of the study.

Figure 2:
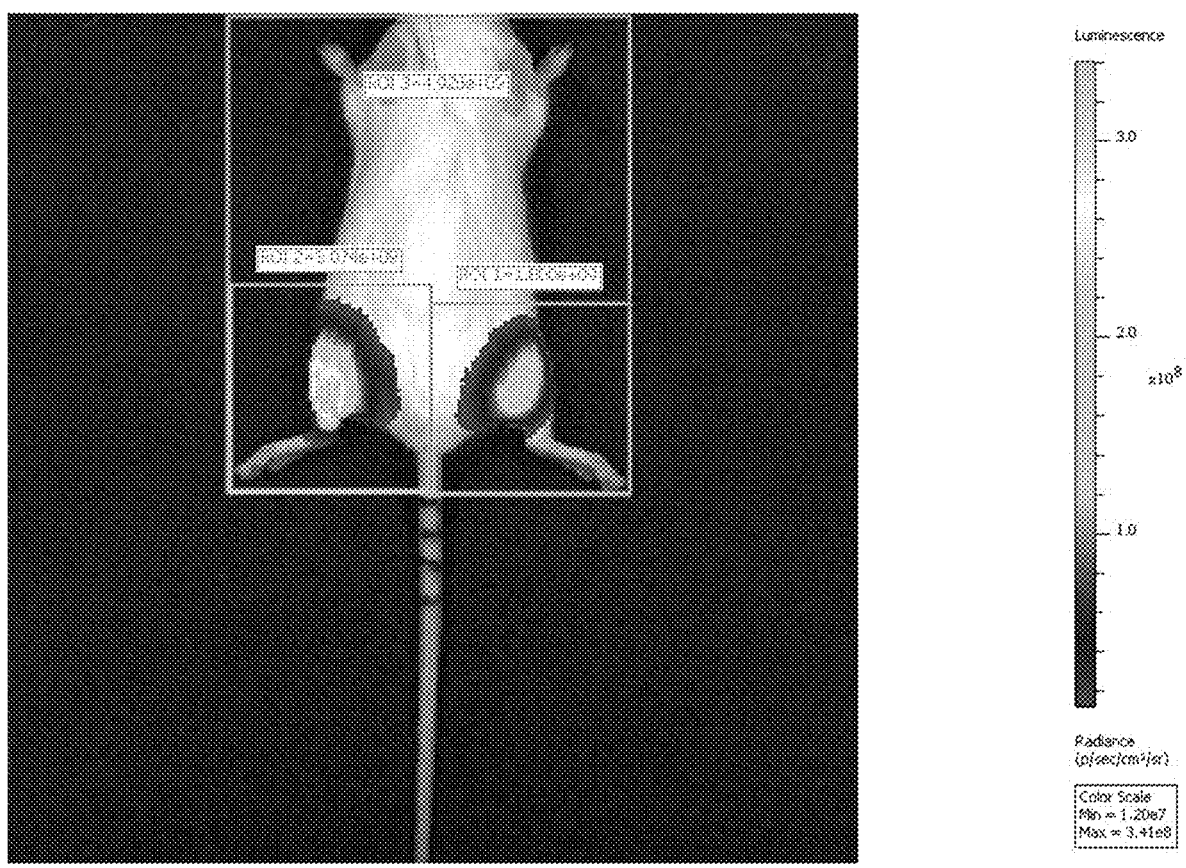
FIG. 2 shows the total luminescent flux in regions of interest in a mouse injected intramuscularly with formulated firefly luciferase mRNA as captured on in vivo imaging system (IVIS).

Mice (n=4) were injected in both quadriceps with 0.5 µg of formulated firefly luciferase mRNA in 50 µL. At various timepoints (6 hours, 24 hours, 48 hours, and 96 hours post-dose), mice were injected intraperitoneally with 3 mg D-Luciferin (Thermo Scientific 88291) in 200 µL 1×PBS. 5 minutes later, mice were anesthetized and imaged on an in vivo imaging system (PerkinElmer, IVIS Spectrum) to measure total bioluminescent flux (photons/second) in each hindlimb (FIG. 2). The area under curve (AUC) for individual hindlimbs was determined with GraphPad Prism 9.

Results

Figure 3:
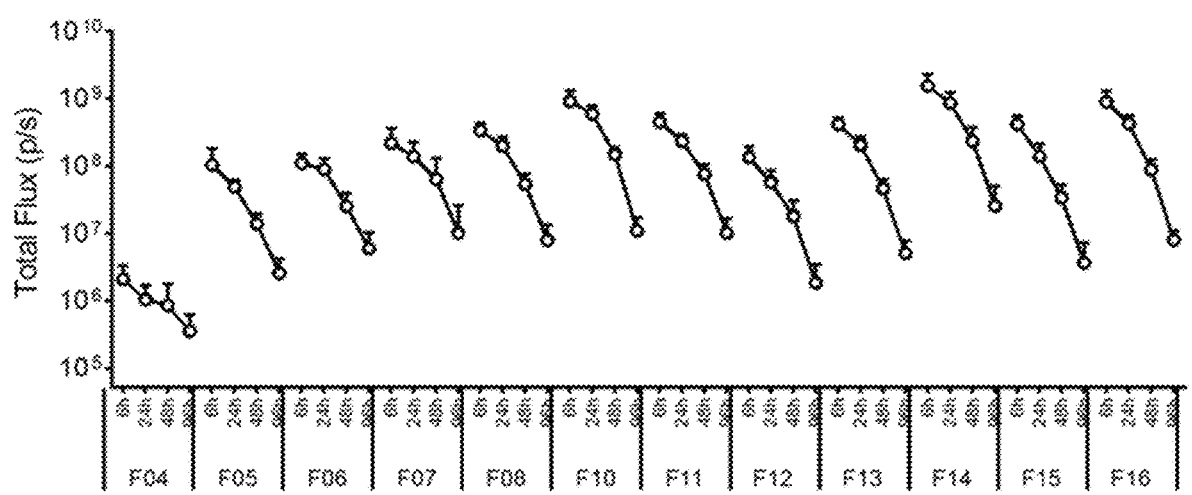
FIG. 3 shows the intramuscular expression profile of firefly luciferase for exemplary LNP formulations from 6 to 96 hours post-injection in mice.
Figure 4:
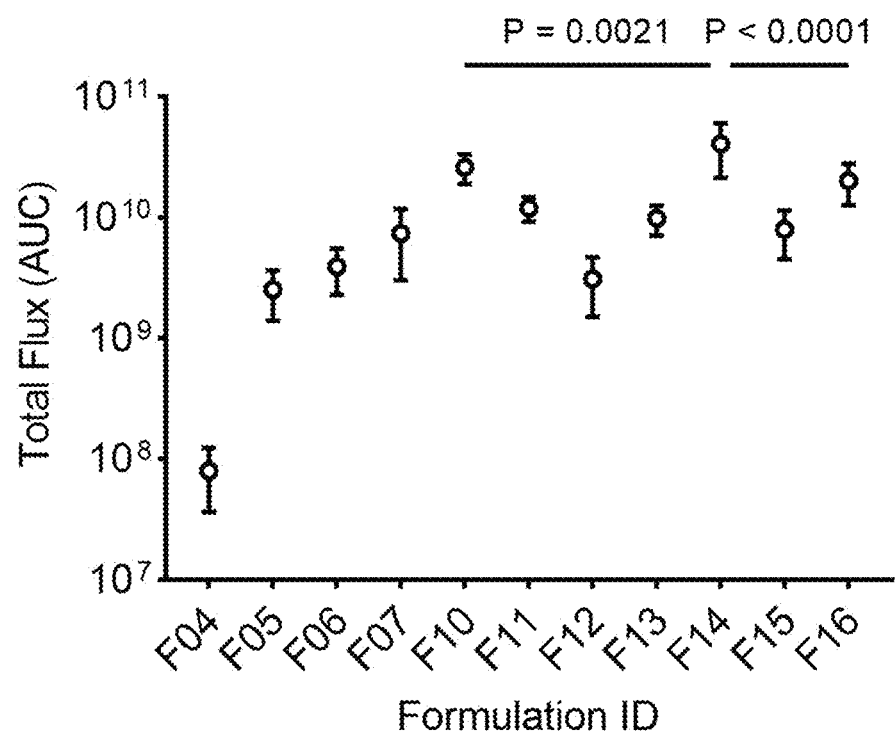
FIG. 4 shows the intramuscular expression of firefly luciferase for exemplary LNP formulations expressed as the area under curve (AUC) of total luminescent flux from 6 to 96 hours post-injection in mice.

LNPs formulated with compounds from this disclosure were tested for their ability to functionally deliver firefly luciferase mRNA to the muscle and were compared to compounds I-12, DLin-MC3-DMA, ALC-0315, and SM-102. Luminescent flux was measured to assess firefly luciferase protein expression. All compounds showed similar expression kinetics, peaking at 6 hours and rapidly declining over 96 hours (FIG. 3). Replacing amides (Compound I-12) with esters (Compound I-1), significantly reduced intramuscular expression. Compounds I-3, I-4, I-5, I-6, I-7, I-8 had a higher intramuscular expression than DLin-MC3-DMA. Compound I-6 had the highest intramuscular expression of all compounds tested (FIG. 4).

TABLE 6

Total Flux AUC

| Formulation ID | Total Flux (AUC) | Fold change compared to F12 |
| --- | --- | --- |
| F04 (Compound I-1) | 7.95E+07 | 0.03 |
| F05 (Compound I-2) | 2.53E+09 | 0.82 |
| F06 (Compound I-3) | 3.91E+09 | 1.26 |
| F07 (Compound I-4) | 7.39E+09 | 2.39 |
| F08 (Compound I-8) | 9.27E+09 | 3.00 |
| F10 (SM-102) | 2.60E+10 | 8.42 |
| F11 (ALC-0315) | 1.19E+10 | 3.85 |
| F12 (DLin-MC3-DMA) | 3.09E+09 | 1 |
| F13 (Compound I-5) | 9.80E+09 | 3.17 |
| F14 (Compound I-6) | 4.07E+10 | 13.17 |
| F15 (Compound I-7) | 7.96E+09 | 2.57 |
| F16 (I-12) | 2.02E+10 | 6.53 |

Example 4: In Vitro Transfection of THP-1 Monocytes

THP-1 monocytes are human cells isolated from the peripheral blood of a patient with acute monocytic leukemia. THP-1 monocytes were cultured in RPMI-1640 (ATCC modification) containing 10% heat-inactivated fetal bovine serum and 1% Penicillin-Streptomycin at 37° C., 5% $CO_2$. Cells were plated at a density of 100,000 cells per well in a 96-well plate and transfected in quadriplicates with 500 ng/well of firefly luciferase mRNA formulated in lipid nanoparticles. Cell viability and firefly luciferase expression were determined after 24 hours with a plate reader assay, following the manufacturer's protocol (Promega E7110).

LNPs formulated with compounds from this disclosure were tested for their ability to functionally deliver firefly luciferase mRNA to THP-1 monocytes and were compared to compounds I-12, DLin-MC3-DMA, ALC-0315, and SM-102. Compound I-1 and I-3 resulted in significant cell death. Interestingly, replacing amides (Compound I-12) with esters (Compound I-1) increased toxicity. Luminescence (expression) strongly correlated with cell viability. Compounds I-4, I-5, I-6, I-7, I-8 had similar expression than DLin-MC3-DMA and ALC-0315 but were outperformed by SM-102.

Example 5: Organ Expression after Intravenous Injection in Mice

All procedures used in animal studies conducted at the University of Toronto were approved by Institutional Animal Care and Use committee (IACUC) under protocol number 20012621 and comply with all applicable local, provincial, and federal regulations. Female BALB/c mice (7-8 weeks old) were purchased from Charles River Laboratories and acclimated for 1 to 2 weeks before initiation of the study.

Mice (n=3) were injected intravenously (tail vein) with 0.5 µg of formulated firefly luciferase mRNA in 200 µL. At 6 hours post-dose, mice were injected intraperitoneally with 3 mg D-Luciferin (Thermo Scientific 88291) in 200 µL 1×PBS. 5 minutes later, mice were euthanized and key organs (liver, spleen, kidneys, lungs, and heart) were harvested and immediately imaged on an in vivo imaging system (PerkinElmer, IVIS Spectrum) to measure total bioluminescent flux (photons/second). LNPs formulated with compounds I-2, I-4, I-5, I-6, I-8 were tested for their ability to functionally deliver firefly luciferase mRNA to the major organs (liver, spleen, lungs, heart, kidneys) after intravenous injection and were compared to compounds I-12 and SM-102.

The highest total flux was measured in the liver for compounds I-2, I-4, I-8, and SM-102. The highest total flux was measured in the spleen for compounds I-5 and I-12. While luminescence was also detected in the lungs, heart, and kidneys, it represents less than 1% of the total luminescent flux in all organs. Of the compounds related to this disclosure, Compound I-6 had the highest expression in all organs. Interestingly, Compound I-6 had a higher expression than SM-102 in the spleen but not in the liver. Compounds I-2, I-4, I-5, I-6, I-8 had a higher fraction of expression in the spleen than SM-102. Altogether, these results suggest that the relative performance of compounds depends on administration route.

Example 6: In Vitro Degradation and Pharmacokinetics in Mice

Methods

Determining the Base Hydrolysis Rate of Esters by Time-Series 1H NMR

Ionizable lipids including compounds described herein (2 µmol) were hydrolyzed with 2.5 eq. of KOH (200 µL, 0.025 M in d4-methanol) in a 3 mm NMR tube. 1H-NMR was acquired with a 700 MHz Agilent DD2 Spectrometer every 5 min for a total of 180 min. Additionally, spectra were acquired at 24 h, 48 h, 72 h, 144 h, 192 h, and 240 h for I-12, ALC-0315, and DLin-MC3-DMA. Data acquisition started ~10 min after the start of the reaction due to sample preparation and tune/lock/shim. Ester peaks were integrated using MestReNova and normalized to value at t=0 min. The data series were fitted to a one phase decay exponential following y=e, where k is the rate of hydrolysis.

Pharmacokinetics of Compound I-12 and Compound I-6 after Intramuscular Injection of mRNA-LNPs in Mice Pharmacokinetic studies in mice were conducted according to Transpharmation Canada Ltd. standard operating procedures (SOPs) and accepted scientific practices but was not in accordance with the principles of Good Laboratory Practice (GLP). Two studies were conducted and have been combined for analysis. Their objective was to determine the concentrations of two ionizable lipids, Compound I-12, and Compound I-6, in plasma, muscle, liver, spleen, urine, and feces following intramuscular (IM) injection of each lipid to groups of female CD-1 mice. All animals received an intramuscular injection of one of the lipids, formulated as lipid nanoparticles (LNPs) with mRNA, into the right quadricep. Doses administered IM were 12.312 µg of Compound I-12 and 12.764 µg of Compound I-6, corresponding to 0.5 µg of mRNA formulated in LNPs. Animals in study 1 were group housed in metabolic cages (n=3 per cage) and euthanized at 6 timepoints (3, 6, 12, 24, 48 and 96 hours) over 4 days-post injection for the collection of blood, liver, spleen, and muscle (n=3/time-point). A single pooled urine and feces sample was also collected from each cage at the appropriate time-point. In study 2, animals were housed in shoebox cages and samples (n=4/time-point) were collected at 6, 12, 24, 48, 96 and 168 hours (Compound I-12 and Compound I-6) and at 21 days (I-12 only, n=3) post-dose. A single pooled feces sample was also collected from each cage at the time of cage changes and weighed following terminal collections. Blood samples were divided for bioanalysis and diagnostic testing. Data from both studies was combined for data analysis. Tandem liquid chromatography-mass spectrometry (LC-MS/MS) methods were developed for the quantification of Compound I-12 and Compound I-6 in mouse plasma, muscle, liver, spleen, urine, and feces. The qualified methods were used to determine the concentration of the analytes in each matrix. The pharmacokinetics (PK) parameters for Compound I-12 and Compound I-6 were estimated from the plasma, muscle, liver, and spleen concentration versus time curves for each animal using Phoenix® WinNonlin 8.3 (Certara, Mountainview, CA).

Results

To quantify the rate of ester hydrolysis in vitro, the base-catalyzed hydrolysis of ionizable lipids was monitored by time-series 1H NMR. This method was performed for Compounds I-1 to I-8. It was found that all novel ester-based compounds, along with SM-102, were completely degraded within 180 minutes (FIG. 7A). The relative degradation rate was dependent on the distance between the ester and tertiary amines. Additionally, it was found that I-12, DLin-MC3-DMA and ALC-0315 degraded much slower and required 10 days to have measurable levels of hydrolysis. This data shows that amides degrade significantly slower than their ester analogs, and that electron-withdrawing groups near the ester increase degradation rate, while sterically hindered groups decrease degradation rate.

Following IM administration of the lipid containing LNPs, Compound I-12 plasma levels peaked at 6 hours post-dose with a corresponding maximum plasma concentration ($C_{max}$) of 348 ng/mL, whereas Compound I-6 levels peaked earlier at 3 hours post-dose with a $C_{max}$ of 108 ng/mL. The estimated apparent half-life ($t_{1/2}$) of Compound I-12 in plasma was 295 h, although because the sampling interval during the terminal phase is <$2 \times t_{1/2}$, this estimate is not considered accurate. The estimated $t_{1/2}$ for Compound I-6 was much shorter, 15.3 h. Overall plasma exposure ($AUC_{0-tlast}$) for Compound I-12 (13772 h*ng/mL) was ~13-fold greater than that for Compound I-6 (1033 h*ng/mL).

Overall tissue exposure ($AUC_{0-tlast}$) for Compound I-12 was 3244 µg/g, 694 µg/g and 391 µg/g for muscle, liver, and spleen, respectively, with tissue/plasma AUC ratios of 236, 50 and 28, respectively. Compound I-6 tissue AUCs were 994 µg/g, 47.0 µg/g and 61.1 µg/g for muscle, liver, and spleen, respectively, with tissue/plasma AUC ratios of 962, 46 and 59, respectively. Approximately 18% of Compound I-12 was excreted in feces after 21 days post-dose and low and variable amounts of Compound I-6 ranging between 0.1% and 3% were excreted in feces. Neither Compound I-12 nor Compound I-6 were detected in urine.

Conclusions

Novel multiamine ionizable lipid molecules were synthesized to create a new class of delivery materials. It was shown that spatial organization of the amine, ester and hydrophobic moieties of these materials had a remarkable impact on the function of the LNPs formed from these materials. The orientation of the esters, as well as the distance between heteroatoms, which include amines and hydrophobic regions, caused dramatic changes in activity. These changes caused variations in steric hindrance, which impacted supramolecular assembly formation, charge shielding, inductive effects and the structure of degradation products. From these insights, a family of new materials, the supramolecular ionizable lipids with heteroatomic tuning, was created to maximize performance and dramatically improve on the current state-of-the-art.

Example 7: Immunogenicity of Influenza mRNA Vaccination in Mice

All procedures used in animal studies conducted at the University of Toronto were approved by Institutional Animal Care and Use committee (IACUC) under protocol number 20012621 and comply with all applicable local, provincial, and federal regulations. Female BALB/c mice (7-8 weeks old) were purchased from Charles River Laboratories and acclimated for 1 to 2 weeks before initiation of the study.

Mice (n=8) were injected in the left quadricep muscle with 0.5 µg of formulated PR8 mRNA in 50 µL on day 0 and day 30. On day 28-29 (4 weeks post prime) and day 44 (2 weeks post boost), 50 to 100 µl of blood was collected from the saphenous vein on the hindlimb opposite to the injection site.

The hemagglutinin inhibition (HAI) titers of serum samples were determined using a protocol adapted from the World Health Organization manual. First, sera were treated with receptor-destroying enzyme (Hardy Diagnostics, 370013) at 37° C. for 18 hours to inactivate nonspecific inhibitors, followed by 56° C. for 60 min to inactivate receptor-destroying enzyme per the manufacturer's instructions. 25 µl of sera were serially diluted (1:2) with DPBS in a 96-well V bottom plate, starting with a 1:20 dilution and up to 1:2560. 4 hemagglutination units of H1N1 Influenza A/Puerto Rico/8/1934 virus (ATCC, VR-1469) in 25 µl were added to diluted sera and incubated for 30 min at room temperature. Finally, 50 µl of a 0.5% v/v turkey erythrocyte solution (Rockland Immunochemicals, RLR408) was added to each well and incubated for 45 min at room temperature, after which the plate was turned on the side for one minute. Inhibition of agglutination was observed as the blood forming a "tear drop" shape. HAI titers were expressed as the inverse of the highest dilution with completely non-agglutinated erythrocytes. Each plate included a back-titration to confirm the virus dose (4 HAU/25 µl) and a negative control (serum from a naïve mouse).

LNPs formulated with compounds from this disclosure were tested for their ability to induce neutralizing antibodies against an H1N1 Influenza A/Puerto Rico/8/1934 virus upon intramuscular vaccination of PR8 mRNA. The HAI assay is a traditional method to assess the titer of neutralizing antibodies in serum. All compounds had an elevated HAI titer 4 weeks post-injection (Table 1). These results indicate that all LNPs tested induced the production of neutralizing antibodies against the vaccinated antigen.

TABLE 7

HAI titer 4 weeks post-injection

| Formulation ID | HAI titer 4 weeks post prime (Mean ± SD) | HAI titer 2 weeks post boost (Mean ± SD) |
| --- | --- | --- |
| F26 (Compound I-12) | 62.5 ± 44.64 | 680 ± 267 |
| F27 (Compound I-6) | 40.00 ± 18.52 | 560.0 ± 148.1 |
| F28 (SM-102) | 40.00 ± 18.52 | 800 ± 419 |

LNP Apparent $pK_a$

The apparent $pK_a$ of an LNP formulation is one of the parameters that determine efficacy and safety in vivo. Apparent $pK_a$ relates to the pH at which LNPs are positively charged. Optimal ranges for apparent $pK_a$ have been found empirically—typically 6.2-6.5 for intravenous delivery, 6.6-6.9 for intramuscular administration—and depend on the individual $pK_a$ of the ionizable lipid. Placement of electron-withdrawing groups relative to the tertiary amines within the ionizable lipid structure affects the apparent $pK_a$ of the LNP formulation.

Figure 5:
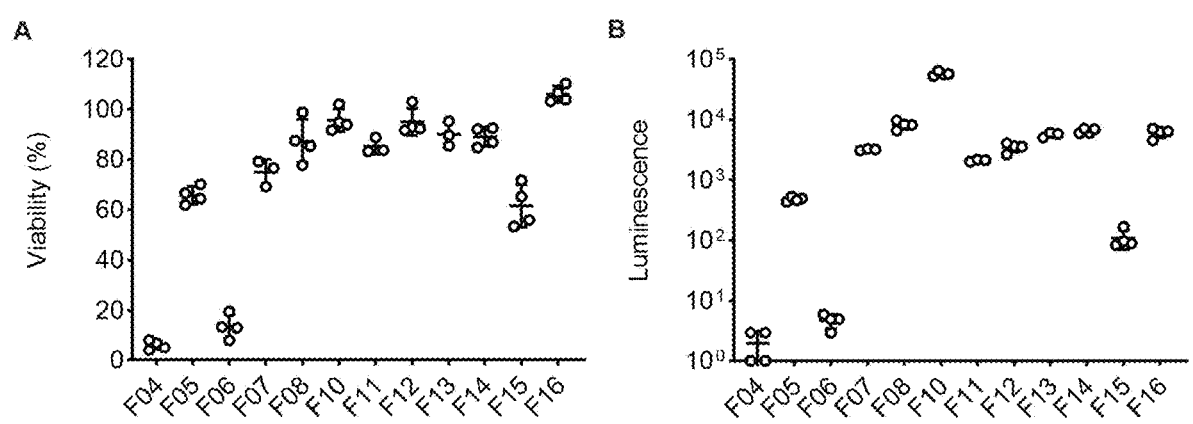
FIG. 5 shows (A, at left) viability (%) and (B, at right) firefly luciferase expression of THP-1 cells 24 hours post-transfection with exemplary LNP formulated firefly luciferase mRNA.
Figure 6:
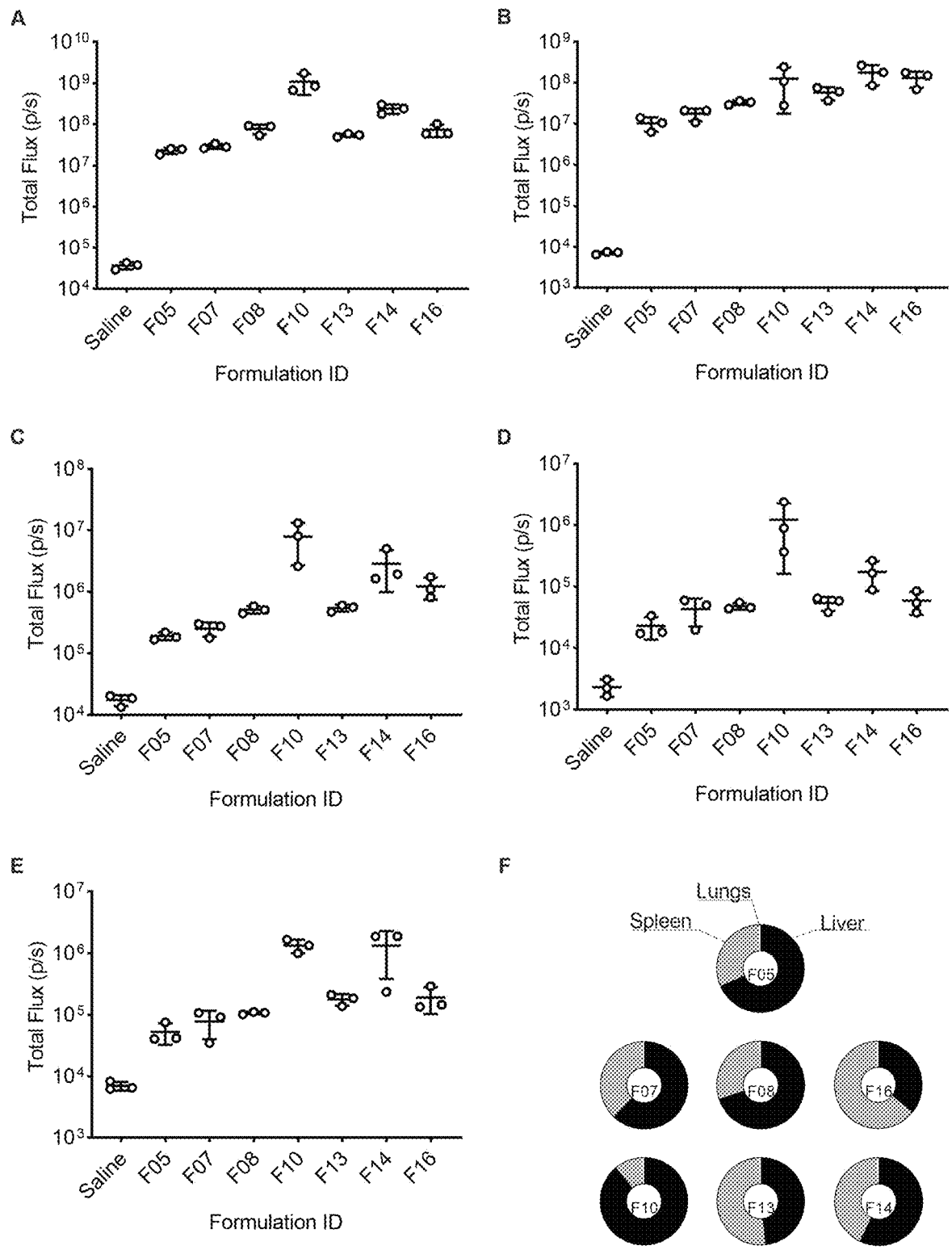
FIG. 6 shows the expression of firefly luciferase mRNA 6 hours after intravenous injection in (A) liver, (B) spleen, (C) lungs, (D) heart, (E) and kidneys, (F) organ distribution of total flux in mice.

Comparison of formulations F04 and F16 in Table 4 shows that the direct replacement of an amide with an ester decreases apparent $pK_a$ by a full unit. The in vivo performance of the direct ester analog was extremely poor (FIG. 4), and it was found to be toxic to cells in vitro (FIG. 5). FIG. 1 shows that multiple 'flanking' carbons should optimally be placed in the linker regions between the ester and tertiary amines to achieve an optimal apparent $pK_a$. LNPs formulated with the optimized ester lipid (F13) outperformed industry gold-standard lipids DLin-MC3-DMA, SM-102 and ALC-0315. Therefore, sufficient distance between heteroatoms is necessary to achieve the desired apparent $pK_a$, protein expression, and viability of transfected cells.

Biodegradability

Ionizable lipids are xenobiotic compounds that must be rapidly cleared from the body to avoid toxic accumulation in cells and tissues. Clearance is important for applications that require frequent dosing to achieve a therapeutic effect. To this end, the set of compounds related to this disclosure replace the previous amide groups with ester that are more readily hydrolyzed by various extracellular or intracellular enzymes.

Example 6 shows that the degradation rate of the esters in vitro and the rate of clearance from plasma in vivo are significantly improved for the ester-based ionizable lipids compared to the amide lipids. Additionally, it was shown that the in vitro degradation rate is dependent on the distance between the ester and nearby electron-withdrawing groups and sterically-hindered groups. Therefore, the combination of functional group choice (amide or ester) and heteroatom distance should be considered to optimize biodegradability.

Structural Isomers Based on Ester Orientation

Figure 7:
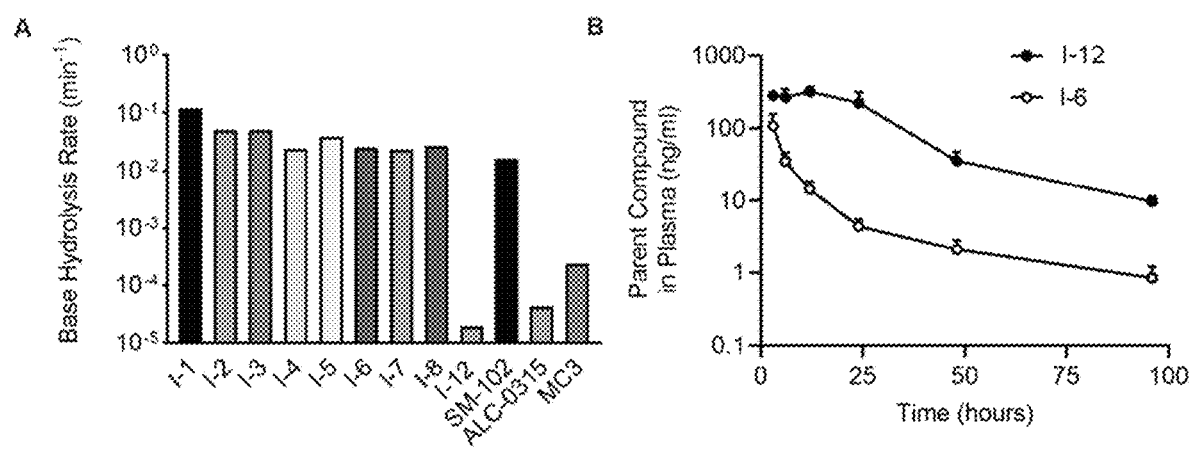
FIG. 7 shows (A) base hydrolysis rate of exemplary ionizable compounds of the application, (B) parent compound concentration in mice plasma after intramuscular injection of LNPs formulated with Compound I-12 or exemplary Compound I-6.

This family of new ionizable lipids includes structural isomers that result from reversing the orientation of the ester group. For example, Compounds I-4 and I-8 have identical linker regions (three carbons near the ethanolamine headgroup, three carbons near the alkyl tails) and have esters pointing opposite directions. Switching the ester orientation is an alternative method to change the distance between neighboring heteroatoms, rather than adding or subtracting from the linker regions directly. FIG. 7 shows that ester orientation affects in vitro degradation rate. For example, Compound I-8 degrades ~50% faster than Compound I-4. Additionally, structural isomers with different ester orientations will produce different sets of metabolites after ester hydrolysis which may affect their safety profile in vivo. Therefore, both linker length and ester orientation should be considered in the design of ionizable lipids in this family as they are factors that affect the distance between heteroatoms.

ENUMERATED EMBODIMENTS

Enumerated Embodiment 1. A compound of Formula I, or a salt and/or a solvate thereof:

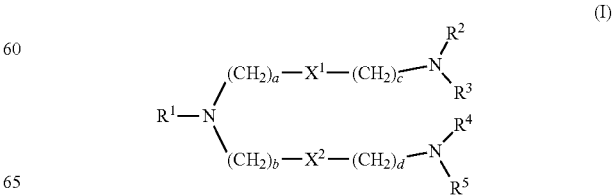

(I)

wherein:
R¹ is selected from $C_{1-20}$alkyl, $C_{2-20}$alkenyl, $C_{2-20}$alkynyl, $C_{1-20}$alkylenearyl, $C_{1-20}$alkyleneheteroaryl, $C_{1-20}$alkylene$C_{3-8}$heterocycloalkyl, $C_{1-20}$alkylene$C_{3-8}$cycloalkyl, $C_{3-8}$heterocycloalkyl, and $C_{3-8}$cycloalkyl, in which each alkyl, alkenyl and alkylene is optionally substituted with one or more of OH, $OC_{1-10}$alkyl, $NR^6R^{6'}$, and $(NR^6C_{1-10}$alkylene$)_n NR^{6'}R^{6''}$, and the aryl, heteroaryl, heterocycloalkyl and cycloalkyl groups are additionally optionally substituted with one or more of OH, $C_{1-10}$alkyl, $OC_{1-10}$alkyl, O and $NR^7R^{7'}$, and wherein the alkyl is further optionally substituted with $NR^8R^{8'}$;

$X^1$ and $X^2$ are same or different and are selected from C(O)O and OC(O);

$R^2$, $R^3$, $R^4$ and $R^5$ are same or different and are selected from $C_{1-50}$alkyl, $C_{2-50}$alkenyl, $C_{1-20}$alkylene$C_{3-8}$heterocycloalkyl, and $C_{1-20}$alkylene$C_{3-8}$cycloalkyl, in which each alkyl, alkenyl and alkylene is optionally interrupted by one or more groups selected from S—S, C(O), OC(O), C(O)O, OC(O)O, $NR^9C(O)O$, $OC(O)NR^9$, C(O)S, SC(O), $NR^9C(O)$, $C(O)NR^9$, and the alkyl, alkenyl, alkyleneheterocycloalkyl, and alkylenecycloalkyl are optionally substituted with one or more of OH and $C_{1-20}$alkyl;

$R^6$, $R^{6'}$, $R^{6''}$, $R^7$, $R^{7'}$, $R^8$, $R^{8'}$, and $R^9$ are independently selected from H and $C_{1-10}$alkyl;

a, b, c and d are same or different and are selected from 2 to 6; and n is selected from 1 to 4.

Enumerated Embodiment 2. The compound of enumerated embodiment 1, wherein a, b, c and d are all 2.

Enumerated Embodiment 3. The compound of enumerated embodiment 1, wherein a+c≥5 and b+d≥5.

Enumerated Embodiment 4. The compound of enumerated embodiment 1, wherein a, b, c and d are selected from 2 and 3.

Enumerated Embodiment 5. The compound of enumerated embodiment 1, wherein a, b, c and d are selected from 3 and 4.

Enumerated Embodiment 6. The compound of any one of enumerated embodiments 1 to 5, wherein $X^1$ and $X^2$ are C(O)O.

Enumerated Embodiment 7. The compound of any one of enumerated embodiments 1 to 5, wherein $X^1$ and $X^2$ are OC(O).

Enumerated Embodiment 8. The compound of any one of enumerated embodiments 1 to 7, wherein R¹ is selected from $C_{1-10}$alkyl, $C_{2-10}$alkenyl, $C_{2-10}$alkynyl, $C_{1-10}$alkylenearyl, $C_{1-10}$alkyleneheteroaryl, $C_{1-10}$alkylene$C_{3-8}$heterocycloalkyl, $C_{1-10}$alkylene$C_{3-8}$cycloalkyl, $C_{3-8}$heterocycloalkyl, and $C_{3-8}$cycloalkyl, in which each alkyl, alkenyl and alkylene is optionally substituted with one to four of OH, $OC_{1-5}$alkyl, $NR^6R^{6'}$, and $(NR^6C_{1-5}$alkylene$)_n NR^{6'}R^{6''}$, and the aryl, heteroaryl, heterocycloalkyl and cycloalkyl groups are additionally optionally substituted with one to four of OH, $C_{1-5}$alkyl, $OC_{1-5}$alkyl, O and $NR^7R^{7'}$, and wherein the alkyl is further optionally substituted with $NR^8R^{8'}$.

Enumerated Embodiment 9. The compound of enumerated embodiment 8, wherein R¹ is selected from $C_{1-10}$alkyl, $C_{2-10}$alkenyl, $C_{2-10}$alkynyl, $C_{1-10}$alkylenephenyl, $C_{1-10}$alkyleneheteroaryl, $C_{1-10}$alkylene$C_{3-8}$heterocycloalkyl, $C_{1-10}$alkylene$C_{3-8}$cycloalkyl, $C_{3-8}$heterocycloalkyl, and $C_{3-8}$cycloalkyl, in which each alkyl, alkenyl and alkylene is optionally substituted with one or two of OH, $OC_{1-3}$alkyl, $NR^6R^{6'}$, and $(NR^6C_{1-5}$alkylene$)_n NR^{6'}R^{6''}$, and the aryl, heteroaryl, heterocycloalkyl and cycloalkyl groups are additionally optionally substituted with one or two of OH, $C_{1-5}$alkyl, $OC_{1-3}$alkyl, O and $NR^7R^{7'}$, and wherein the alkyl is further optionally substituted with $NR^8R^{8'}$.

Enumerated Embodiment 10. The compound of any one of enumerated embodiments 1 to 9, wherein $R^6$, $R^{6'}$, $R^{6''}$, $R^7$, $R^{7'}$, $R^8$, and $R^{8'}$ are independently selected from H and $C_{1-5}$alkyl.

Enumerated Embodiment 11. The compound of any one of enumerated embodiments 1 to 10, wherein R¹ is selected from:

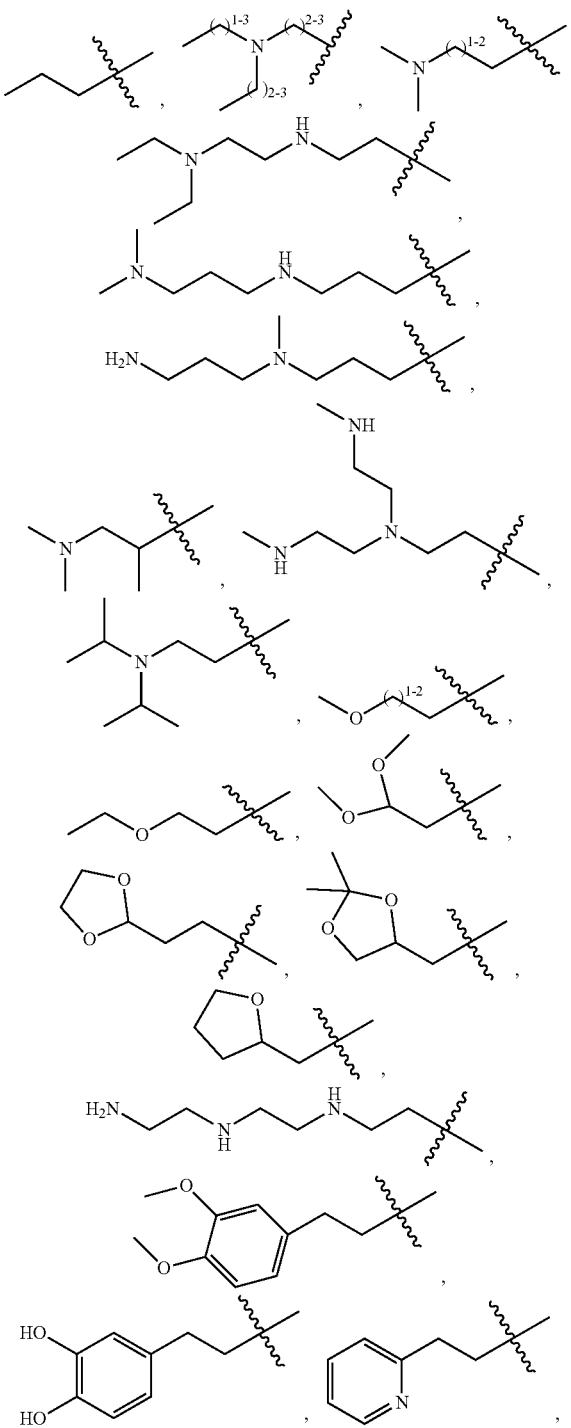

-continued

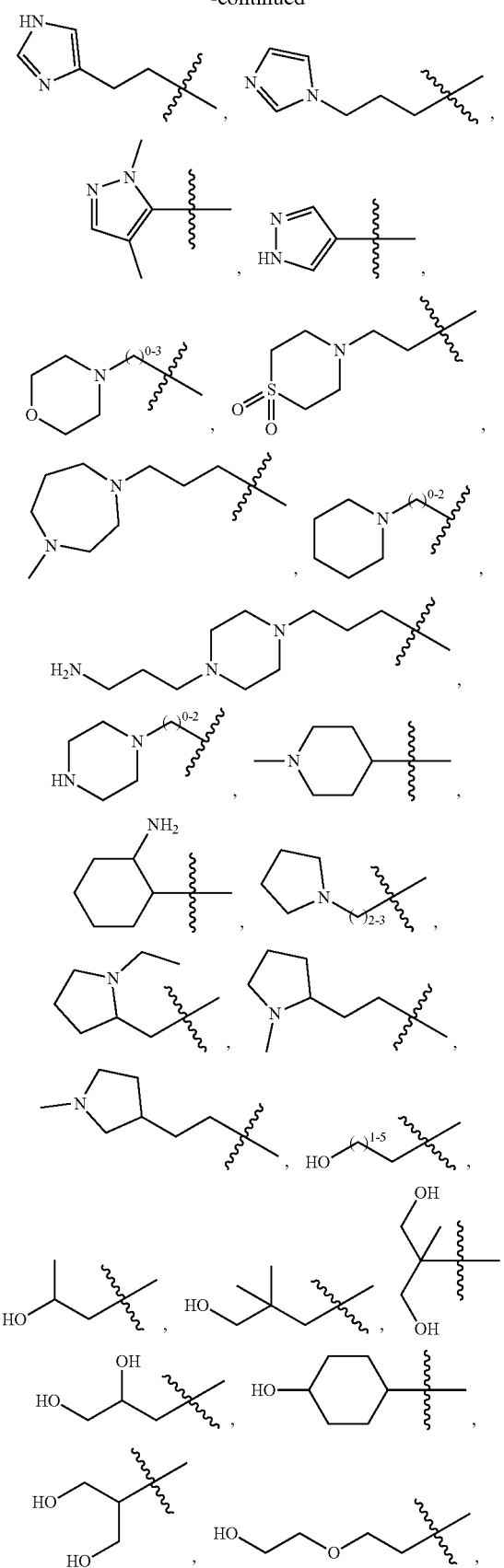

-continued

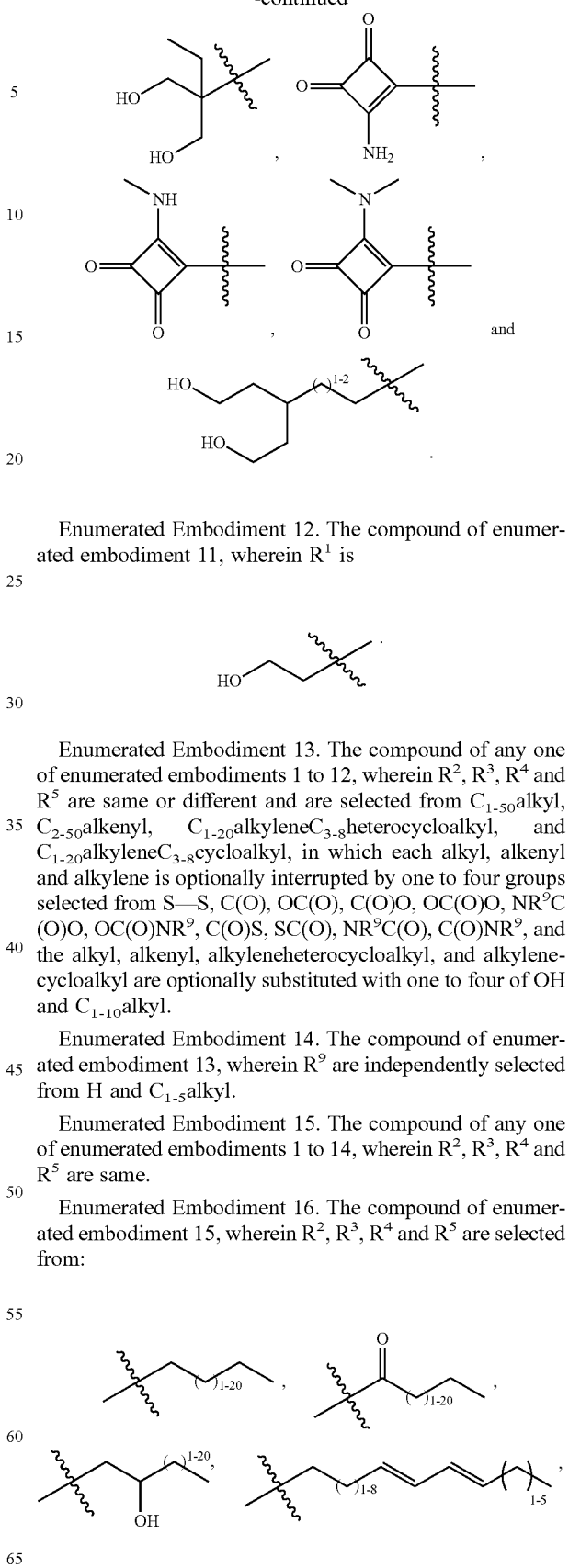

Enumerated Embodiment 12. The compound of enumerated embodiment 11, wherein $R^1$ is Enumerated Embodiment 13. The compound of any one of enumerated embodiments 1 to 12, wherein $R^2$, $R^3$, $R^4$ and $R^5$ are same or different and are selected from $C_{1-50}$alkyl, $C_{2-50}$alkenyl, $C_{1-20}$alkylene$C_{3-8}$heterocycloalkyl, and $C_{1-20}$alkylene$C_{3-8}$cycloalkyl, in which each alkyl, alkenyl and alkylene is optionally interrupted by one to four groups selected from S—S, C(O), OC(O), C(O)O, OC(O)O, $NR^9$C(O)O, OC(O)$NR^9$, C(O)S, SC(O), $NR^9$C(O), C(O)$NR^9$, and the alkyl, alkenyl, alkyleneheterocycloalkyl, and alkylenecycloalkyl are optionally substituted with one to four of OH and $C_{1-10}$alkyl.

Enumerated Embodiment 14. The compound of enumerated embodiment 13, wherein $R^9$ are independently selected from H and $C_{1-5}$alkyl.

Enumerated Embodiment 15. The compound of any one of enumerated embodiments 1 to 14, wherein $R^2$, $R^3$, $R^4$ and $R^5$ are same.

Enumerated Embodiment 16. The compound of enumerated embodiment 15, wherein $R^2$, $R^3$, $R^4$ and $R^5$ are selected from:

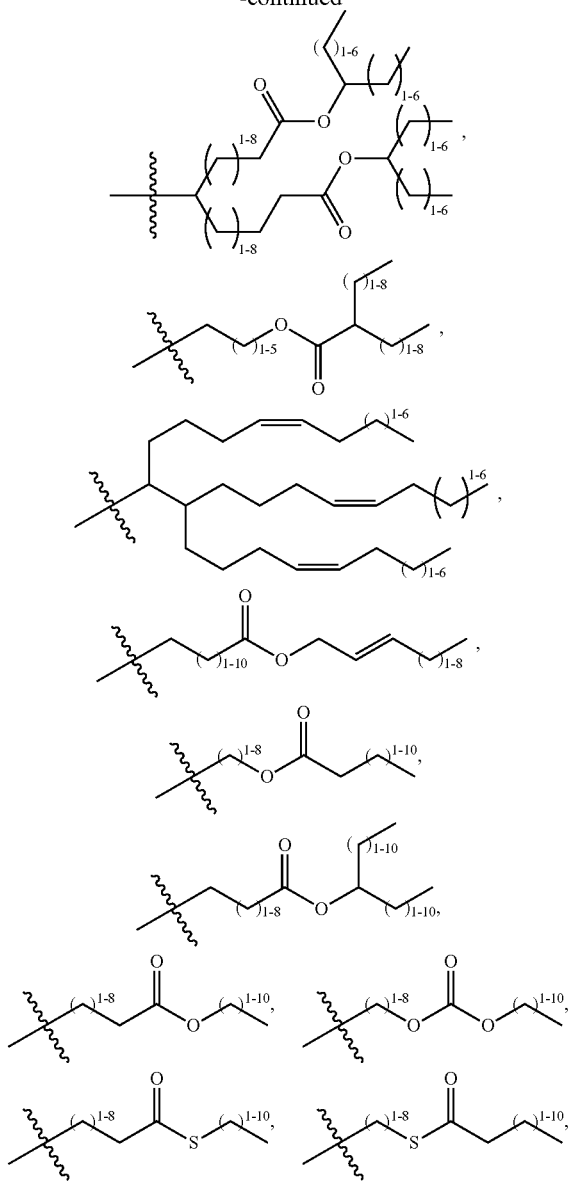
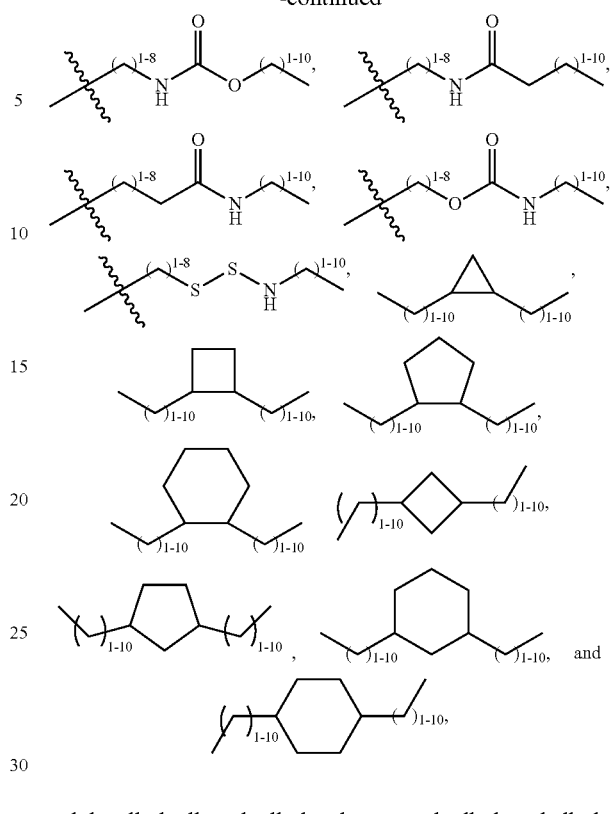
and the alkyl, alkenyl, alkyleneheterocycloalkyl, and alkylenecycloalkyl are optionally substituted with one or two of OH and $C_{1-10}$alkyl.
Enumerated Embodiment 17. The compound of any one of enumerated embodiments 1 to 16, wherein all $R^2$, $R^3$, $R^4$ and $R^5$ are
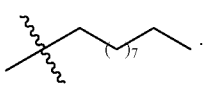
Enumerated Embodiment 18. A compound selected from the group consisting of:
| Compound | Structure |
|---|---|
| I-1 | |

| Compound | Structure |
|---|---|
| I-2 | (chemical structure) |
| I-3 | (chemical structure) |
| I-4 | (chemical structure) |
| I-5 | (chemical structure) |
| I-6 | (chemical structure) |

| Compound | Structure |
|---|---|
| I-7 | |
| I-8 | |
| I-9 | |
| I-10 | |
| I-11 | |

| Compound | Structure |
| --- | --- |
| I-12 | (chemical structure: HO-CH2CH2-N(CH2CH2C(O)NH-CH2CH2-N(C14 alkyl)(C14 alkyl))2) | or a salt and/or solvate thereof.

Enumerated Embodiment 19. The compound of any one of enumerated embodiments 1 to 18, wherein the compound has a base hydrolysis rate greater than 0.001 min$^{-1}$.

Enumerated Embodiment 20. A nanoparticle comprising one or more compounds of any one of enumerated embodiments 1 to 19.

Enumerated Embodiment 21. A colloid comprising one or more compounds of any one of enumerated embodiments 1 to 19.

Enumerated Embodiment 22. A supramolecular structure comprising one or more compounds of any one of enumerated embodiments 1 to 19.

Enumerated Embodiment 23. A composition comprising one or more compounds of any one of enumerated embodiments 1 to 19, one or more nanoparticles of enumerated embodiment 20, one or more colloids of enumerated embodiment 21 and/or one or more supramolecular structures of enumerated embodiment 22.

Enumerated Embodiment 24. The nanoparticle of enumerated embodiment 20, wherein the nanoparticle is a lipid nanoparticle (LNP).

Enumerated Embodiment 25. The composition of enumerated embodiments 23 or 24, further comprising one or more agents to be delivered to a cell or subject.

Enumerated Embodiment 26. The composition of enumerated embodiment 25, wherein the one or more agents to be delivered to a cell or subject are selected from unmodified or modified nucleic acids, mitochondrion, plasmids, PolyIC and related adjuvants, ribonucleoproteins, proteins, peptides, cells, stains, dyes and small molecule drugs.

Enumerated Embodiment 27. The composition of enumerated embodiments 25 or 26, wherein the one or more agents to be delivered to a cell or a subject have an overall negative charge.

Enumerated Embodiment 28. The composition of enumerated embodiments 26 or 27, wherein the proteins and peptides are selected from endonucleases, meganucleases, protease and kinases.

Enumerated Embodiment 29. The composition of enumerated embodiments 25 or 26, wherein the one or more agents to be delivered to a cell or a subject are one or more nucleic acids.

Enumerated Embodiment 30. The composition of enumerated embodiment 29, wherein the one or more nucleic acids are selected from a short interfering RNA (e.g. small interfering RNA) (siRNA), circular RNA, cyclic RNA, long noncoding RNA (lncRNA), a microRNA (miRNA), a pri-miRNA, a messenger RNA (mRNA), a cluster regularly interspaced short palindromic repeats (CRISPR) related nucleic acid, a single guide RNA (sgRNA), a CRISPR-RNA (crRNA), a trans-activating crRNA (tracrRNA), a plasmid DNA (pDNA), a transfer RNA (tRNA), an antisense oligonucleotide (ASO), a guide RNA, a double stranded DNA (dsDNA), a single stranded DNA (ssDNA), exDNA, proform RNA, a single stranded RNA (ssRNA), and a double stranded RNA (dsRNA).

Enumerated Embodiment 31. The composition of enumerated embodiments 29, wherein the nucleic acid is a miRNA.

Enumerated Embodiment 32. The composition of any one of enumerated embodiments 23 to 31, wherein the one or more agents to be delivered to a cell or subject are present in a weight ratio from about 100:1 to about 1:5.

Enumerated Embodiment 33. The composition of any one of enumerated embodiments 23 to 31, wherein the composition further comprises one or more lipids.

Enumerated Embodiment 34. The composition of enumerated embodiment 33, wherein the one or more lipids are selected from a steroid, a steroid derivative, a PEG-lipid, and a phospholipid, and mixtures thereof.

Enumerated Embodiment 35. The composition of enumerated embodiment 34, wherein the PEG-lipid is a PEG-modified phosphatidylethanolamine, PEG-modified phosphatidic acid, a PEG-ceramide conjugate, PEG-modified dialkylamine, PEG-modified 1,2-diacyloxypropan-3-amine, PEG-modified diacylglycerols and/or dialkylglycerols.

Enumerated Embodiment 36. The composition of enumerated embodiment 34, wherein the PEG-lipid is a PEG-modified 1,2-dimyristoyl-sn-glycero-3-phosphoethanolamine, a PEG-modified 1,2-distearoyl-sn-glycero-3-phosphoethanolamine, a PEG-modified 1,2-dioleoyl-sn-glycero-3-phosphoethanolamine, a PEG modified 1,2-dimyristoyl-sn-glycero-3-phosphoethanolamine, a PEG-modified 1,2-distearoyl-sn-glycero-3-phosphoethanolamine, a PEG-modified 1,2-dimyristoyl-rac-glycero-3-methoxypolyethylene glycol and/or a PEG-modified distearoyl-rac-glycerol.

Enumerated Embodiment 37. The composition of any one of enumerated embodiments 34 to 36, the PEG-lipid is present at 0 to 50 mol % of total lipids in the composition.

Enumerated Embodiment 38. The composition of enumerated embodiment 34, wherein the steroid is unmodified or modified cholesterol, a phytosterol, cholecalciferol, dexamethasone, or any combination thereof.

Enumerated Embodiment 39. The composition of enumerated embodiment 38, wherein the steroid is present at 0 to 50 mol % of total lipids in the composition.

Enumerated Embodiment 40. The composition of enumerated embodiment 34, wherein the phospholipid is 1,2-distearoyl-sn-glycero-3-phosphocholine (DSPC) or 1,2-dioleoyl-sn-glycero-3-phosphoethanolamine (DOPE).

Enumerated Embodiment 41. The composition of enumerated embodiment 34, wherein the phospholipid is present at 0 to 50 mol %, or up to 50 mol % of total lipids in the composition.

Enumerated Embodiment 42. The composition of any one of enumerated embodiments 23 to 41, wherein the composition has an apparent $pK_a$ of about 5 to about 7.

Enumerated Embodiment 43. The composition of any one of enumerated embodiments 23 to 42, wherein the composition is a pharmaceutical composition further comprising a pharmaceutically acceptable carrier.

Enumerated Embodiment 44. The composition of enumerated embodiment 43, wherein the pharmaceutical acceptable carrier is a solvent or solution.

Enumerated Embodiment 45. A LNP comprising one or more compounds of enumerated embodiment 1, wherein a, b, c, and d are each selected from 2 and 3 and the LNP has an apparent $pK_a$ of about 5.5 to about 6.0.

Enumerated Embodiment 46. A LNP comprising one or more compounds of enumerated embodiment 1, wherein a, b, c, and d are each selected from 3 and 4 and the LNP has an apparent $pK_a$ of about 6.0 to about 6.6.

Enumerated Embodiment 47. A LNP comprising one or more compounds of enumerated embodiment 1, wherein a, b, c, and d are each selected from 2 and 4 and the LNP has an apparent $pK_a$ about 5.5 to about 6.6.

Enumerated Embodiment 48. A LNP comprising one or more compounds of enumerated embodiment 1, wherein a, b, c, and d, are each selected from 4, 5 and 6 and the LNP has an apparent $pK_a$ of ≥6.6.

Enumerated Embodiment 49. A method of delivering one or more agents to a cell or subject comprising contacting the cell or subject with one or more compositions of any one of enumerated embodiments 23 to 44 or with the one or more LNPs of any one of enumerated embodiments 45 to 48, wherein the cell or subject is to be contacted under conditions to cause uptake of the agent into the cell or subject.

Enumerated Embodiment 50. The method of enumerated embodiment 49, wherein the cell is contacted in vitro.

Enumerated Embodiment 51. The method of enumerated embodiment 49, wherein the cell is contacted in vivo.

Enumerated Embodiment 52. The method of enumerated embodiment 49, wherein the cell is contacted ex vivo.

Enumerated Embodiment 53. The method of any one of enumerated embodiments 49 to 52, wherein the contacting is for treating or preventing a disease, disorder, or condition.

Enumerated Embodiment 54. The method of enumerated embodiment 53, wherein the disease, disorder or condition is selected from infectious diseases, autoimmune diseases, cancer, genetic diseases, chronic diseases, traumatic injuries, wound healing, traumatic brain injury, neuromuscular diseases and gastrointestinal diseases.

Enumerated Embodiment 55. The method of enumerated embodiments 53 or 54, wherein the contacting is by administrating an effective amount of the one or more compositions to a cell in need thereof.

Enumerated Embodiment 56. The method of any one of enumerated embodiments 49 to 55, wherein the cell is a prokaryotic cell or a eukaryotic cell selected from an animal cell, an insect cell or a plant cell.

Enumerated Embodiment 57. The method of any one of enumerated embodiments 49 to 56, wherein the one or more agents to be delivered to the cell are one or more nucleic acids.

Enumerated Embodiment 58. The method of enumerated embodiment 57, wherein the one or more agents is a cosmetic agent.

Enumerated Embodiment 59. The method of enumerated embodiment 58, wherein, the one or more agents comprise unique DNA or RNA sequences (barcodes) that are put into product packaging/labels that can be read to ensure the product is genuine or not tampered with.

Enumerated Embodiment 60. A kit comprising:
one or more compounds of enumerated embodiment 1 or one or more compositions of any one of enumerated embodiments 23 to 44 or one or more LNPs of any one of enumerated embodiments 45 to 48.

Enumerated Embodiment 61. The kit of enumerated embodiment 60, further comprising at least one vial, test tube, flask, bottle, syringe and/or other container, into which a component is placed, and optionally, aliquoted.

Enumerated Embodiment 62. The kit of enumerated embodiments 60 or 61, further comprising instructions for use.

Enumerated Embodiment 63. The kit of enumerated embodiment 62, wherein the instructions are for delivery of the one or more compounds or the one or more compositions to a subject or cell.

EQUIVALENTS

The details of one or more embodiments of the disclosure are set forth in the accompanying description above. Although any methods and materials similar or equivalent to those described herein can be used in the practice or testing of the present disclosure, the preferred methods and materials are now described. Other features, objects, and advantages of the disclosure will be apparent from the description and from the claims. In the specification and the appended claims, the singular forms include plural referents unless the context clearly dictates otherwise. Unless defined otherwise, all technical and scientific terms used herein have the same meaning as commonly understood by one of ordinary skill in the art to which this disclosure belongs. All patents and publications cited in this specification are incorporated by reference.

The invention claimed is:

1. A compound selected from the group consisting of:

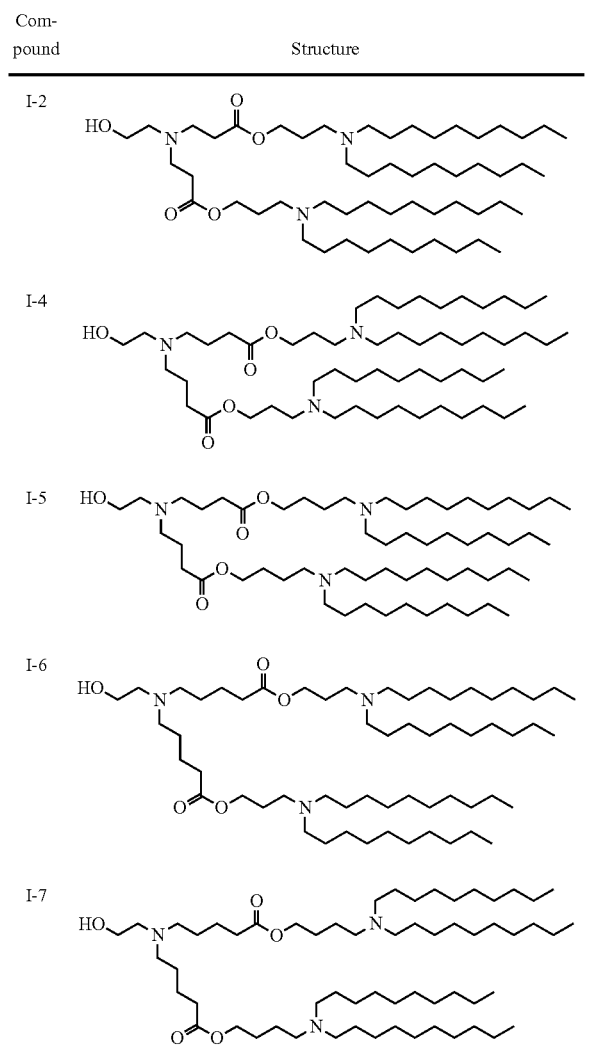

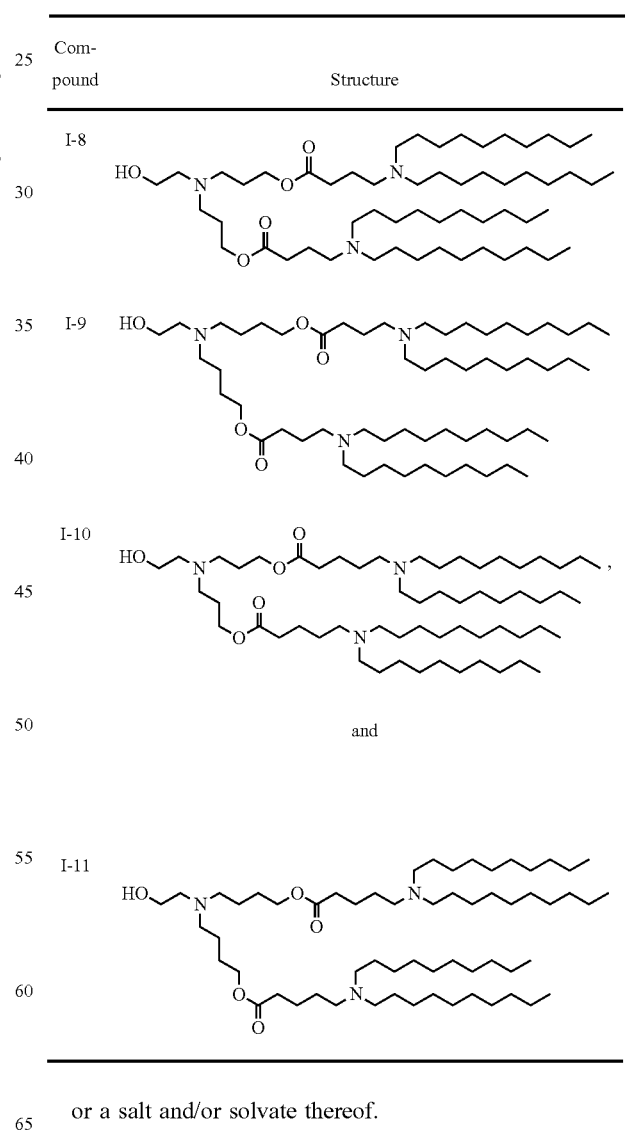

or a salt and/or solvate thereof.

2. The compound of claim 1, wherein the compound is selected from the group consisting of:

| Compound | Structure |
|---|---|
| I-4 | |
| I-5 | |
| I-6 | , and |
| I-8 | |
3. The compound of claim 2, wherein the compound is:
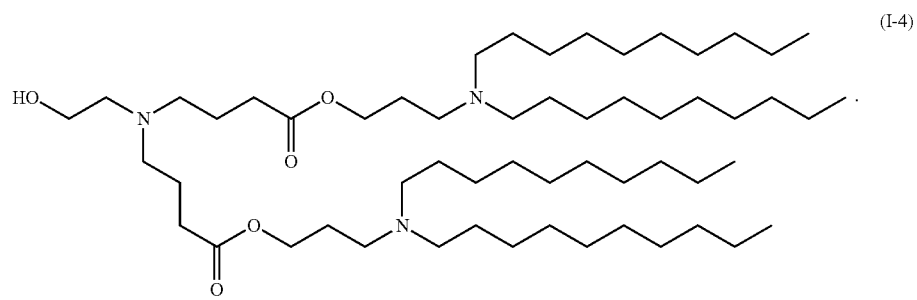 [SMILES: CCCCCCCCCCN(CCCCCCCCCC)CCCOC(=O)CCCN(CCO)CCCC(=O)OCCCN(CCCCCCCCCC)CCCCCCCCCC]
(I-4)

4. The compound of claim 2, wherein the compound is:

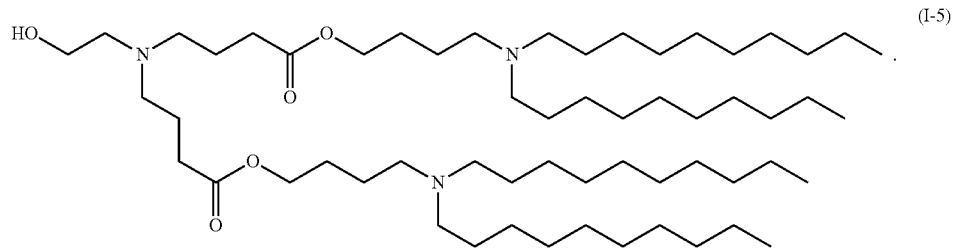 [SMILES: CCCCCCCCCCN(CCCCCCCCCC)CCCCOC(=O)CCCN(CCO)CCCC(=O)OCCCCN(CCCCCCCCCC)CCCCCCCCCC]

(I-5)

5. The compound of claim 2, wherein the compound is:

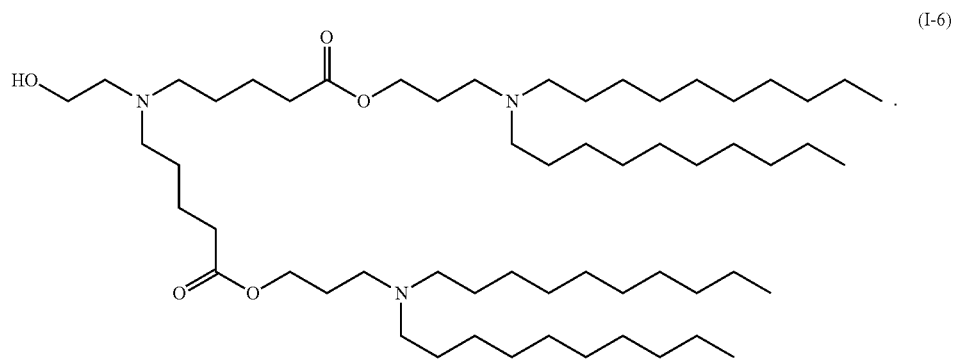 [SMILES: CCCCCCCCCCN(CCCCCCCCCC)CCCOC(=O)CCCCN(CCO)CCCCC(=O)OCCCN(CCCCCCCCCC)CCCCCCCCCC]

(I-6)

6. The compound of claim 2, wherein the compound is:

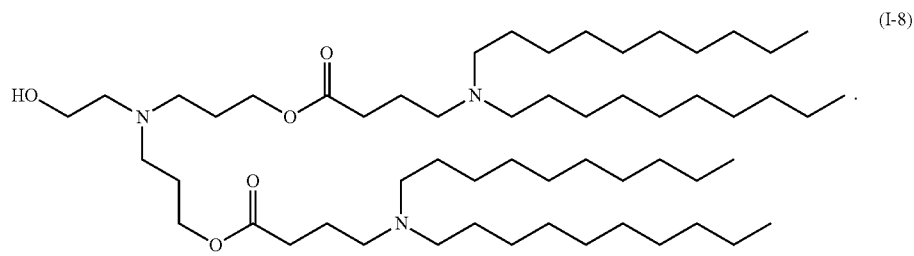 [SMILES: CCCCCCCCCCN(CCCCCCCCCC)CCCC(=O)OCCCN(CCO)CCCOC(=O)CCCN(CCCCCCCCCC)CCCCCCCCCC]

(I-8)

7. The compound of claim 1, wherein the compound has a base hydrolysis rate greater than 0.001 min$^{-1}$.

8. A nanoparticle comprising one or more compounds of claim 1.

9. A colloid comprising one or more compounds of claim 1.

10. A supramolecular structure comprising one or more compounds of claim 1.

11. A composition comprising one or more compounds of claim 1, and a therapeutic agent.

12. A composition comprising the compound of claim 2, and a therapeutic agent.

13. A composition comprising the compound of claim 5, and a therapeutic agent.

14. A lipid nanoparticle (LNP) comprising one or more compounds of claim 1.

15. The LNP of claim 14, wherein the LNP has an apparent pK$_a$ about 5.5 to about 6.6.

16. The LNP of claim 14, wherein the LNP has an apparent pK$_a$ of ≥6.6.

* * * * *

SEQUENCE LISTING

```
Sequence total quantity: 3
SEQ ID NO: 1            moltype = RNA   length = 1865
FEATURE                 Location/Qualifiers
source                  1..1865
                        mol_type = other RNA
                        organism = synthetic construct
SEQUENCE: 1
agggagactg ccaccatgga ggacgccaag aacatcaaga agggccccgc ccccttctac    60
cccctggagg acggcaccgc cggcgagcag ctgcacaagg ccatgaagcg gtacgccctg   120
gtgcccggca ccatcgcctt caccgacgcc cacatcgagg tggacatcac ctacgccgag   180
tacttcgaga tgagcgtgcg gctggccgag gccatgaagc ggtacggcct gaacaccaac   240
```

```
caccggatcg tggtgtgcag cgagaacagc ctgcagttct tcatgcccgt gctgggcgcc   300
ctgttcatcg gcgtggccgt ggcccccgcc aacgacatct acaacgagcg ggagctgctg   360
aacagcatgg gcatcagcca gcccaccgtg gtgttcgtga gcaagaaggg cctgcagaag   420
atcctgaacg tgcagaagaa gctgcccatc atccagaaga tcatcatcat ggacagcaag   480
accgactacc agggcttcca gagcatgtac accttcgtga ccagccacct gccccccggc   540
ttcaacgagt acgacttcgt gcccgagagc ttcgaccggg acaagaccat cgccctgatc   600
atgaacagca gcggcagcac cggcctgccc aagggcgtgg ccctgcccca ccggaccgcc   660
tgcgtgcggt tcagccacgc ccgggacccc atcttcggca accagatcat ccccgacacc   720
gccatcctga gcgtggtgcc cttccaccac ggcttcggca tgttcaccac cctgggctac   780
ctgatctgcg gcttccgggt ggtgctgatg taccggttcg aggaggagct gttcctgcgg   840
agcctgcagg actacaagat ccagagcgcc ctgctggtgc ccaccctgtt cagcttcttc   900
gccaagagca ccctgatcga caagtacgac ctgagcaacc tgcacgagat cgccagcggc   960
ggcgcccccc tgagcaagga ggtgggcgag gccgtgcaga gcggttcca cctgcccgc  1020
atccggcagg gctacggcct gaccgagacc accagcgcca tcctgatcac ccccgagggc  1080
gacgacaagc ccggcgccgt gggcaaggtg gtgcccttct tcgaggccaa ggtggtggac  1140
ctggacaccg gcaagaccct gggcgtgaac cagcggggcg agctgtgcgt gcggggcccc  1200
atgatcatga gcggctacgt gaacaacccc gaggccacca acgccctgat cgacaaggac  1260
ggctggctgc acagcggcga catcgcctac tgggacgagg acgagcactt cttcatcgtg  1320
gaccggctca gagagcctgat caagtacaag ggctaccagg tggcccccgc cgagctggag  1380
agcatcctgt gcagcacccc aacatcttc gacgccggcg tggccggcct gcccgacgac  1440
gacgccggcg agctgcccgc cgccgtggtg gtgctggagc acggcaagac catgaccgag  1500
aaggagatcg tggactacgt ggccagccag gtgaccaccg ccaagaagct gcggggcggc  1560
gtggtgttcg tggacgaggt gcccaagggc ctgaccggca gctggaccgc ccggaagatc  1620
cgggagatcc tgatcaaggc caagaagggc ggcaagatcg ccgtgtgata agctgccttc  1680
tgcggggctt gccttctggc catgcccttc ttctctccct tgcacctgta cctcttggtc  1740
tttgaataaa gcctgagtag aagaaaaaaa aaaaaaaaaa aaaaaaaaaa aaaaaaaaaa  1800
aaaaaaaaaa aaaaaaaaaa aaaaaaaaaa aaaaaaaaaa aaaaaaaaaa aaaaaaaaaa  1860
aaaaa                                                              1865

SEQ ID NO: 2           moltype = RNA   length = 794
FEATURE                Location/Qualifiers
source                 1..794
                       mol_type = other RNA
                       organism = Homo sapiens
SEQUENCE: 2
agggagactg ccaccatggg cgtgcacgag tgccccgcct ggctgtggct gctgctgagc   60
ctgctgagcc tgcccctggg cctgcccgtg ctgggcgccc cccccggct gatctgcgac  120
agccgggtgc tggagcggta cctgctggag gccaaggagg ccgagaacat caccaccggc  180
tgcgccgagc actgcagcct gaacgagaac atcaccgtgc cgacaccaa ggtgaacttc  240
tacgcctgga gcggatgga ggtgggccag caggccgtgg aggtgtggca gggcctggcc  300
ctgctgagcg aggccgtgct gcggggccag gccctgctgg tgaacagcag ccagcccctgg  360
gagccctgc agctgcacgt ggacaaggcc gtgagcggcc tgcggagcct gaccaccctg  420
ctgcggggcc tgggcgccca aggaggcc atcagcccc ccgacgccgc cagcgccgcc  480
ccctgcggga ccatcaccgc cgacaccttc cggaagctgt tccgggtgta cagcaacttc  540
ctgcggggca gctgaagct gtacaccggc gaggcctgcc ggaccggcga ccggtgataa  600
gctgcctttct gcgggcttg ccttctggcc atgcccttct tctctccctt gcacctgtac  660
ctcttggtct ttgaataaag cctgagtagg aagaaaaaa aaaaaaaaaa aaaaaaaaaa  720
aaaaaaaaaa aaaaaaaaaa aaaaaaaaaa aaaaaaaaaa aaaaaaaaaa aaaaaaaaaa  780
aaaaaaaaaa aaaa                                                    794

SEQ ID NO: 3           moltype = DNA   length = 1911
FEATURE                Location/Qualifiers
source                 1..1911
                       mol_type = other DNA
                       organism = synthetic construct
SEQUENCE: 3
agggagactg ccaccatgaa ggccaacctg ctggtgctgc tgtgcgccct ggccgccgcc   60
gacgccgaca ccatctgcat cggctaccac gccaacaaca gcaccgacac cgtggacacc  120
gtgctggaga gaacgtgac cgtgacccac agcgtgaacc tgctggagga cagccacaac  180
ggcaagctgt gccggctgaa gggcatcgcc cccctgcagc tgggcaagtg caacatcgcc  240
ggctggctgc tgggcaaccc cgagtgcgac cccctgctgc ccgtgcggag ctggagctac  300
atcgtggaga ccccccaacag cgagaacggc atctgctacc ccggcgactt catcgactac  360
gaggagctgc gggagcagct gagcagcgtg agcagcttcg agcggttcga gatcttcccc  420
aaggagagca gctggcccaa ccacaacacc aacggcgtga ccgccgcctg cagccacgag  480
ggcaagagca gcttctaccg gaacctgctg tggctgaccg agaaggaggg cagctacccc  540
aagctgaaga acagctacgt gaacaagaag ggcaaggagg tgctggtgct gtggggcatc  600
caccacccca gcaacagcaa ggagcagcag aacctgtacc agaacgagaa cgcctacgtg  660
```

-continued

```
agcgtggtga ccagcaacta caaccggcgg ttcaccccg agatcgccga gcggcccaag    720
gtgcgggacc aggccggccg gatgaactac tactggaccc tgctgaagcc cggcgacacc    780
atcatcttcg aggccaacgg caacctgatc gccccatgt acgccttcgc cctgagccgg    840
ggcttcggca gcggcatcat caccagcaac gccagcatgc acgagtgcaa caccaagtgc    900
cagacccccc tgggcgccat caacagcagc ctgccctacc agaacatcca ccccgtgacc    960
atcggcgagt gccccaagta cgtgcggagc gccaagctgc ggatggtgac cggcctgcgg   1020
aacatcccca gcatccagag ccggggcctg ttcggcgcca tcgccggctt catcgagggc   1080
ggctggaccg gcatgatcga cggctggtac ggctaccacc accagaacga gcagggcagc   1140
ggctacgccg ccgaccagaa gagcacccag aacgccatca acggcatcac caacaaggtg   1200
aacaccgtga tcgagaagat gaacatccag ttcaccgccg tgggcaagga gttcaacaag   1260
ctggagaagc ggatggagaa cctgaacaag aaggtggacg acggcttcct ggacatctgg   1320
acctacaacg ccgagctgct ggtgctgctg gagaacgagc ggaccctgga cttccacgac   1380
agcaacatga agaacctgta cgagaaggtg aagagccagc tgaagaacaa cgccaaggag   1440
atcggcaacg gctgcttcga gttctaccac aagtgcgaca acgagtgcat ggagagcgtg   1500
cggaacggca cctacgacta ccccaagtac agcgaggaga gcaagctgaa ccgggagaag   1560
gtggacggca tgaagctgga gagcatgggc atctaccaga tcctggccat ctacagcacc   1620
gtggccagca gcctggtgct gctggtgagc ctgggcgcca tcagcttctg gatgtgcagc   1680
aacggcagcc tgcagtgccg gatctgcatc tgataagctg ccttctgcgg ggcttgcctt   1740
ctggccatgc ccttcttctc tcccttgcac ctgtacctct tggtctttga ataaagcctg   1800
agtaggaaga aaaaaaaaa aaaaaaaaaa aaaaaaaaa aaaaaaaaaa aaaaaaaaaa   1860
aaaaaaaaaa aaaaaaaaaa aaaaaaaaaa aaaaaaaaaa aaaaaaaaa t            1911
```